United States Patent [19]
Okushiba et al.

[11] Patent Number: 5,902,993
[45] Date of Patent: *May 11, 1999

[54] IMAGE SCANNER FOR IMAGE INPUTTING IN COMPUTERS, FACSIMILES WORD PROCESSOR, AND THE LIKE

[75] Inventors: Hiroyuki Okushiba; Keitoku Morita, both of Aira-gun, Japan

[73] Assignee: Kyocera Corporation, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/763,017

[22] Filed: Dec. 11, 1996

Related U.S. Application Data

[63] Continuation-in-part of application No. 07/997,444, Dec. 28, 1992, Pat. No. 5,399,850, and a continuation of application No. 08/288,066, Aug. 9, 1994, abandoned.

[30] Foreign Application Priority Data

| Aug. 10, 1993 | [JP] | Japan | 5-198439 |
| Dec. 22, 1993 | [JP] | Japan | 5-324178 |
| Dec. 22, 1993 | [JP] | Japan | 5-324827 |
| Dec. 24, 1993 | [JP] | Japan | 5-327743 |
| Dec. 27, 1993 | [JP] | Japan | 5-331857 |
| Feb. 28, 1994 | [JP] | Japan | 6-029861 |
| Feb. 28, 1994 | [JP] | Japan | 6-029862 |

[51] Int. Cl.⁶ .......................... H01J 40/14; H04N 1/028; H04N 1/04
[52] U.S. Cl. ...................... 250/208.1; 250/205; 250/553; 250/234; 250/239; 358/475; 358/483; 358/494
[58] Field of Search ............................. 250/208.1, 208.2, 250/216, 227.2, 234, 239, 205, 552, 553; 257/431, 432, 433, 435, 436; 358/474, 475, 482, 483, 484, 493, 494, 496, 497

[56] References Cited

U.S. PATENT DOCUMENTS

| 4,644,159 | 2/1987 | Miura | 250/208.1 |
| 4,954,914 | 9/1990 | Karita et al. | 358/475 |
| 5,136,150 | 8/1992 | Fukushima et al. | 358/484 |
| 5,182,445 | 1/1993 | Yamashita | 250/208.1 |
| 5,229,870 | 7/1993 | Inoguchi | 358/475 |
| 5,254,847 | 10/1993 | Hata et al. | 250/208.1 |
| 5,283,425 | 2/1994 | Imamura | 358/475 |
| 5,396,090 | 3/1995 | Nakai | 257/233 |
| 5,399,850 | 3/1995 | Nagatani et al. | 250/208.1 |
| 5,434,682 | 7/1995 | Imamura et al. | 250/208.1 |
| 5,479,049 | 12/1995 | Aoki et al. | 257/432 |

FOREIGN PATENT DOCUMENTS

| 5103157 | 4/1993 | Japan . |
| 5122438 | 5/1993 | Japan . |
| 5160969 | 6/1993 | Japan . |
| 5252345 | 9/1993 | Japan . |
| 5252445 | 9/1993 | Japan . |

*Primary Examiner*—David Nelms
*Assistant Examiner*—John R. Lee
*Attorney, Agent, or Firm*—Loeb & Loeb LLP

[57] ABSTRACT

It is an object of the invention to present an image scanner of high performance, high reliability, and low cost, capable of realizing high image quality of reading image and suited to small size, and an illuminating apparatus of low cost capable of increasing the quantity of light for illuminating an object to be read. To achieve the object, the invention provides an image scanner comprising: a light source for illuminating an object to be read, an optical system disposed for forming an image by focusing reflected light from the object to be read, and a semiconductor integrated circuit possessing n photoelectric conversion elements disposed in a row for receiving the image, wherein the semiconductor integrated circuit sequentially main-scans the photoelectric conversion elements principally, and the image scanner main body moves in a sub-scanning direction in relation to the object to be read, and the semiconductor integrated circuit is arranged so that the deviation width between the first photoelectric conversion element and the n-th photoelectric conversion element in the sub-scanning direction may correspond to the length equivalent to the product of the moving speed in the sub-scanning direction and the reading period of each photoelectric conversion element.

12 Claims, 39 Drawing Sheets

Fig. 6 A CLK 
Fig. 6 B D1 
Fig. 6 C D2 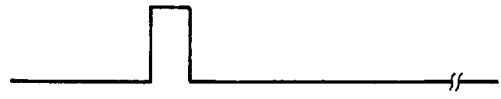
Fig. 6 D D3 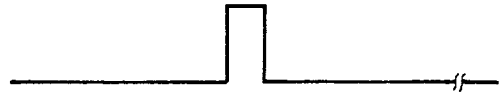
Fig. 6 E SIG 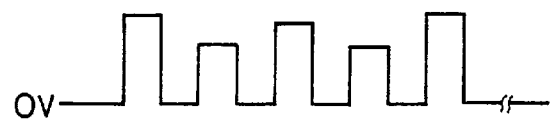
Fig. 6 F SIG (WHEN DARK) 
Fig. 7
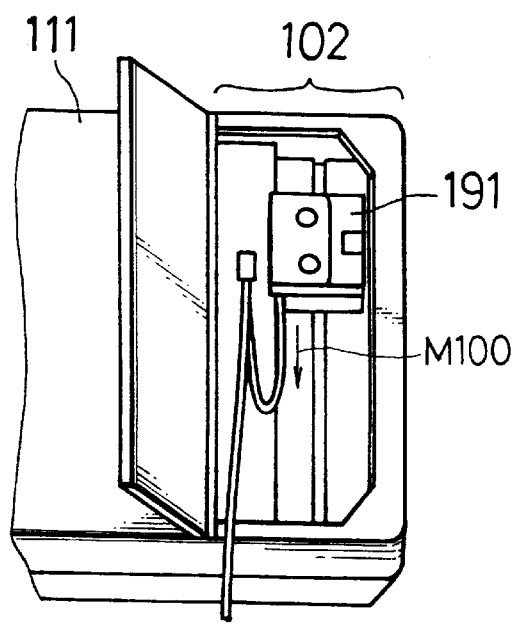

Fig.17 A

ORIGINAL

| a11 | a12 | a13 | a14 | a15 | a16 | a17 | a18 | ... | a1n |
|---|---|---|---|---|---|---|---|---|---|
| a21 | a22 | a23 | a24 | a25 | a26 | a27 | a28 | ... | a2n |
| a31 | a32 | a33 | a34 | a35 | a36 | a37 | a38 | ... | a3n |
| a41 | a42 | a43 | a44 | a45 | a46 | a47 | a48 | ... | a4n |
| a51 | a52 | a53 | a54 | a55 | a56 | a57 | a58 | ... | a5n |
| a61 | a62 | a63 | a64 | a65 | a66 | a67 | a68 | ... | a6n |
| a71 | a72 | a73 | a74 | a75 | a76 | a77 | a78 | ... | a7n |
| a81 | a82 | a83 | a84 | a85 | a86 | a87 | a88 | ... | a8n |
| a91 | a92 | a93 | a94 | a95 | a96 | a97 | a98 | ... | a9n |

MEMORY (SEMICONDUCTOR INTEGRATED CIRCUIT 104a)

251

| a'11 | a'13 | a'15 | a'17 | ... | a'1(n-1) | ←FIRST SCAN |
| a'21 | a'23 | a'25 | a'27 | ... | a'2(n-1) | ←SECOND SCAN |
| a'31 | a'33 | a'35 | a'37 | ... | a'3(n-1) | ←THIRD SCAN |
| a'41 | a'43 | a'45 | a'47 | ... | a'4(n-1) | ←FOURTH SCAN |
| a'51 | a'53 | a'55 | a'57 | ... | a'5(n-1) | ←FIFTH SCAN |
| a'61 | a'63 | a'65 | a'67 | ... | a'6(n-1) | ←SIXTH SCAN |
| a'71 | a'73 | a'75 | a'77 | ... | a'7(n-1) | ←SEVENTH SCAN |
| a'81 | a'83 | a'85 | a'87 | ... | a'8(n-1) | ←EIGHTH SCAN |
| a'91 | a'93 | a'95 | a'97 | ... | a'9(n-1) | ←NINTH SCAN |

Fig.17 C

MEMORY (SEMICONDUCTOR INTEGRATED CIRCUIT 104b)

252

| a'62 | a'64 | a'66 | a'68 | ... | a'6n | ←FIRST SCAN |
| a'72 | a'74 | a'76 | a'78 | ... | a'7n | ←SECOND SCAN |
| a'82 | a'84 | a'86 | a'88 | ... | a'8n | ←THIRD SCAN |
| a'92 | a'94 | a'96 | a'98 | ... | a'9n | ←FOURTH SCAN |

| | | | | | | | | | | SEMICONDUCTOR INTEGRATED CIRCUIT 104a | SEMICONDUCTOR INTEGRATED CIRCUIT 104b |
|---|---|---|---|---|---|---|---|---|---|---|---|
| a'11 | | a'13 | | a'15 | | a'17 | | ... | | ←FIRST SCAN | |
| a'21 | | a'23 | | a'25 | | a'27 | | ... | | ←SECOND SCAN | |
| a'31 | | a'33 | | a'35 | | a'37 | | ... | | ←THIRD SCAN | |
| a'41 | | a'43 | | a'45 | | a'47 | | ... | | ←FOURTH SCAN | |
| a'51 | | a'53 | | a'55 | | a'57 | | ... | | ←FIFTH SCAN | |
| a'61 | a'62 | a'63 | a'64 | a'65 | a'66 | a'67 | a'68 | ... | a'6n | ←SIXTH SCAN | ←FIRST SCAN |
| a'71 | a'72 | a'73 | a'74 | a'75 | a'76 | a'77 | a'78 | ... | a'7n | ←SEVENTH SCAN | ←SECOND SCAN |
| a'81 | a'82 | a'83 | a'84 | a'85 | a'86 | a'87 | a'88 | ... | a'8n | ←EIGHTH SCAN | ←THIRD SCAN |
| a'91 | a'92 | a'93 | a'94 | a'95 | a'96 | a'97 | a'98 | ... | a'9n | ←NINTH SCAN | ←FOURTH SCAN |

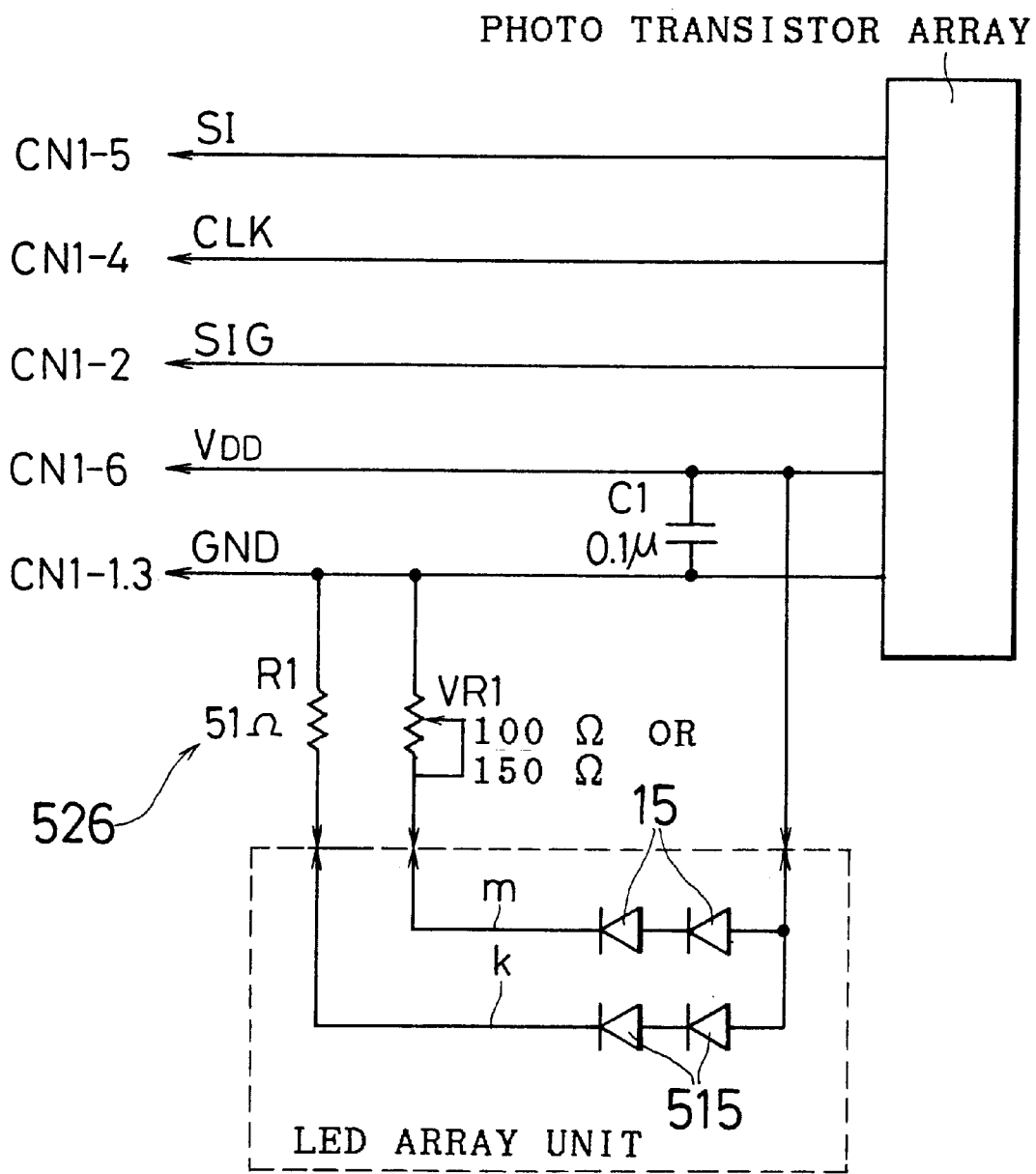

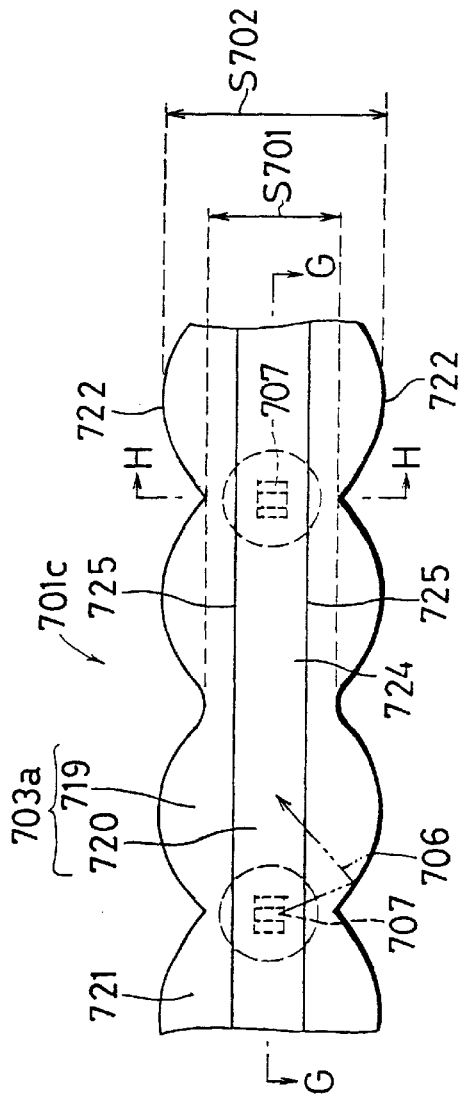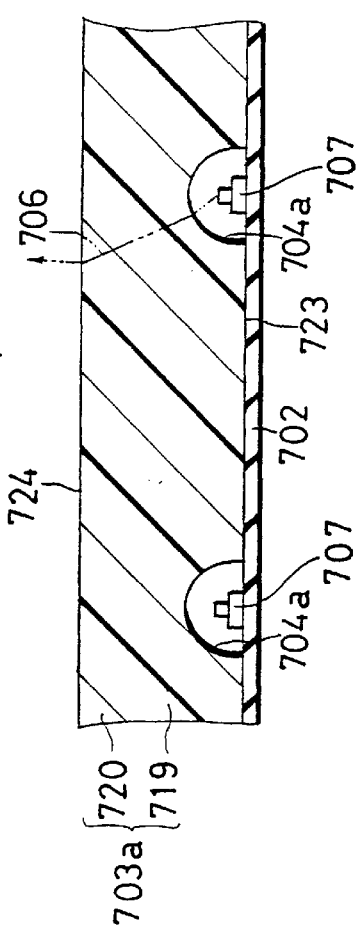

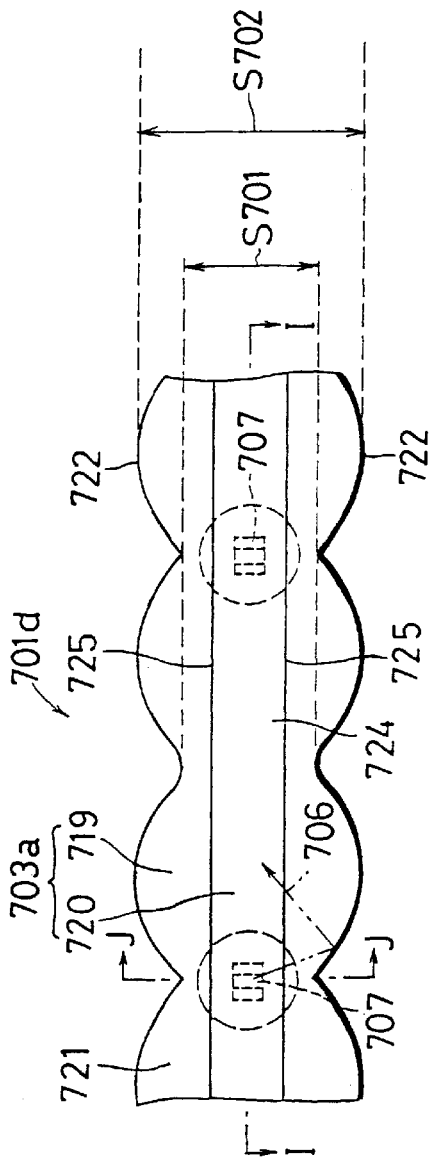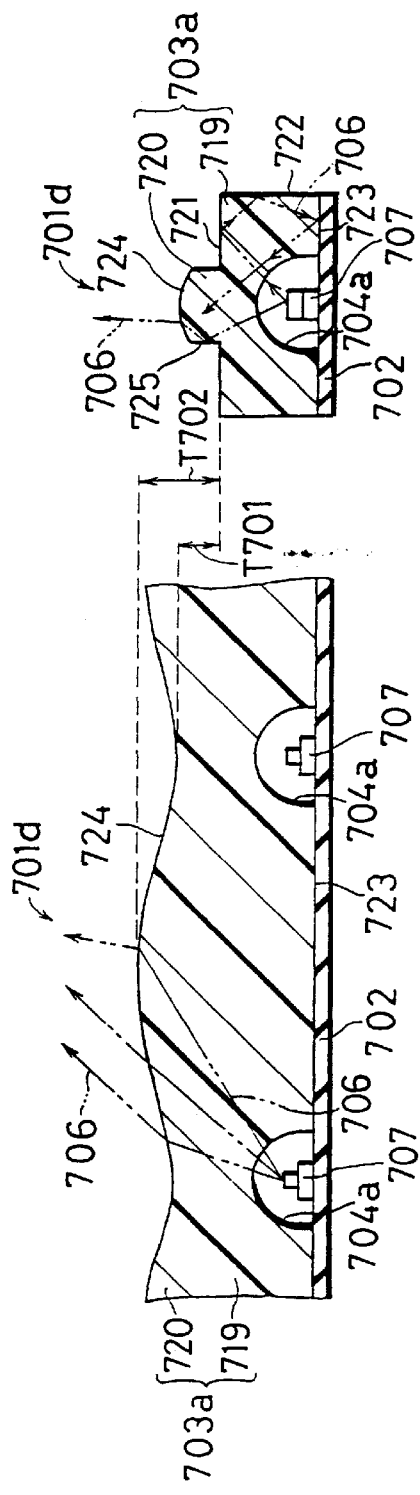

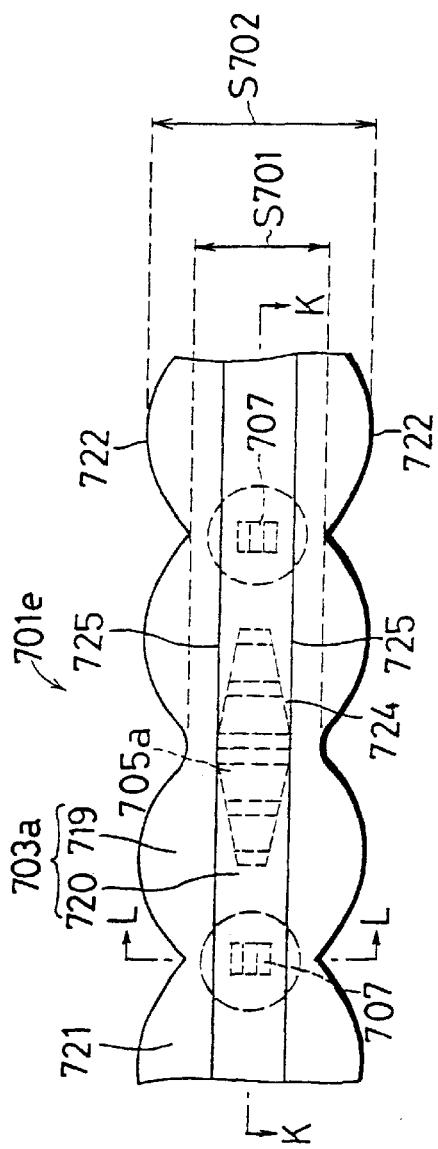
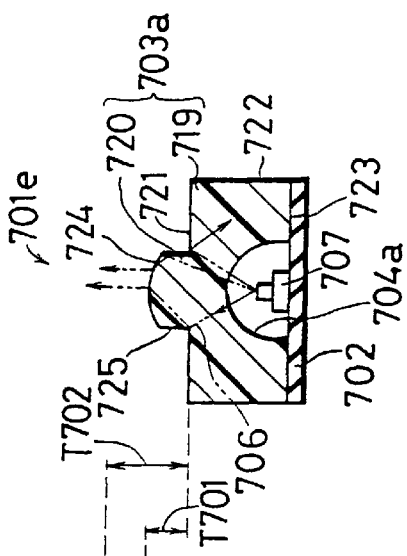
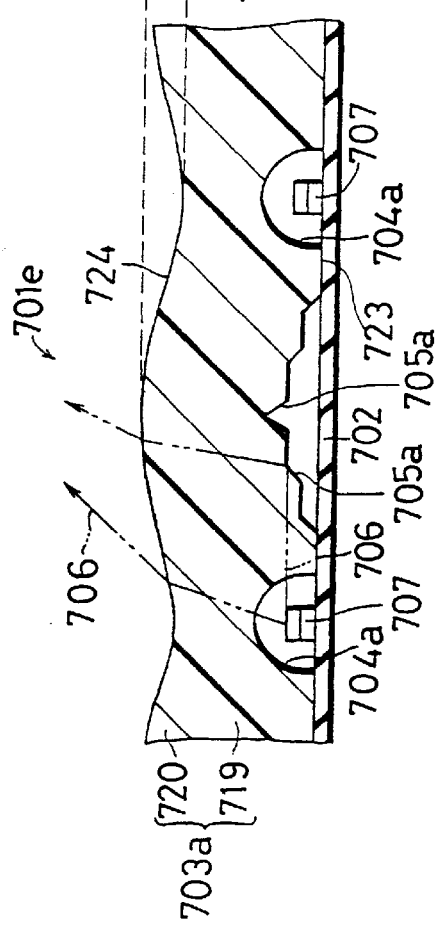

IMAGE SCANNER FOR IMAGE INPUTTING IN COMPUTERS, FACSIMILES WORD PROCESSOR, AND THE LIKE

This application is a continuation-in-part application of application Ser. No. 07/997,444, filed Dec. 28, 1992, now issued as U.S. Pat. No. 5,399,850, on Mar. 21, 1995, and a continuation of application Ser. No. 08/288,066 filed on Aug. 9, 1994, now abandoned.

BACKGROUND OF THE INVENTION

1. Field of the Invention

The present invention relates to an image scanner applied to image inputting in computers, facsimiles, wordprocessors, etc. and to an illuminating apparatus used for the image scanner.

2. Description of the Related Art

In a conventional image scanner, an original image is read by a semiconductor integrated circuit having multiple photoelectric conversion elements disposed in one array. The reading of the original image by such an image scanner is conducted in such a manner that the scanning of the original image by the photoelectric conversion elements in an array direction of the photoelectric conversion elements is sequentially repeated by moving the original in relation to the semiconductor integrated circuit or vice versa.

In the conventional image scanners, the array direction of the photoelectric conversion elements, which is a main-scanning direction, and the moving direction of the original in relation to the semiconductor integrated circuit or vice versa, which is a sub-scanning direction, are set to be perpendicular to each other.

In the case where the main- and the sub-scanning direction are perpendicular to each other, the image information read by the image scanner is distorted.

When the original image is scanned by the photoelectric conversion elements while continuously moving the semiconductor integrated circuit in relation to the original, a predetermined time is required to sequentially scan the original by each of photoelectric conversion elements from one end to the other end of the array.

Consequently, as compared with the image information by the photoelectric conversion element at the beginning end of the array, the image information by the photoelectric conversion element at the other end of the array is deviated to the upper stream side of the sub-scanning direction, that is the upper stream side of the moving direction of the semiconductor integrated circuit in relation to the original.

As a result, the distortion of the read image is caused and the quality of the read image is lowered.

Additionally, in the conventional image scanners, the semiconductor integrated circuit is provided with only one array of photoelectric conversion elements and between the adjacent photoelectric conversion elements exists a space almost equal to the width of one photoelectric conversion element. As a result, the resolution of the read image information is low.

The inventors and others of the present invention have proposed an image scanner of a long-shaped and fitting type wherein one array of a plurality of lenses and one array of a plurality of semiconductor integrated circuits are arranged to be in parallel to each other and to correspond to each other. In such constitution, the respective lenses should be very precisely arranged so as to correspond to the respective semiconductor integrated circuits. However, in the case where the precise arrangement can not be realized because of manufacturing errors, the image scanners have a few problems, namely, deviation of read pixels at seams of respective reading systems and blurring of image due to loosening of an origin.

Additionally, the entire surfaces of the semiconductor integrated circuit possessing multiple photoelectric conversion elements are usually coated with a resin in order to protect the photoelectric conversion elements and wire bondings. However, the applied resin coating forms a convex. As a result, if light enters the photoelectric conversion elements through the convex resin, convex effect and light scattering occur, which make highly precise reading impossible. The image scanners having such problems are not suited to bar code readers or the like which are required to have a high precision in length measurement.

Further, in the above-mentioned image scanners, a plurality of LEDs as a light source, each of which has almost the same light quantity, are arranged at regular intervals. Although the light source has almost uniform light quantity in linear illuminating, the light quantity decreases in the periphery of the lens when passing through the lens (hereinafter the phenomenon is described as "peripheral dimming").

Further, the above-mentioned long-shaped and fitting type image scanners have a problem that the parts cost is increased because of the necessity of the plurality of semiconductor integrated circuits.

Further, in a conventional illuminating apparatus for illuminating an original provided in the image scanners, for example, the light emitted in parallel to the original to be illuminated from LEDs provided in the illuminating apparatus hardly reaches the original. Thus a sufficient quantity of light for illuminating the original can not be obtained for the number of LEDs.

SUMMARY OF THE INVENTION

It is an object of the invention to present an image scanner of high performance, high reliability, and low cost, capable of realizing high image quality of reading image and suited to small size, and an illuminating apparatus of low cost capable of increasing the quantity of light for illuminating an object to be read.

To achieve the object, the invention provides an image scanner comprising:

a light source for illuminating an object to be read, an optical system disposed for forming an image by focusing reflected light from the object to be read, and a semiconductor integrated circuit possessing n photoelectric conversion elements disposed in a row for receiving the image, wherein the semiconductor integrated circuit sequentially main-scans the photoelectric conversion elements principally, and the image scanner main body moves in a subscanning direction in relation to the object to be read, and the semiconductor integrated circuit is arranged so that the deviation width between the first photoelectric conversion element and the n-th photoelectric conversion element in the subscanning direction may correspond to the length equivalent to the product of the moving speed in the subscanning direction and the reading period of each photoelectric conversion element.

According to the invention, the semiconductor integrated circuit is arranged in the image scanner so that the deviation width between the first photoelectric conversion element and the n-th photoelectric conversion element in the subscanning direction may correspond to the length equivalent to the product of the moving speed in the subscanning direction of the image scanner main body in relation to the original which is the object to be read and the reading period of each photoelectric conversion element.

Accordingly, when the image scanner main body moves in the subscanning direction on the original, the semiconductor integrated circuit can sequentially main-scan the photoelectric conversion elements in a direction vertical to the subscanning direction.

Thus, according to the invention, the image information on the original can be read in an appropriate state, although image information distorted in the subscanning direction is read in the prior art, so that an image scanner enhanced in the picture quality may be obtained.

An image scanner of the invention comprises:
a light source for illuminating an object to be read,
an optical system disposed for forming an image by focusing reflected light from the object to be read, and
a pair of semiconductor integrated circuits possessing multiple photoelectric conversion elements disposed in a row for receiving the image, and is characterized in that
the pair of semiconductor integrated circuits are arranged so that the photoelectric conversion element rows may be mutually parallel in the main-scanning direction, and one semiconductor integrated circuit is disposed to be deviated by 1/2 of the photoelectric conversion element pitch in the principal scanning direction to the other semiconductor integrated circuit.

The invention is characterized in that the gap between one semiconductor integrated circuit and the other semiconductor integrated circuit in the subscanning direction is an integer multiple of the photoelectric conversion element size in the subscanning direction.

According to the invention, a pair of semiconductor integrated circuits are disposed so that the photoelectric conversion element rows may be parallel to each other in the main scanning direction for one optical system such as a convex lens, and are disposed to be deviated by 1/2 of the photoelectric conversion element pitch in the principal scanning period, so that the original information received by the convex lens may be imaged on the both semiconductor integrated circuits. As a result, in one semiconductor integrated circuit, the gap between the adjacent photoelectric conversion elements is close to the width of one photoelectric conversion element, and reading can not be carried out in this region. This region where reading is impossible, however, can be read by the other semiconductor integrated circuit. Accordingly, it is possible to read at a double resolution as much as that of the prior art.

Also according to the invention, the interval of both photoelectric conversion elements P in the subscanning direction is n times (n: natural number) the photoelectric conversion element size. By so constituting, after one photoelectric conversion element reads the original information at a specific position, the original information at the specific position is read by the other semiconductor integrated circuit at the point of time when scanning n periods in the subscanning direction. Herein, by combining the read data of the both semiconductor integrated circuits corresponding to the same original position in the software, reading of high resolution can be realized.

Thus, according to the invention, by simultaneously driving the pair of semiconductor integrated circuits disposed in parallel, an image scanner of high resolution without lowering of reading speed can be obtained. Besides, without changing the design of the semiconductor integrated circuits, the conventional semiconductor integrated circuits can be directly used, so that an image scanner of low cost is obtained.

Further, the invention provides an image scanner comprising a light source, a single lens, and a semiconductor integrated circuit having multiple photoelectric conversion elements arranged linearly, on a casing possessing a confronting surface to an object to be read, wherein the light source illuminates the object to be read, and the reflected light is focused in the semiconductor integrated circuit through the lens, and the lens is composed of light transmitting high polymer material, the casing is made of high polymer material, and the lens and casing are combined into one body by fusion.

Further, the invention is characterized in that, the photoelectric conversion element array surface of the semiconductor integrated circuit is coated with a light transmitting resin layer having a thickness of 100 μm or less, and the light source illuminates the object to be read, and the reflected light is focused by the lens and is received in the photoelectric conversion element through the light transmitting resin layer.

According to an image scanner of the invention, in an optical system comprising a light source, a single lens, and a semiconductor integrated circuit having multiple photoelectric conversion elements arranged linearly on a casing, the lens is made of light transmitting high polymer material, the casing is made of a high polymer material, and the lens and casing are combined into one body by fusion. This is not a long-shaped apparatus, and is free from seams, and therefore deviation of image due to manufacturing error or blurring of image due to loosening of original will not occur. As a result, an image scanner of high performance and high reliability is realized.

Besides, since the focusing lens is made of a light transmitting high polymer material, its radius of curvature can be set appropriately as desired, and the radius of curvature can be easily set smaller, so that the distance interval to the object image surface can be shortened, thereby lowering the manufacturing cost and extremely enhancing the temperature characteristics.

Still more, as the radius of curvature of the lens can be set smaller, the optical path is shortened. Consequently, the apparatus may be reduced in size.

In the image scanner of the invention, a semiconductor integrated circuit wherein multiple photoelectric conversion elements are linearly arranged instead of CCDs is used, and a light receiving portion is designed to read out the photo diodes sequentially by a FET or shift register, and hence few peripheral circuits are required to form a circuit, and a C-MOS serves the purpose (the C-MOS requires only three times of injection and diffusion at most). Consequently, the reduction of formation processes, the semiconductor integrated circuit can be reduced in size, and the yield is enhanced.

In the image scanner of the invention, the lens composed of a light transmitting high polymer material is formed into one body by fusing to the casing made of a high polymer material. Therefore, a problem in the method of focusing light on CCDs that the optical system must be set precisely, accompanied with its fine adjustment can be solved. Moreover, owing to a recent injection forming technology, stable dimensions with a standard deviation σ of 10 μm can be achieved, and the dimension remains precise and stable for a long period, and additionally mass production is possible at this precision.

Also according to the invention, to protect the photoelectric conversion elements, wire bondings etc., a light permeable resin layer with a thickness of 100 μm or less is applied on the semiconductor integrated circuit, and the surface of the resin layer is made flat. As a result, even if light enters the photoelectric conversion elements through this resin layer coat, convex lens effect or light scattering does not occur on the layer itself, and that leads to reading of high precision. Thus it is suited to a bar code reader wherein a high precision is required in length measurement.

Further, according to the invention, the lenses are made of light transmitting plastic and the casing is made of plastic, the lenses are fixed to the casing by ultrasonic fusion, that is, the lenses are fixed without using an adhesive. Accordingly, shielding of the optical path due to the adhesive flowing into the lens surface which causes lowering the reading performance, is avoided, and shielding of the optical path and the lowering of the reading performance due to adsorption of the released low molecular monomer on the lens surface or scattering of the adhesive to adhere to the lens surface will not occur.

Moreover, even if a dust is caught between the bottom of lens and the casing, the dust is wrapped into the plastic by ultrasonic fusion, so that the lowering of reading performance due to the dust is eliminated.

Still further, in the conventional method of using an adhesive, a stress occurs in the lens due to curing and shrinkage of the adhesive, and the shape precision of the spherical surface or aspherical surface of the lens is deviated, and as a result it becomes impossible to read accurately and precisely. Besides the adhesive itself is troublesome to control. All these problems are advantageously solved in the invention.

Further the invention provides an image scanner comprising a lens, a light source having a plurality of LEDs disposed linearly, and a semiconductor integrated circuit having multiple photoelectric conversion elements arranged linearly so as to be substantially parallel to a LEDs array direction, on a casing possessing a confronting surface to an object to be read, wherein the light source illuminates the object to be read and the reflected light is focused on the semiconductor integrated circuit through the lens and the plurality of LEDs are arranged so that the distribution of light quantity Illuminated by them might be symmetrical to the optical axis of the lens in an optical system and so that the light quantity is increased as departing from the optical axis of the optical system.

Further, the invention also provides an image scanner comprising a lens, a light source having a plurality of LEDs disposed linearly, and a semiconductor integrated circuit having multiple photoelectric conversion elements arranged linearly so as to be substantially parallel to a LEDs array direction, on a casing possessing a confronting surface to an object to be read, wherein the light source illuminates the object, and the reflected light is focused on the semiconductor integrated circuit through the lens and, current adjusting means is provided in order to apply electric power individually to the plurality of LEDs.

Further, invention is characterized in that, a protrusion or a stepped portion is formed in an inner side wall of the casing facing the optical path from the object to be read to the lens, or black mat treatment is applied to the side wall.

Further, the invention is characterized in that, light shielding means for shielding the light directly entering the lens from the light source is formed in the casing.

According to the invention, the plurality of LEDs are arranged so that the distribution of light quantity illuminated by them may be symmetrical to the optical axis of the lens in the optical system, and so that the light quantity may be increased as departing from the optical axis of the focusing system, and therefore the peripheral dimming of the lens itself may be compensated by enhancing the light quantity corresponding to the peripheral part of the reading. As a result, multiple photoelectric conversion elements disposed in the semiconductor integrated circuit may be uniformly illuminated.

In the image scanner of the invention, current adjusting means for applying current (electric power) individually to each LED is provided, so that specified current may be applied to the LEDs, and the current may be increased in the LED where the light quantity is insufficient, or decreased in the LED where the quantity of light is excessive, thereby compensating the peripheral dimming of the lens itself or correcting fluctuations of illumination among individual LEDs.

Further, according to the image scanner of the invention, a protrusion or stepped portion is formed in the inner side wall of the casing facing the optical path from the object to be read to the lens, or black mat treatment is applied to the side wall, or light shielding means for shielding the light directly entering the lens from the light source is formed in the casing, so that the stray light entering the lens may be decreased or eliminated. As a result, the s/N ratio, white/black ratio (contrast ratio), uniformity at black level and other image qualities are enhanced, while abnormality in switching characteristic of the transistor composing the control circuit of the semiconductor integrated circuit may be eliminated, so that an image scanner of high quality and high reliability may be presented.

As described above, according to the invention, by the combination of the light quantity distribution of the lens and light quantity distribution of the LEDs, multiple photoelectric conversion elements arranged in the semiconductor integrated circuit can be uniformly illuminated.

In the invention, by using the LED current adjusting means, the light quantity of individual LEDs can be adjusted, and thereby the plurality of LEDs can be set so that the light quantity distribution of illuminated by them is symmetrical to the optical axis of the optical system, and that the light quantity is increased as departing from the optical axis of the focusing system. As a result, by the combination of the light quantity distribution of the lens and light quantity distribution of LEDs, multiple photoelectric conversion elements arranged in the semiconductor integrated circuit can be uniformly illuminated.

To correct fluctuations of light emission from the light source, it is not necessary to provide a ROM or D/A converter. Consequently, a correction circuit can be eliminated, and cost reduction and speed enhancement of the circuit can be achieved.

Thus, an image scanner of high quality and high reliability can be provided, which is suited to a bar code reader wherein a high precision is required in length measurement because reading of high precision can be carried out therein.

According to the invention, stray light not contributing to the original reading does not occur, and hence an image scanner wherein the S/N ratio, black/white ratio (contrast ratio), and uniformity at black level are enhanced is provided. Besides, since stray light does not enter the control circuit of the semiconductor integrated circuit, the switching characteristic of the transistor composing the control circuit is not abnormal. As a result, an image scanner of high reliability can be provided.

The invention provides an image scanner comprising:

a light transmitting plate contacting with an object to be read, a light source for illuminating the object, a reflector for converting an optical path of reflected light from the object, a plurality of lenses for focusing the reflected light, a plurality of photoelectric conversion means of sequential reading type for photoelectrically converting the image focused by the lens, and a casing for accommodating the light transmitting plate, light source, reflector, lenses and photoelectric conversion elements.

Further, the invention provides an image scanner comprising:

a light transmitting plate contacting with an object to be read, a light source for illuminating the object, a plurality of lenses for focusing the reflected light from the object, a prism for converting an optical path of the reflected light, a plurality of photoelectric conversion means of sequential reading type for photoelectrically converting the image formed by the lens, and a casing for accommodating the light transmitting plate, light source, reflector, lenses and photoelectric conversion elements.

According to the invention, the image scanner comprises a light source, a mirror, a plurality of lenses, and a plurality of photoelectric conversion elements of sequential reading type in a casing, and possesses a light transmitting plate for contacting with an object to be read on the upper part of the casing. The light emitted from the light source is reflected on the surface of the object to be read through the light transmitting plate, to give in an example of the optical path, and enters the casing through the light transmitting plate again. Thereafter, it is reflected by the reflector, and is imaged on the photoelectric conversion element surface through the lens. The plurality of lenses and plurality of photoelectric conversion elements are provided in the casing linearly one by one, and the image of the object to be read is divided by the lenses, and reduced and projected on the surface of the corresponding photoelectric conversion element, and individually and photoelectrically converted by the photoelectric conversion element. Reading of the entire image of the object to be read is conducted by moving the object to be read by feed roller or the like, in a direction vertical to the array of lenses and photoelectric conversion elements.

Hence, the optical path of the reflected light from the object to be read is deflected by the reflector on the way from the original surface to the photo detector, so that the space in the casing may be effectively utilized, and the optical path length can be extended without increasing the size of the casing, or rather by reducing the size, until the reflected light from the object to be read reaches the photoelectric conversion elements.

Further, according to the invention, the image scanner comprises a light source, a prism, a plurality of lenses, and a plurality of photoelectric conversion elements of sequential reading type in a casing, and possesses a light transmitting plate to contact with the object to be read in the upper part of the casing. The light emitted from the light source is reflected on the object to be read through the light transmitting plate, to give an example of optical path, and enters the casing through the light transmitting plate again. Thereafter, it is reflected by the lens and is focused on the surface of the photoelectric conversion element.

Therefore, the optical path of the reflected light from the original surface is deflected by the reflector on the way from the object to be read to the photo detector, so that the space in the casing may be effectively utilized, and the optical path length can be extended without increasing the size of the casing, or rather by reducing the size.

According to the invention, the reflected light from the object to be read is, for example, reflected by the reflector, and is imaged on the surface of the photoelectric conversion elements by the lens, so that the space in the casing can be effectively utilized, and the optical path length can be extended without increasing the size of the casing, or rather the size may be reduced. By extending the optical path length, the reading length per photoelectric conversion element can be extended without increasing the angle of field, or rather by decreasing, and the numbers of photoelectric conversion elements and lenses can be decreased. That results in reduction of the post of the parts. At the same time, by decreasing the angle of field, pixel deviation characteristic, peripheral light quantity specific characteristic, and peripheral MTF characteristic can be enhanced, so that an excellent picture quality can be obtained.

The invention provides an illuminating apparatus of an image scanner comprising:

a light source wherein plural LEDs are arranged linearly at predetermined intervals, and light reflecting means disposed between the LEDs.

The invention is characterized in that, the longer the distance from the LEDs, the area of reflection of the reflector of the light reflecting means is greater.

The invention also provides an illuminating apparatus of an image scanner comprising a light source wherein plural LEDs are arranged linearly at predetermined intervals, a reflection conductor for leading in the light from each LED and conducting, and a light guide for leading the light from the reflection conductor and emitting to outside.

The invention is characterized in that, the light guide possesses a curvature in aspherical surface in a longitudinal direction.

According to the invention, the illuminating apparatus provided in the above image scanner or the like in order illuminating the object to be read comprises a light sources composed of plural LEDs disposed linearly at predetermined intervals, and light reflecting means disposed at intervals between the LEDs. Therefore, although a part of the light emitted from the LEDs, can not conventionally reach the object to be read, the light emitted from the LEDs including such escaping light is reflected by the light reflecting means, and the optical path is converted into the object to be read direction. Therefore, the illumination quantity of the object to be read can be increased.

According to the invention, the light reflecting means is composed so that the reflection area of the reflector may be larger as the distance from the LEDs is longer. Therefore, generally, when the distance from the LEDs is longer, the light quantity per unit area decreases, but by increasing the area of reflection depending on the decrease of light quantity, the object to be read may be illuminated with a uniform quantity of light.

Also in the invention, the illuminating apparatus comprises a light sources composed of plural LEDs disposed linearly at predetermined intervals, a reflection conductor for leading in the light from each LED and conducting, and a light guide for leading the light from the reflection conductor and emitting to outside. Therefore, the light emitted in all directions from the light sources is led by the reflection conductor and light guide to illuminate the object to be read, and hence the loss of light quantity can be reduced, in other words the light quantity of illuminating object to be read can be increased.

According to the invention, the light guide possesses a curvature in aspherical surface in a longitudinal direction. Therefore, for example, by periodically changing the curvature of the aspherical surface, corresponding to the arrangement interval of the light sources, the quantity of light illuminating the object to be read can be set uniform.

Thus, according to the invention, the light quantity illuminating the object to be read can be increased, and when the illuminating apparatus is incorporated in the image scanner or the like, the quality of the image scanner can be enhanced.

Further, according to the invention, the object to be read can be illuminated with a uniform light quantity, and the picture quality of the image scanner comprising the illuminating apparatus can be enhanced. In addition, since the light reflecting means is formed by injection molding, the manufacturing process can be shortened.

Further, according to the invention, the loss of light quantity can be decreased, namely the light quantity can be increased without increasing the number of LEDs to be used as a light source, or rather by decreasing the number thereof.

According to the invention, the quantity of light illuminating the object to be read can be made uniform, and the picture quality of the image scanner incorporating the illuminating apparatus is enhanced. Besides, since the reflection conductor and the light guide are formed into one body by injection molding, the number of parts can be decreased. Furthermore, by disposing light reflecting means among LEDs, and forming the light reflecting means and light guide into one body by injection molding, the light emitted from the light source is reflected by the light reflecting means, and the object to be read is illuminated as being guided by the reflection conductor and light guide, and hence the loss of light quantity is decreased, and the quantity of light illuminating the object to be read can be increased, and since the light reflecting means, reflection conductor and light guide are formed into one body, the number of parts can be decreased, thereby enhancing the assembling efficiency and stabilizing the product quality.

BRIEF DESCRIPTION OF THE DRAWINGS

Other and further objects, features, and advantages of the invention will be more explicit from the following detailed description taken with reference to the drawings wherein:

FIG. 6A–6F are timing charts of each signal of the circuit diagram of FIG. 5;

FIG. 7 is a perspective view of a image scanner 131 installed wordprocessor 111;

FIGS. 17A–17D are diagrams for explaning reading an original by the use of the image scanner 231 of FIG. 13;

FIG. 31 is a circuit diagram of the image scanner of the fifth embodiment;

FIG. 50A is a top view of an illuminating apparatus 701c of a nineteenth embodiment of the invention;

FIG. 50B is a sectional view taken along line G—G of FIG. 50A;

FIG. 50C is a sectional view taken along line H—H of FIG. 50A;

FIG. 51A is a top view of an illuminating apparatus 701d of a twentieth embodiment of the invention;

FIG. 51B is a sectional view taken along line I—I of FIG. 51A;

FIG. 51C is a sectional view taken along line J—J of FIG. 51A;

FIG. 52A is a top view of an illuminating apparatus 701e of a twenty-first embodiment of the invention;

FIG. 52B is a sectional view taken along line K—K of FIG. 52A;

FIG. 52C is a sectional view taken along line L—L of FIG. 52A;

DETAILED DESCRIPTION OF THE PREFERRED EMBODIMENTS

Figure 1:
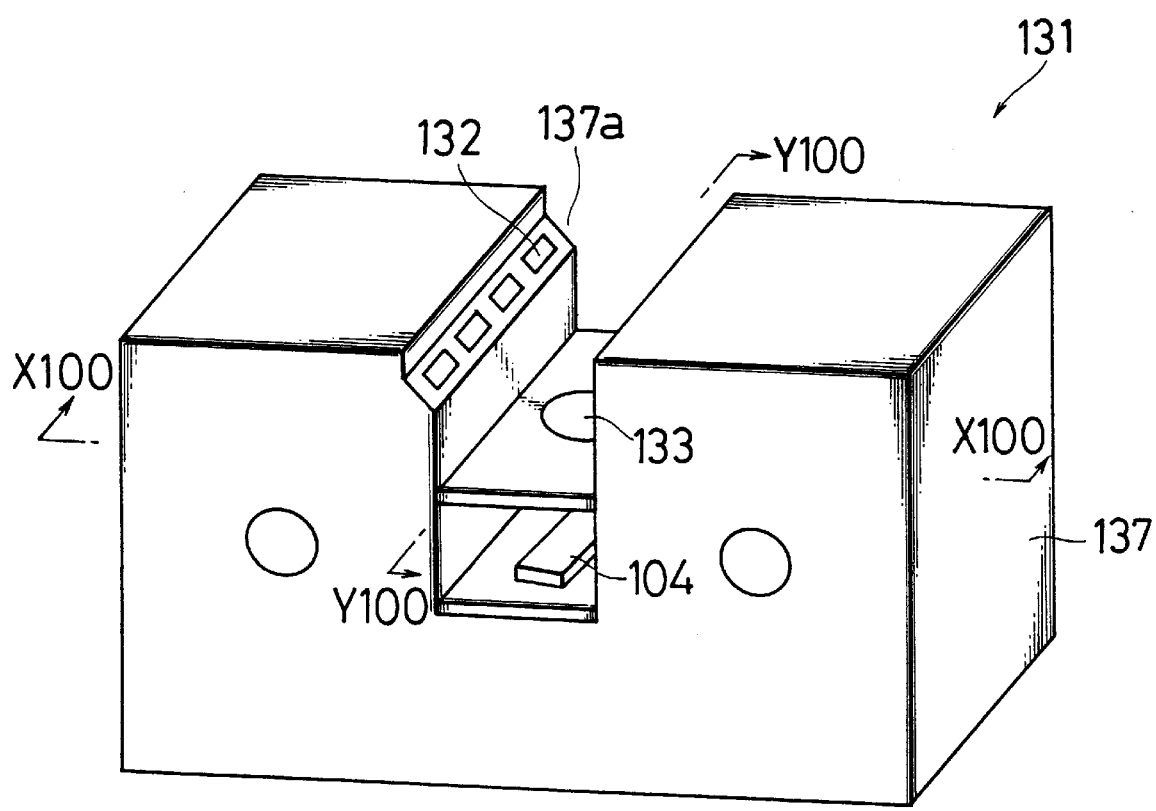
FIG. 1 is a perspective view of an image scanner 131 of a first embodiment of the invention.

Now referring to the drawings, preferred embodiments of the invention are described below.

Figure 2:
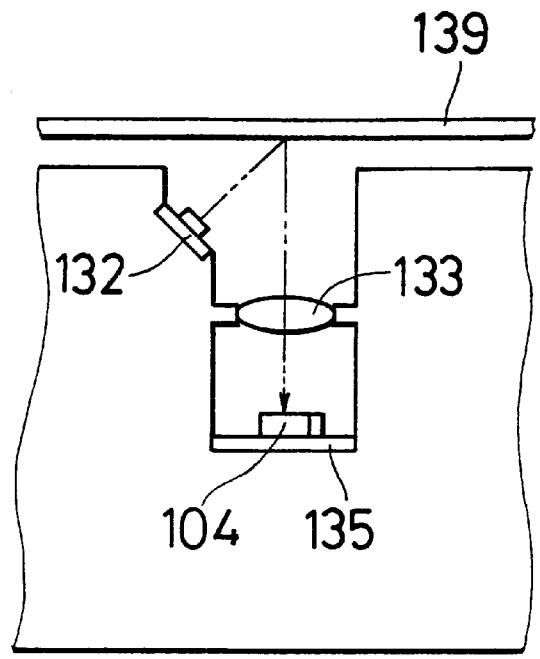
FIG. 2 is a partial sectional view taken along line X100—X100 of the image scanner 131 of FIG. 1.
Figure 3:
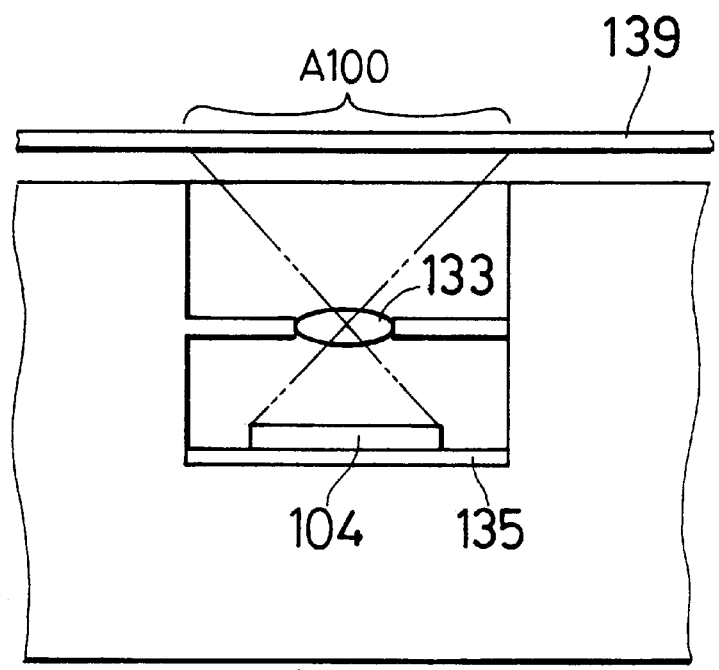
FIG. 3 is a partial sectional view taken along line Y100—Y100 of the image scanner 131 of FIG. 1.

FIG. 1 is a perspective view of an image scanner 131 of a first embodiment of the invention. FIG. 2 is a partial sectional view along section line X100—X100, and FIG. 3 is a partial sectional view along section line Y100—Y100 of FIG. 1. The image scanner 131 comprises a light source 132 such as plural LEDs (light emitting diodes) for illuminating an original 139 which is an object to be detected, a lens 133 disposed for imaging reflected light from the original 139 and forming an original image, a semiconductor integrated circuit possessing multiple photoelectric conversion elements disposed for receiving the original image, and a substrate 135 on which the semiconductor integrated circuit 104 is fixed.

The light emitted from the light source 132 illuminates the original 139 from an oblique direction, and the reflected light from the original 139 focuses the image of a block A100 on the original by the lens 133, and by sequentially scanning the plural photoelectric conversion elements disposed on the semiconductor integrated circuit 135 principally, the read signals corresponding to the image information of the original 139 are produced in time series. A casing 137 for holding the lens 133, semiconductor integrated circuit 104 and others is provided with light shielding plates 137a on both sides to prevent external light scattering. One light shielding plate 137a is not shown.

Figure 4:
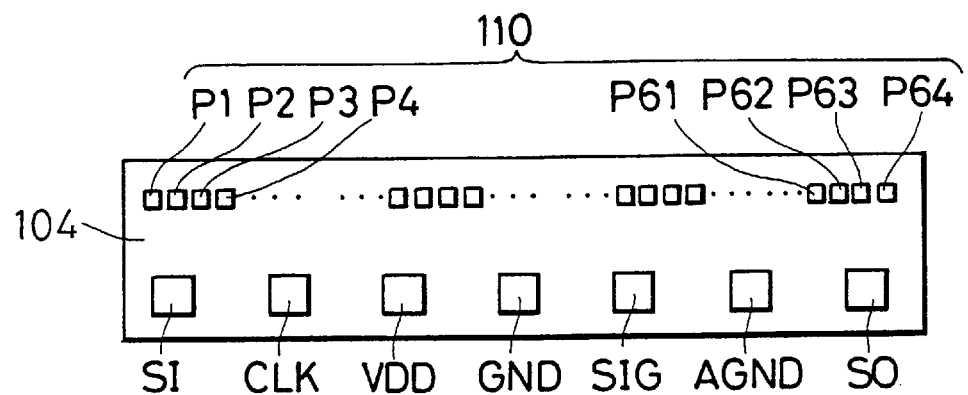
FIG. 4 is a partially magnified view of the semiconductor integrated circuit 104 shown in FIGS. 1 to 3.

FIG. 4 is a partially magnified view of the semiconductor integrated circuit 104 shown in FIGS. 1–3. The semiconductor integrated circuit 104 comprises a photoreceptor surface 110 consisting of 64 photoelectric conversion elements P1–P64, a terminal SO for issuing a scanning end signal, a terminal CLK for receiving a scanning block signal, a terminal VDD for connecting a power source, a grounding terminal GND, a terminal SIG for issuing a read signal, a grounding terminal AGND for an analog circuit, and a terminal SI for receiving a scanning start signal.

When scanning the original 139, a scan start signal is inputted into the terminal SI of the semiconductor integrated circuit 104, and 64 photoelectric conversion elements P1–P64 are scanned, and read signals are sequentially outputted from the terminal SIG, and a scanning end signal is outputted from the terminal SO, and read signals of one scanning line of the original 139 are outputted in series.

Figure 5:
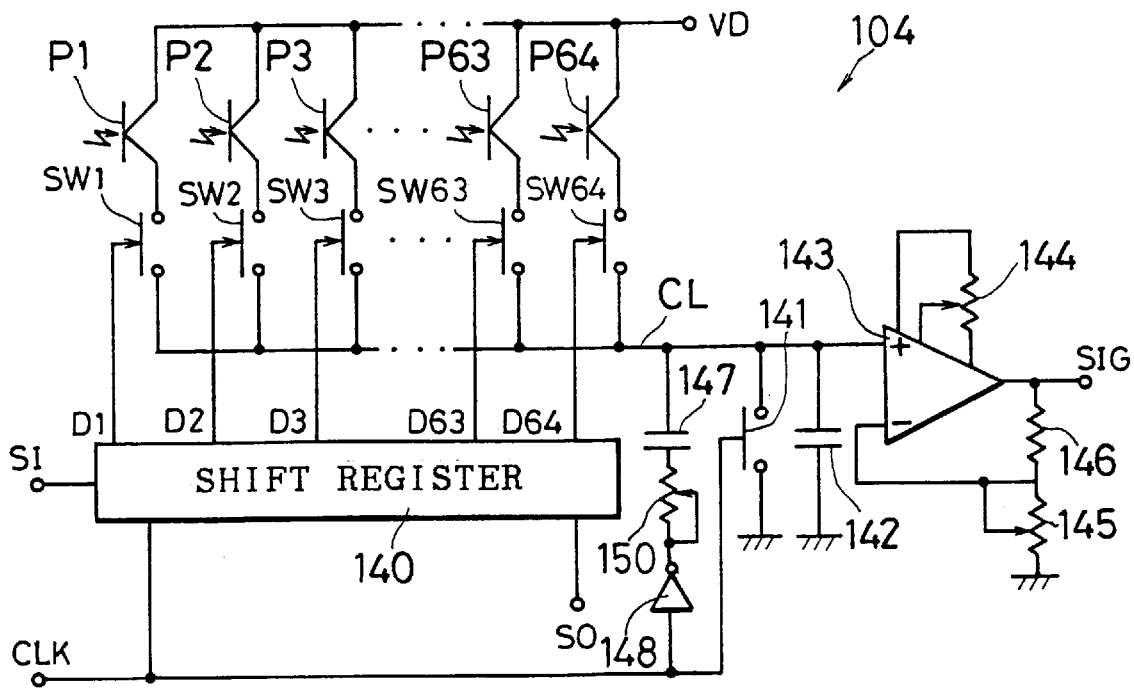
FIG. 5 is a circuit diagram showing an electric configuration of the semiconductor integrated circuit 104 shown in FIG. 4.

FIG. 5 is a circuit diagram showing an electric configuration of the semiconductor integrated circuit 104 shown in FIG. 4. The semiconductor integrated circuit 104 comprises plural photoelectric conversion elements P1–P64 such as photo transistors and photo diodes, a common signal line CL commonly connecting the outputs from the photoelectric conversion elements P1–P64, plural switching elements SW1–SW64 such as transistors and analog switches interposed between the photoelectric conversion elements P1–P64 and the common signal line CL, and a shift register 140 which is a scanning circuit for sequentially driving the switching elements SW1–SW64, and the common signal line CL is further connected in series with a capacitor 142 for an integrator, a switching element 141 for setting the potential in the blanking period when a no read signal is outputted to the ground potential by force, an inverter and a capacitor 147 for capacitive coupling of a signal in reverse phase with the clock signal CLK which may be a main noise source, and the signal transmitted along the common signal line CL is fed into a non-inverting amplifier composed of an operational amplifier 143, and resistances 145, 146. By adjusting the resistance 145, the degree of amplification of the non-inverting amplifier can be adjusted.

The operation of the constitution is described below while referring to the timing chart in FIG. 6. The reflected light from the original 139 is focused by the lens 133, and is received in the photoelectric conversion elements P1–P64 of the semiconductor integrated circuit 104, when a photoelectromotive force corresponding to the quantity of light received is generated. On the other hand, when a scanning start signal SI is entered in the shift register 140, the rise of the clock is detected in synchronism with the clock signal CLK, and pulse signals D1–D64 are outputted, and the switching elements SW1–SW64 are sequentially made to conduct. Consequently, electric signals corresponding to the photoelectromotive force generated in the photoelectric conversion elements P1–P64 are outputted into the common signal line CL in time series, and amplified to a specific level by the operational amplifier 143, and produced as read signals SIG as shown in FIG. 6(E). The blanking period when the clock signal CLK is at high level is set at the grounding potential of 0 V due to conduction of the switching element 141.

This image scanner 131 is installed instead of an ink ribbon cassette 191 of a printer mechanism 102 of a word processor 111 as shown in FIG. 7, and is electrically connected with the main body of the word processor 111, and reads the original. That is, the printer mechanism 102 of the word processor 111 is normally used as the printer, but by replacing the ink ribbon cassette with the image scanner 131, it is used as an image scanner as the original set in the word processor 11 can be read while the image scanner 131 is moving in the direction M100. The image information read by the image scanner 131 is sent to the main body of the word processor 111. Besides, the dimensions of the image scanner 131 are smaller than those of the cassette 191, and electronic circuit boards including an TIC for signal amplification, a part of driving circuit, a level adjusting trimmer, and the like are accommodated in the cassette 191.

Figure 8:
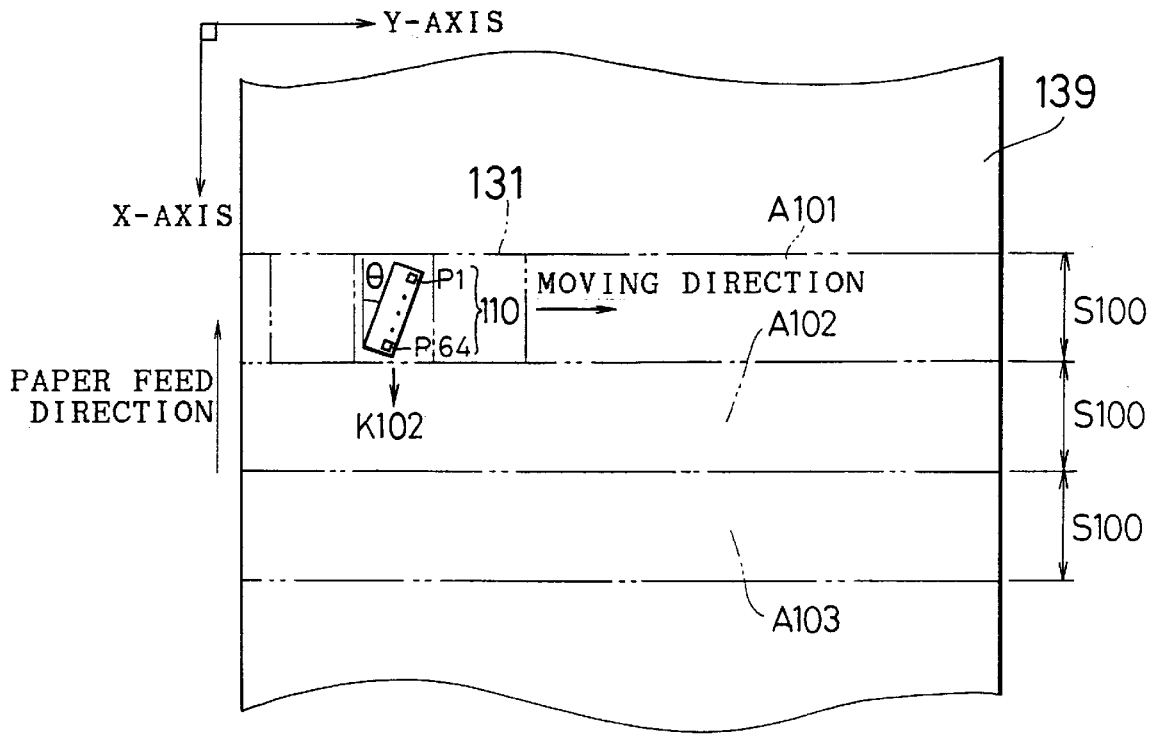
FIG. 8 is a view for explaining reading an original by the image scanner 131 installed wordprocessor 111.

In this way, by installing the image scanner 131 in the word processor 111, as shown in FIG. 8, the image scanner 131 moves parallel to the y-axis and reads the image information of block A101 of the original 139 while repeating sequential scanning in the x-axis direction of the image information on the original set in the word processor 111 by the photoelectric conversion elements P1–P64 on the photoreceptor 110. The width S100 of the block A101 is the length of the region read by the photoelectric conversion elements P1–P64, which corresponds to 64 pixels. Next, the original 139 is fed by a pitch S in the x-axis direction, and the image scanner 131 repeats the above action, and reads the information of block A102 of the original 139. The image scanner 131 repeats such action sequentially, and reads the image information of the original 139 sequentially in each block.

Figure 9:
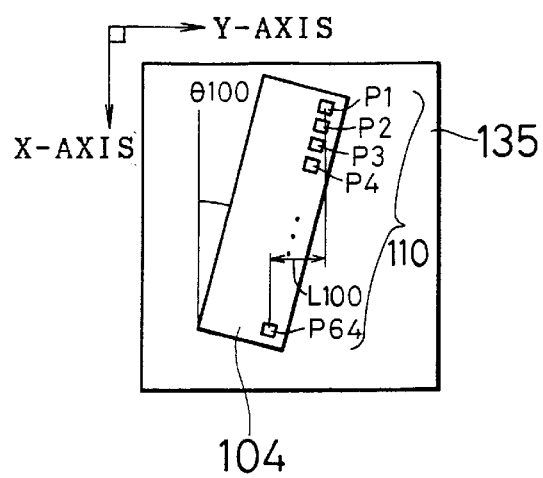
FIG. 9 is a plan view of a semiconductor integrated circuit 104 to be disposed on a substrate 135.

What is of note here is that, as shown in FIG. 9, the final (64th) photoelectric conversion element P64 is mounted on the board 135 of the image scanner 131, by deviating the pixel size L100 of the subscanning direction in the y-axis direction, in relation to the initial (first) photoelectric conversion element P1 which is mounted on the semiconductor integrated circuit 104. This pixel size L100 is the product of the moving speed v of the image scanner in the y-axis (subscanning) direction of the image scanner and the reading period T of each photoelectric conversion element, that is, the time from the start of reading by the photoelectric conversion element P1 until the end of reading by the photoelectric conversion element P64. At this time, as shown in FIG. 9, the photoreceptor 110 of the semiconductor integrated circuit 104 is inclined to the x-axis by an angle θ 100.

Figure 10:
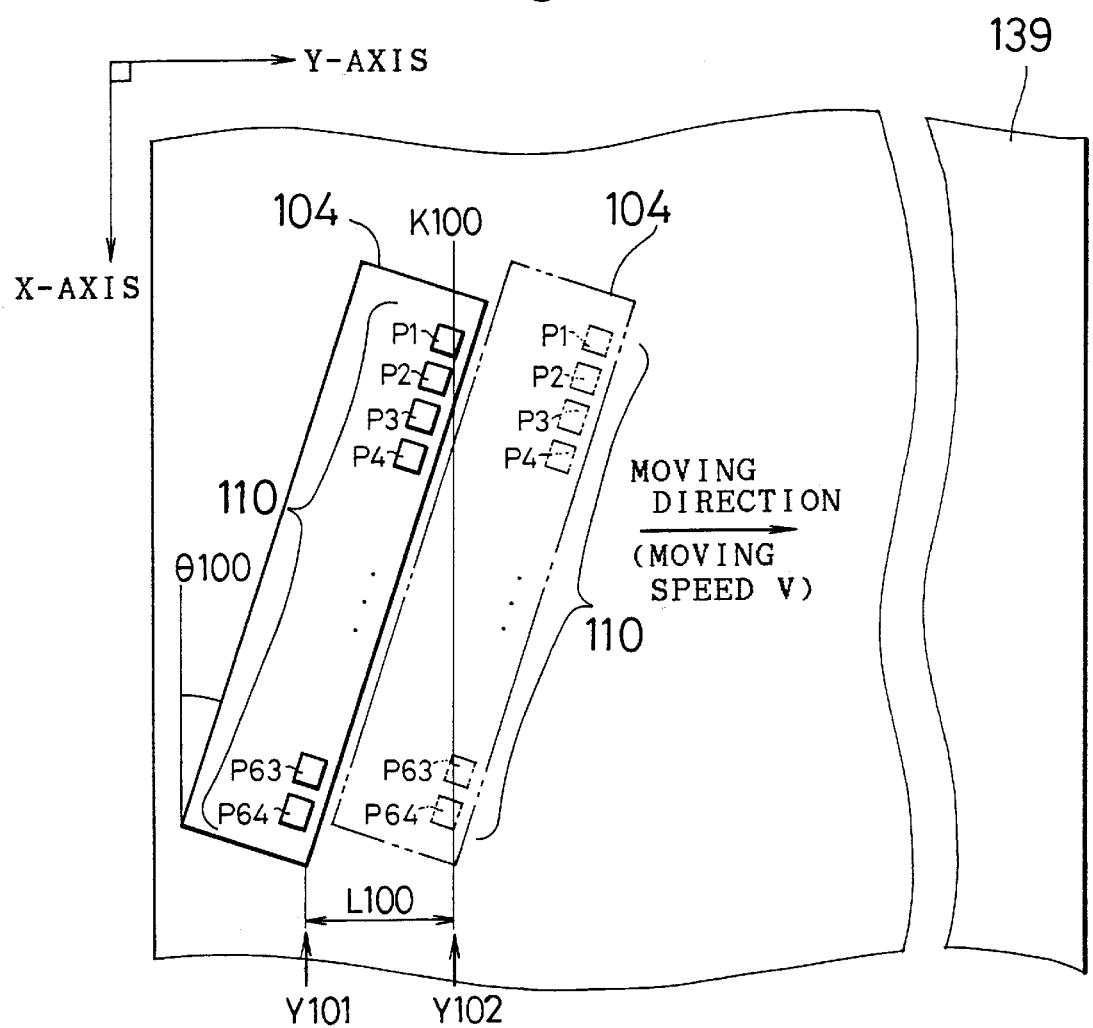
FIG. 10 is a view for explaining reading a line K100 on the original 139 by the image scanner 131.

Next, as shown in FIG. 9, the semiconductor integrated circuit 104 is mounted on the board 135 of the image scanner 131 so that the photoreceptor 110 of the semiconductor integrated circuit 104 may be inclined to the x-axis by an angle θ 100, and the image scanner 131 performs mainscanning while a moving at moving speed v in the y-axis direction, and as shown in FIG. 10, reading of a straight line K100 parallel to the x-axis on the original 139 is explained below. At this time, supposing the position of the semiconductor integrated circuit 104 to be Y101 when the photoelectric conversion element P1 of the semiconductor integrated circuit 104 is reading the straight line K100, the position of the semiconductor integrated circuit 104 when the photoelectric conversion element P64 of the semiconductor integrated circuit 104 is reading the straight line K100 in the same scanning is Y102, being deviated from the position Y101 by the pixel size L100 in the y-axis direction. Therefore, all photoelectric conversion elements P1–P64 of the semiconductor integrated circuit 104 can read the straight line K100 at the same y-coordinate. That is, the image scanner 131 can read the straight light K100 as a straight line parallel to the x-axis. As a result, this image scanner 131 can move at the moving speed v in the y-axis (subscanning) direction vertical to the x-axis while mainscanning principally parallel to the x-axis.

Figure 11:
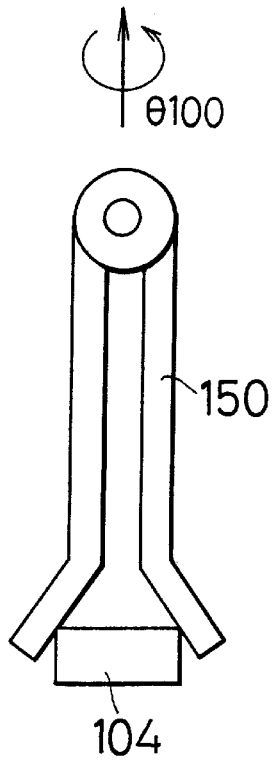
FIG. 11 is a view showing an adsorption collet 150 in a state of holding the semiconductor integrated circuit 104.
Figure 12:
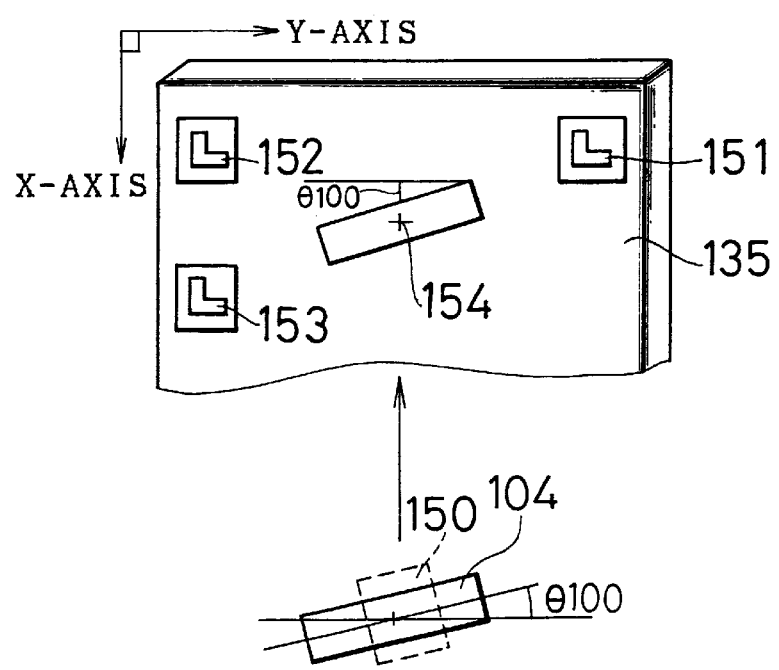
FIG. 12 is a view for explaining mounting the semiconductor integrated circuit 104 on target coordinates 154.

Explained next is a method of mounting the semiconductor integrated circuit 104 on the board 135 of the image scanner 131 with reference to FIG. 11 and FIG. 12. The mounting device of the semiconductor integrated circuit 104 grips the semiconductor integrated circuit 104 by a suction collet 150 preliminarily rotated by the angle θ 100 as shown in FIG. 11. As a result, as shown in FIG. 12, the semiconductor integrated circuit 104 gripped by the suction collet 150 is inclined to the y-axis by the angle θ 100.

In consequence, the mounting device mounts the semiconductor integrated circuit 104 on the mounting target coordinates 154, while positioning precisely by reference to image recognition markers 151 to 153 by using CCD camera.

The semiconductor integrated circuit 104 mounted on the board 135 is observed by a tool maker's microscope in a later process to see if mounted on the mounting target coordinates 154 or not, and if not mounted on the mounting target coordinates, it is put on the target coordinates 154 again by the mounting device.

Figure 13:
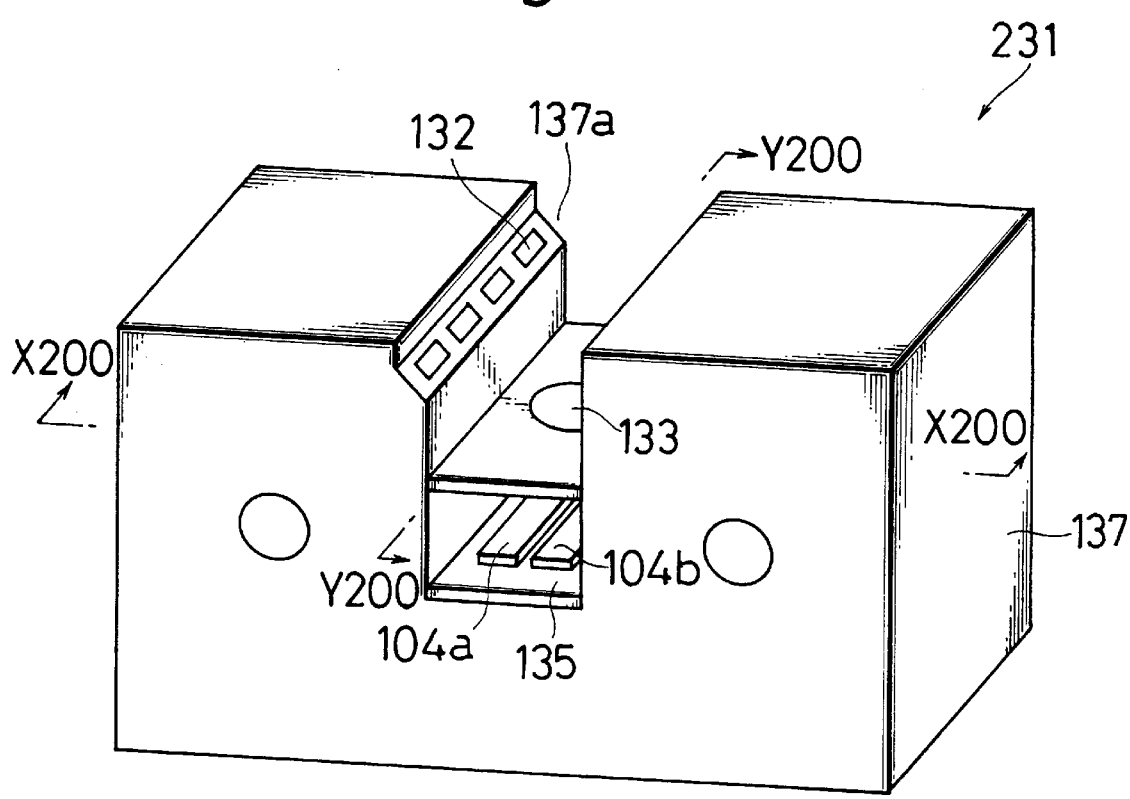
FIG. 13 is a perspective view of an image scanner 23 of a second embodiment of the invention.
Figure 14:
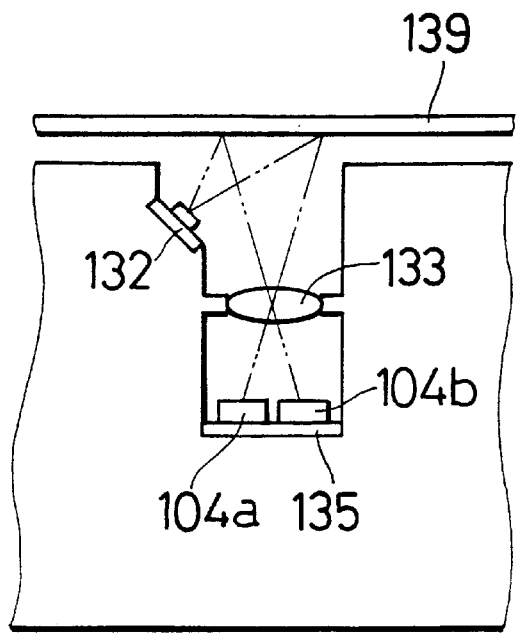
FIG. 14 is a partial sectional view taken along line X200—X200 of FIG. 13.
Figure 15:
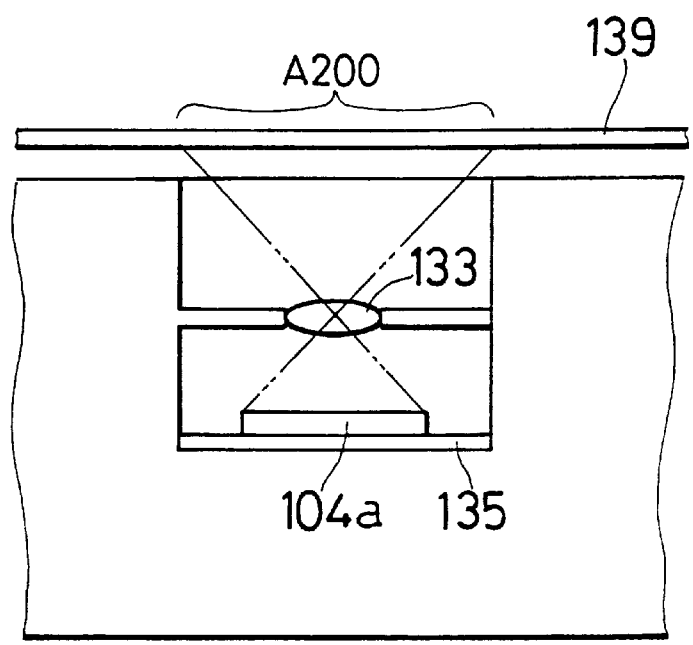
FIG. 15 is a partial sectional view taken along line Y200—Y200 of FIG. 13.

FIG. 13 is a perspective view of an image scanner 231 of a second embodiment of the invention, FIG. 14 is a partial sectional view taken along line X200—X200 of FIG. 13, and FIG. 15 is a partial sectional view taken along line Y200—Y200 of FIG. 13. In FIGS. 13–15, the parts corresponding or similar to those in FIGS. 1 to 12 are identified with the same reference numerals. What is characteristic of the image scanner 231 is that the image scanner 231 is provided with a pair of semiconductor integrated circuits 104a, 104b disposed parallel to each other instead of the semiconductor integrated circuit 104 in the image scanner 131. The electric configuration of the semiconductor integrated circuits 104a, 104b is same as the electrical configuration of the semiconductor integrated circuit 104 in FIG. 5, and the semiconductor integrated circuits 104a, 104b operate based on the signals as shown in FIG. 6. Each of the semiconductor integrated circuits 104a, 104b is provided with 64 photoelectric conversion elements P1–P64, the same as the semiconductor integrated circuit 104.

As shown in FIG. 14, the semiconductor integrated circuits 104a, 104b are individually deviated from the optical axis of the lens 133. Deviation of such degree, however, will not cause distortion on the image or lower the resolution practically.

The sizes of each photoelectric conversion element P are 34 µm in the principal scanning direction, and 50 µm in the subscanning direction, and the interval between the adjacent elements is 16 µm. The pitch of the adjacent photoelectric conversion elements P is 50 µm. Each photoelectric conversion element P is composed of a photo transistor. The spacing between the adjacent photoelectric conversion elements serves as a channel stopper region so that photo current may not flow into the adjacent one. By using a photo transistor in such structure, since this channel stopper region does not read image information and hence lowers the resolution, but since the photoelectric conversion element P is used in combination with a convex lens with a reduction rate of 1/2.5, the sizes s of 50×34 µm of the photoelectric conversion element corresponds to 125×85 µm on the original. Besides, by using the convex lens and semiconductor integrated circuit by 1:1, a resolution of 8 dots/mm is obtained.

Figure 16:
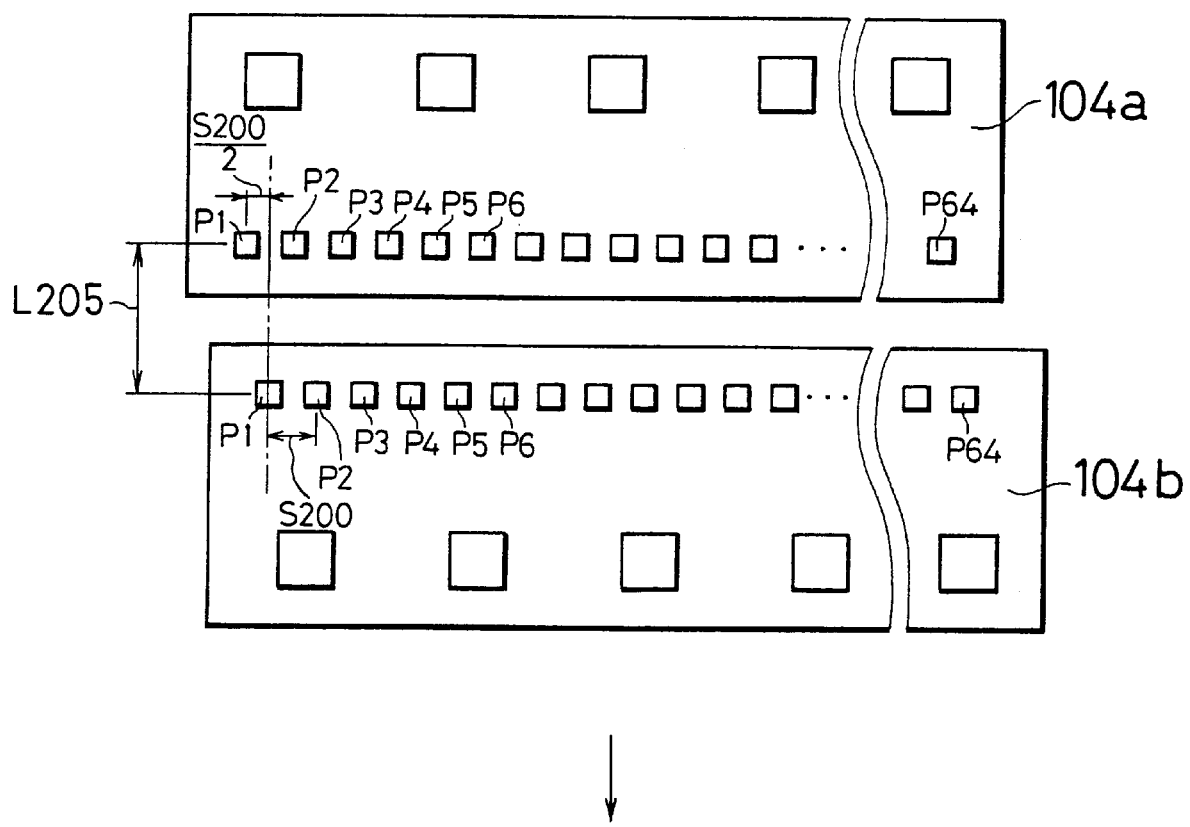
FIG. 16 is a plan view of the semiconductor integrated circuits 104a, 104b of FIGS. 13–15.

FIG. 16 is a plan view of the semiconductor integrated circuits 104a, 104b shown of FIGS. 13–15. As shown in FIG. 16, the semiconductor integrated circuit 104a and semiconductor integrated circuit 104b are disposed back to back in the main-scanning direction so that the corresponding photoelectric conversion elements P1–P64 are parallel to each other, and the semiconductor integrated circuit 104a is deviated from the semiconductor integrated circuit 104b by 1/2 of the pitch S200 of the photoelectric conversion element in the main-scanning direction. Incidentally, the interval L205 of the photoelectric conversion element P of the semiconductor integrated circuit 104a and the photoelectric conversion element of the semiconductor integrated circuit 104b is 250 µm, five times the photoelectric conversion element size of 50 µm in the subscanning direction, which corresponds to five pixels.

By the image scanner 231 having the semiconductor integrated circuits 104a, 104b disposed as shown in FIG. 16, the operation of reading the original 250 shown in FIG. 17 (A) in the subscanning direction M210 will be described. Each region a (representing a11, a12, a13, . . . ) of the original 250 is equivalent to a pixel corresponding to a photoelectric conversion element P. Therefore, in the first scanning, the semiconductor integrated circuit 104a reads regions a11, a13, a15, . . . on the original, and the read image data is stored in the memory 251 shown in FIG. 17 (B). The image data of region an is supposed to be an'. Simultaneously, the semiconductor integrated circuit 104b reads regions a62, a64, a68, . . . on the original deviated from the region being read by the semiconductor integrated circuit 104a by about one pixel in the main-scanning direction, and by five pixels in the subscanning direction, and the read image data is stored in a memory 252 shown in FIG. 17 (C). Similarly, thereafter, the semiconductor integrated circuit 104a stores the image data read in each scanning into the memory 251 as shown in FIG. 17(B), and the semiconductor integrated circuit 104b stores the data read in each scanning into the memory 252 as shown in FIG. 17(C).

In this case, synthesizing according to the image data of the memory 251 and memory 252, the data of memory 253 shown in FIG. 17(D) is obtained. As shown in this memory 253, the image data synthesizing the image data read by the sixth scanning of the semiconductor integrated circuit 104a and the image data read by the first scanning of the semiconductor integrated circuit 104a is an image data on the same line, corresponding to the image data with a resolution of 16 dots/mm, and the resolution is twice as high as that of the prior art.

Likewise, thereafter, by sequentially synthesizing the image data read by the seventh scanning or a scanning after the seventh of the semiconductor integrated circuit 104a and the image data read by the second scanning or a scanning after the second of the semiconductor integrated circuit 104b, the image data of 16 dots/mm can be obtained sequentially. Herein, the semiconductor integrated circuit 104a and semiconductor integrated circuit 104b are independent of the driving circuit from each other, and each can simultaneously read in the principal scanning direction by the individual photoelectric conversion elements P. Hence, the resolution is enhanced, while the reading speed is not lowered.

As shown in FIG. 16, it is ideal that, by deviating the semiconductor integrated circuit 104a and semiconductor integrated circuit 104b from each other, the reading region of the semiconductor integrated circuit 104b corresponds to the image region which cannot be read by the semiconductor integrated circuit 104a. Actually, however, the image region that cannot be read by the semiconductor integrated circuit 104a corresponds to a width of 40 µm on the original, and it is read the semiconductor integrated circuit 104b reads over a region of a width of 85 µm including the above region. Therefore, in both semiconductor integrated circuits, there is a region on the original which is twice read by both the semiconductor integrated circuits, and the resolution in the main-scanning direction is not exactly twice that of one array of photoelectric conversion elements. Practically, however, the resolution can be sufficiently enhanced by this method.

Besides, as shown in FIG. 16, the interval L205 of the photoelectric conversion element P of the semiconductor integrated circuit 104a and the photoelectric conversion element P of the semiconductor integrated circuit 104b is five times the photoelectric conversion element size of 50 µm in the subscanning direction, but the interval L205 is preferred to be 5 to 7 times the photoelectric conversion element size. This is because, if less than 4 times, the semiconductor integrated circuits are too close to each other and it is physically impossible to dispose, and if more than 8 times, the resolution is lowered because the optical path passes through the peripheral part of the lens.

In this embodiment, the reduction ratio is 1/2.5, but if the same lenses and same photoelectric conversion elements are used and a reduction rate of 1/1.25 is applied, reading of 16 dots/mm is possible with only one row of photoelectric conversion elements. In this case, however, since the quantity of light entering per element decreases, the sensitivity of the photoelectric conversion element is lowered. To compensate for the lowering of sensitivity, it is necessary to intensify the light quantity of the light source. That leads to increase of current consumption, and goes against the power saving policy of the image scanner. Contrarily, if the reduction rate is too large, high resolution is not expected. Accordingly, in order to obtain a sufficient sensitivity without increasing the current consumption of the light source, the reduction ratio is preferred to be in a range of 1/2 to 1/3.

Although the first and second embodiments relate to the image scanner comprising the semiconductor integrated circuit 104 or the pair of semiconductor integrated circuits 104a, 104b, and a single lens, a line type image scanner comprising plural lenses and multiple semiconductor integrated circuits may be also used. Or, as other optical systems, for example, a seltoc lens array (SLA) or half-mirror lens array may be used.

Figure 18:
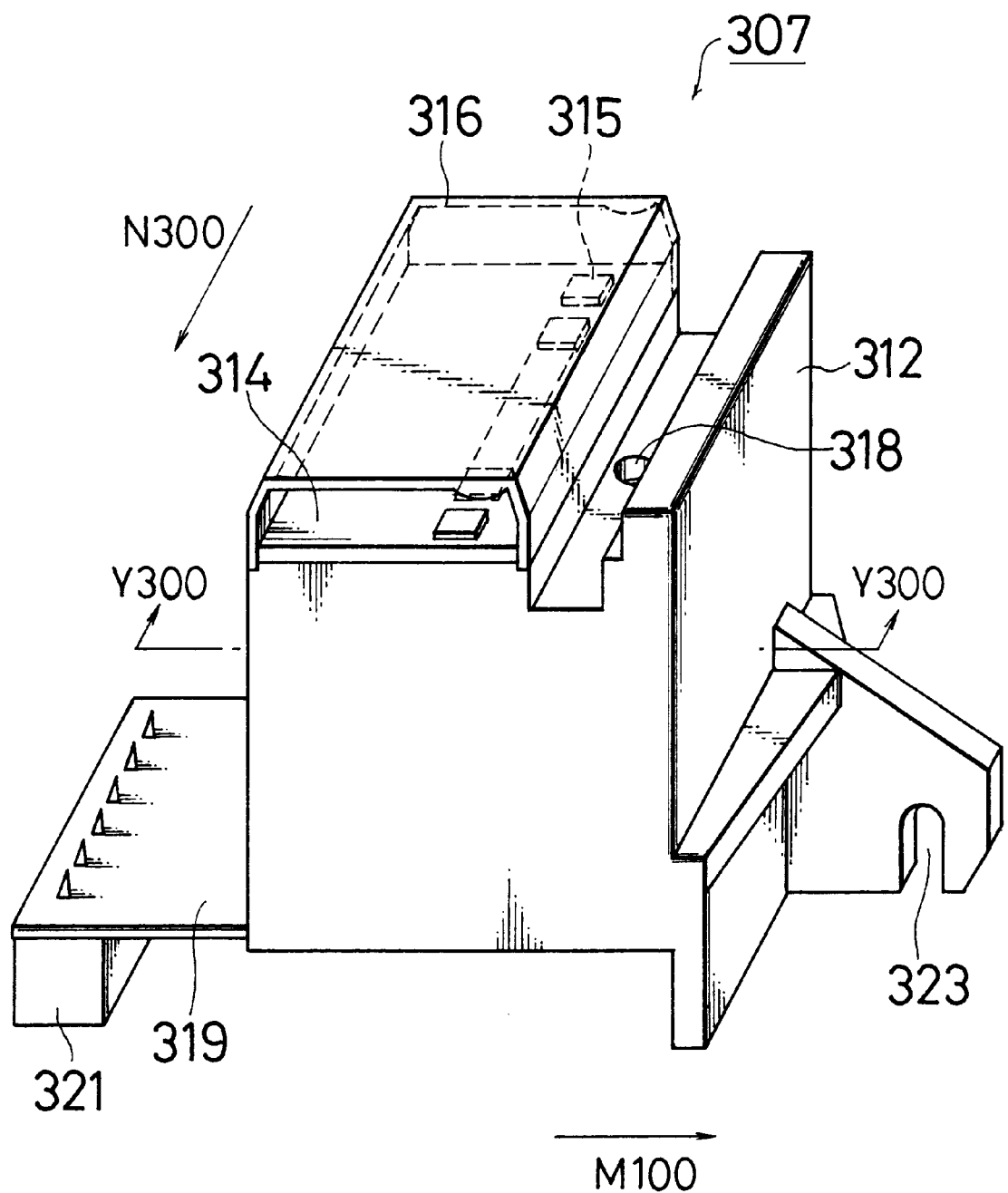
FIG. 18 is a perspective view of an image scanner 307 of a third embodiment of the invention.
Figure 19:
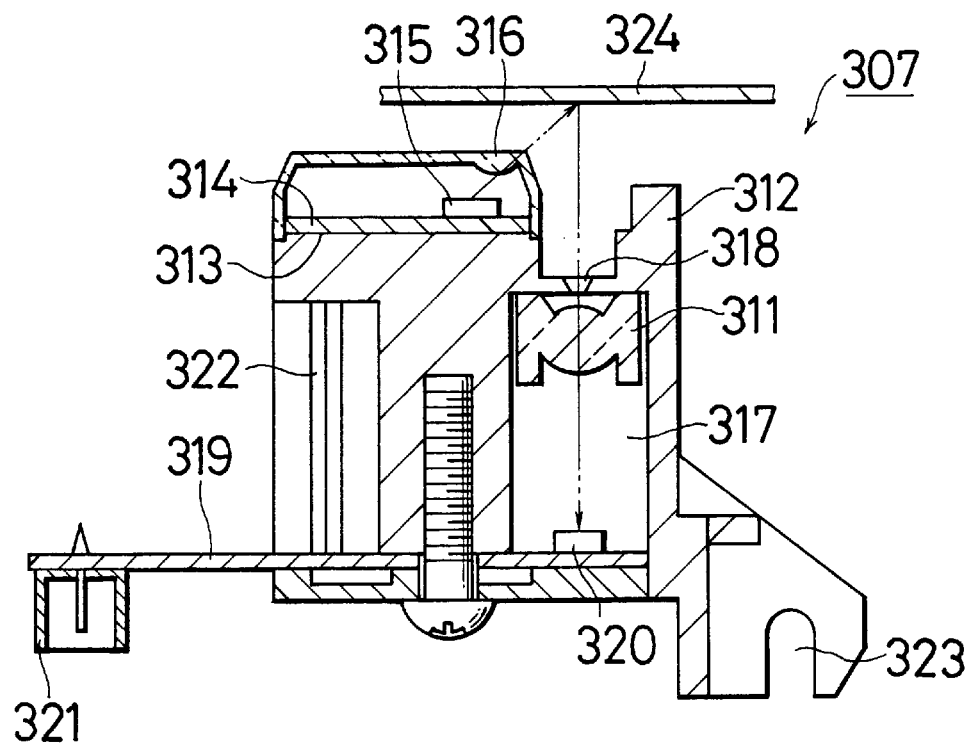
FIG. 19 is a sectional view of the image scanner 307.
Figure 20:
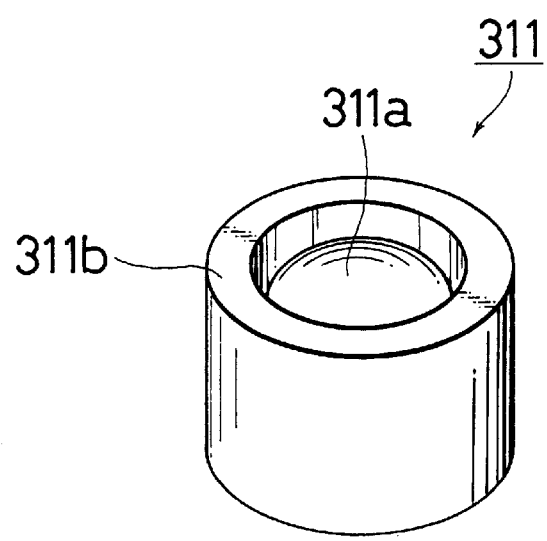
FIG. 20 is a perspective view of a lens 311 provided in the image scanner 307.

FIG. 18 is a perspective view showing the constitution of an image scanner 307 as a third embodiment of the invention, FIG. 19 is a schematic sectional view taken along line Y300—Y300 of FIG. 18, and FIG. 20 is an appearance drawing of a light transmitting plastic lens 311 made of, for example, an acrylic resin.

In these diagrams, reference numeral 312 is a long plastic casing made of a glass fiber reinforced polycarbonate or ABS resin, in which a light source mounting slope 313 is formed. Additionally, a LED mounting board 314 is disposed on the light source mounting slope 313. Four LEDs 315 are disposed on the board 314, and a light transmitting plastic protective cover 316 made of polycarbonate is provided on these LEDs 315. In this protective cover 316, a longitudinal convex lens 316 is formed along the array of the LEDs 315.

Inside the casing 312, a concave 317 is formed, and a nearly circular hole 318 is formed in the deepest portion of the concave part 317. Confronting this hole 318, the lens 311 in FIG. 20 is fixed to the casing 312. The principal portion of the lens 311 is of nearly cylindrical form the middle portion of which is a convex lens 311a, all around which a tubular flange 311b is formed.

On the opening surface of the concave 317, an electrical insulating substrate 319 is disposed. A semiconductor integrated circuit 320 is disposed on the electrical insulating substrate 319. The semiconductor integrated circuit 320 possesses multiple photoelectric conversion elements on its top surface, which are fabricated on the top of a semiconductor chip made of silicon or the like by the hitherto known photolithography, ion beam processing or other technologies.

The electrical insulating substrate 319 is composed of, for example, a glass epoxy resin, and possesses a specific conductor pattern (not shown) made of copper and the like on its top surface, and each of electrodes of the semiconductor integrated circuit 320 is electrically connected to a part of the conductor pattern through a bonding wire or the like. Also on the back side of the electric insulating substrate 319, a conductor pattern is formed, and additionally a chip register, a chip capacitor and the like are electrically connected on the back conductor pattern by reflow soldering. Reference numeral 321 is a connector for connecting with the driving circuit. On the electric insulating substrate 319, an electrode pattern for emitting light for the LEDs 315 is also formed, and 322 indicates a lead for connecting the electrode pattern and the LEDs 315.

Furthermore, the image scanner 307 is installed in the word processor 111 shown in FIG. 7, the same as the foregoing image scanner 131, and a mounting hole 323 is formed in the casing 312, and the image scanner is installed in a cassette 131 through this mounting hole 323.

Referring to FIG. 7, when installing the image scanner 307 of such constitution in the word processor 111, it is also possible to fit the mounting hole 323 of the image scanner 307 to the positioning pin provided on the moving stage of the word processor 111 (the table on which the cassette 191 having the image scanner 307 and ink ribbon are to be mounted and mechanically clip). When disposing in such manner, the disposing direction of the image scanner 307 is set as shown in FIG. 18, with respect to the M100 direction shown in FIG. 7.

In thus constituted image sensor 307, the original 324 is fed in the N300 direction as shown in FIG. 18. Along with this feed of the original, light is illuminated in a line by the four LEDs 315, and while condensing the light by the convex lens 316, the light is also illuminated to the original 324 in a line. The reflected light is passed through the lens 311 through the hole 318, and is focused along the array of the multiple photoelectric conversion elements of the semiconductor integrated circuit 320.

In this way, the image scanner 307 is installed in the word processor 111, and the original 324 is inserted. When the original 324 is sent out, the image scanner 307 is scanned simultaneously in the M100 direction. By the reading optical system comprising LEDs 315, a convex lens 316, and a semiconductor integrated circuit 320, the original information is converted into electric signals, and the signals are further sent to the main body of the word processor 111. In this embodiment, the original 324 does not contact with the image scanner 307, but the same effects are obtained if they contact.

Ultrasonic fusion of lens 311 on casing 312

Figure 21:
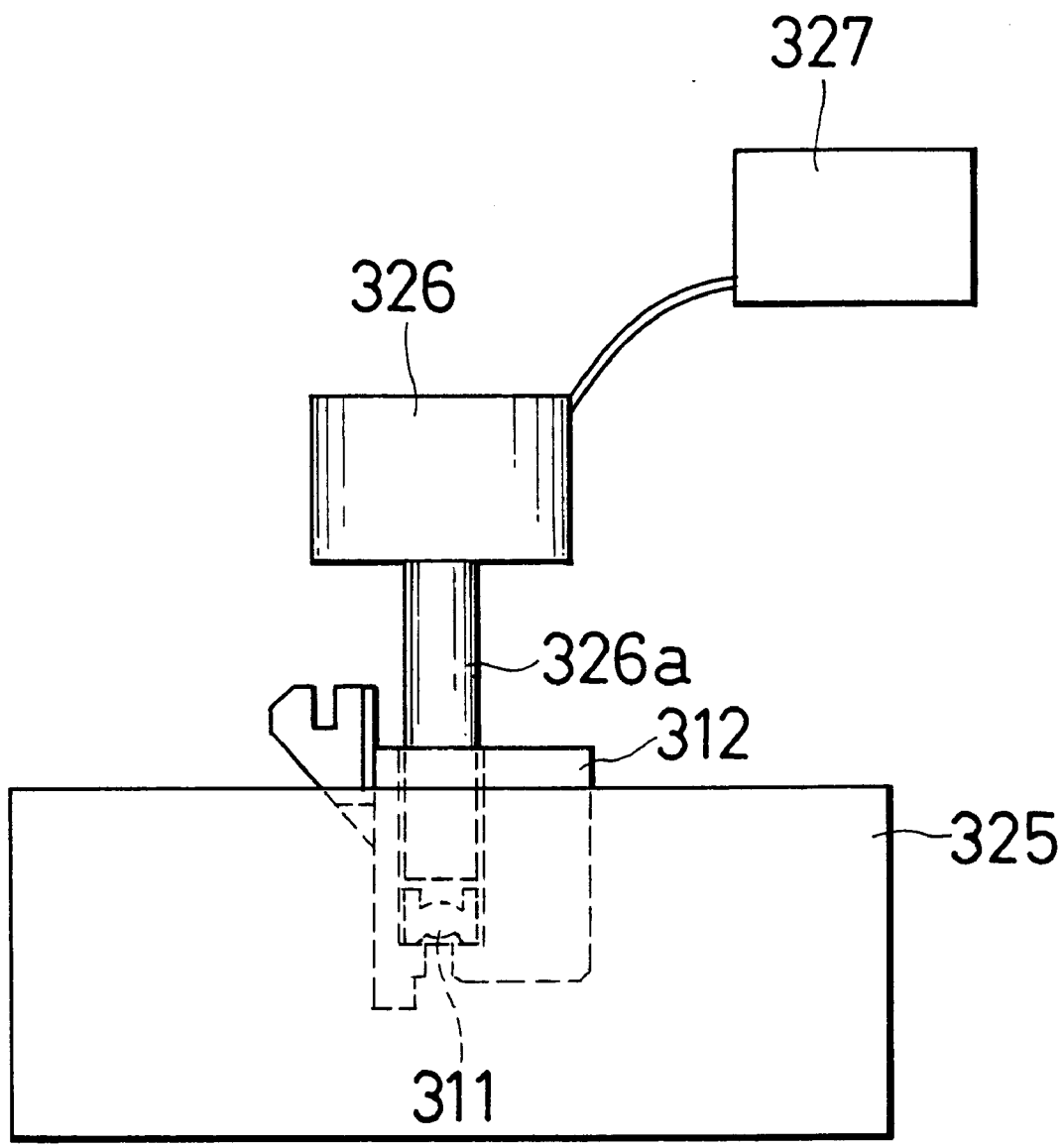
FIG. 21 is a view illustrating ultrasonic fusion of the lens 311.
Figure 22:
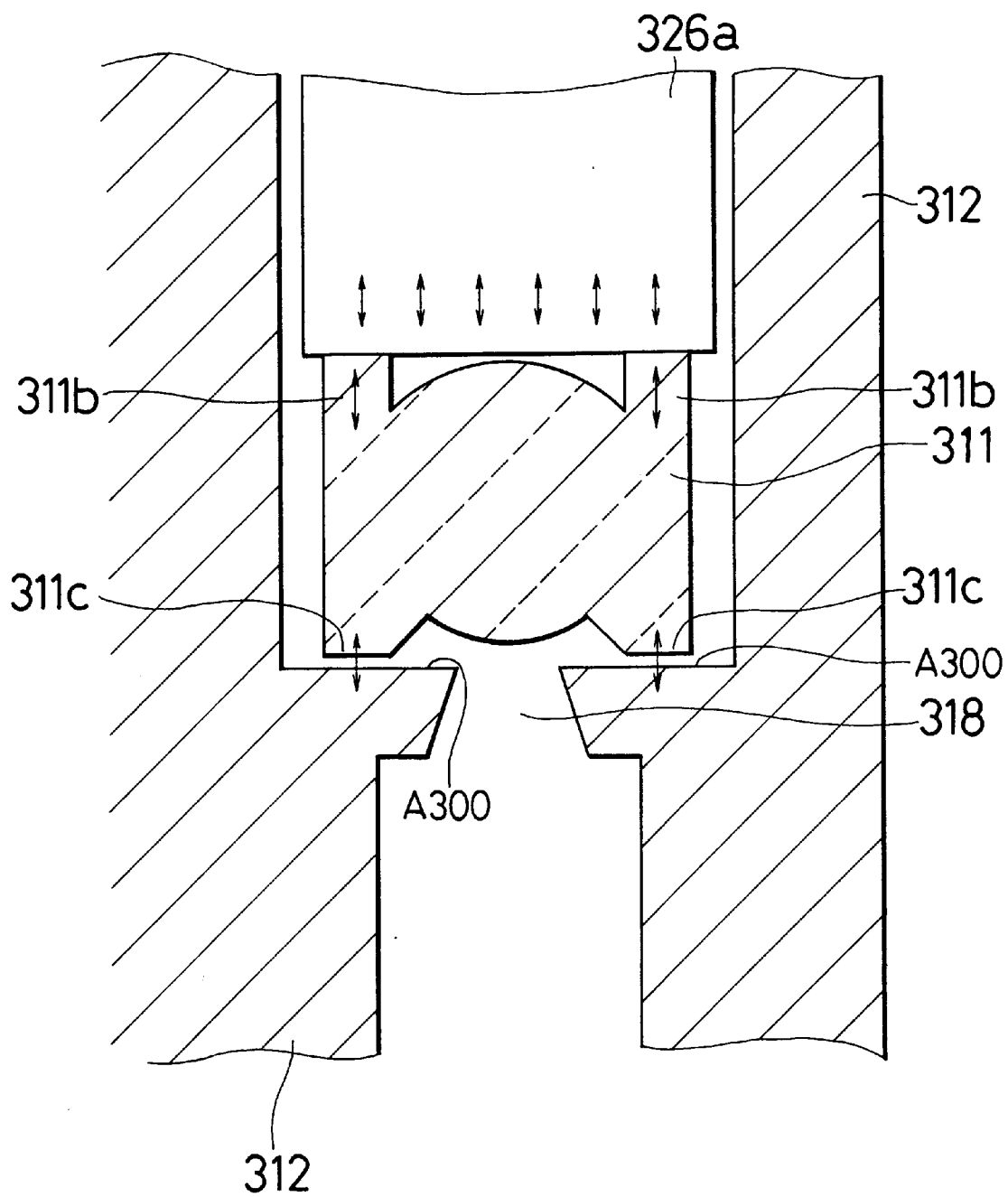
FIG. 22 is a sectional view showing ultrasonic fusion of the lens 311.

FIG. 21 and FIG. 22 show a fixing method of the lens 311, and FIG. 21 shows a step of ultrasonic fusion of the lens 311, and FIG. 22 is a magnified sectional view of essential parts of the image scanner 307 in the fusion step. In these diagrams, the same parts as those shown in FIGS. 18 to 21 are identified with the same reference numerals.

In FIG. 21, reference numeral 325 indicates a metal receiving jig (anvil) possessing a dent corresponding to the casing 312, and the casing 312 is inserted into the dent of the receiving jig 325, and an ultrasonic oscillator 326 is put on the lens 311 while applying a pressure, and then ultrasonic fusion is carried out. This series of operations is effected by a control unit 327. The ultrasonic oscillator 326 is provided with a columnar metal horn 326a, and the metal horn 326a abuts against the flange 311b of the lens 311 as shown in FIG. 22. The time required for the series of operations is 2 seconds or less per cycle. Such a high speed is realized and mass producibility is excellent.

Besides, as shown in FIG. 22, the ultrasonic vibration generated by the ultrasonic oscillator 326 vibrates the bottom 311c of the lens 311 and the corresponding side A of the casing 312 through the flange 311b, and the both are heated by adiabatic compression, and the plastic portion of the bottom 311c and the plastic portion of side A300 part are fused, so that the lens 311 may be firmly bonded to the casing 312.

Adhesive fixing method of lens 311 to casing 312

Figure 23:
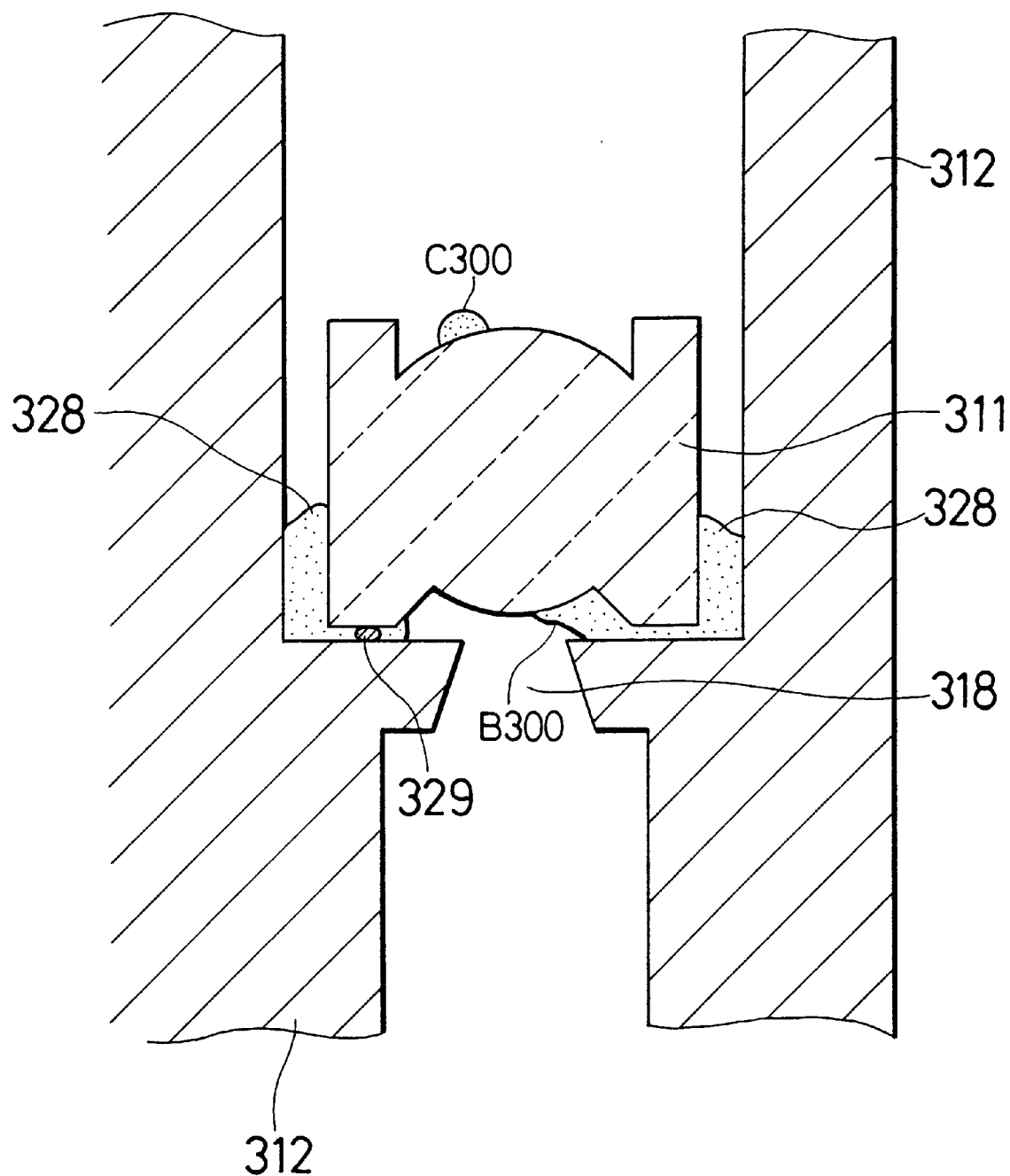
FIG. 23 is a sectional view illustrating adhesive fixing of the lens 311.

FIG. 23 is a partial sectional view of the image scanner 307, in which the lens 311 is fixed to the casing 312 by using an adhesive 327 of cyanoacrylic, epoxy, acrylic, dichloromethane, or other compound, instead of the ultrasonic fusion.

In this fixing method, however, an adhesive 328 may flow into the lens surface of the lens 311 as shown in B300 by capillary phenomenon to shield the optical path, thereby lowering the reading performance. Or if dust 329 is caught in when fixing the lens 311 to the casing 312 through the adhesive 328, normal reading is disabled because the lens 311 is oblique from a specified position. Furthermore, from the adhesive 328, low molecular weight monomer is released into the air when curing, and it may drift in the air or adhere on the lens surface, or the adhesive 328 may scatter about, and deposit on the lens surface as shown in C300, thereby shielding of the optical path and lowering of the reading performance are caused.

In the fusion method of the lens 311 to the casing 312 in the image scanner 307 of the invention, shielding of the optical path and lowering of reading performance due to the adhesive flowing into the lens surface are avoided because the lens 311 is fixed without using adhesive, and similarly shielding of the optical path and lowering of reading performance due to sticking of the released low molecular weight monomer to the lens surface or deposition of the scattered adhesive on the lens surface do not occur.

Furthermore, if dust is caught between the bottom 311c of the lens 311 and the side A300 part, lowering of performance due to the dust is eliminated because the plastic is softened by ultrasonic fusion and the dust is enclosed within the plastic.

According to the examination by the present inventors, by ultrasonic fusion in a frequency automatic tracing constant amplitude control method at a frequency of 15 kHz to 30 kHz, the acrylic lens 311 was fixed to the polycarbonate casing 312. The adhesion strength at this time was measured. The measurements of strength were more than five times as compared with the adhesion strength of the conventional fixing by using an adhesive. Still more, as compared with the prior art, stable fixing was realized, and in the examination by the inventors, the fluctuations of the adhesive strengths (evaluated by standard deviation) could be lowered to one seventh of the conventional level.

Manufacturing steps of image scanner 307

To the casing 312 fabricated by injection molding, the lens 311 is ultrasonically fused as mentioned above, and the LED mounting board 314 having the LEDs 315 preliminarily provided by reflow soldering is glued to this casing 312 with an adhesive double coated tape. Thereafter, the protective cover 316 is fixed by ultrasonic fusion.

Moreover, on the electric insulating substrate 319 having a specified conductor pattern, the semiconductor integrated circuit 320 is mounted by using a die mounting device, and this semiconductor integrated circuit 320 is connected electrically by wire bonding. Besides, other electronic component chips are mounted thereon.

Afterwards, the electrical insulating substrate 319 is assembled on the casing 312, and a connector 321 and a lead 322 are provided. Then a light quantity is adjusted.

Optical system of image scanner 320

Figure 24:
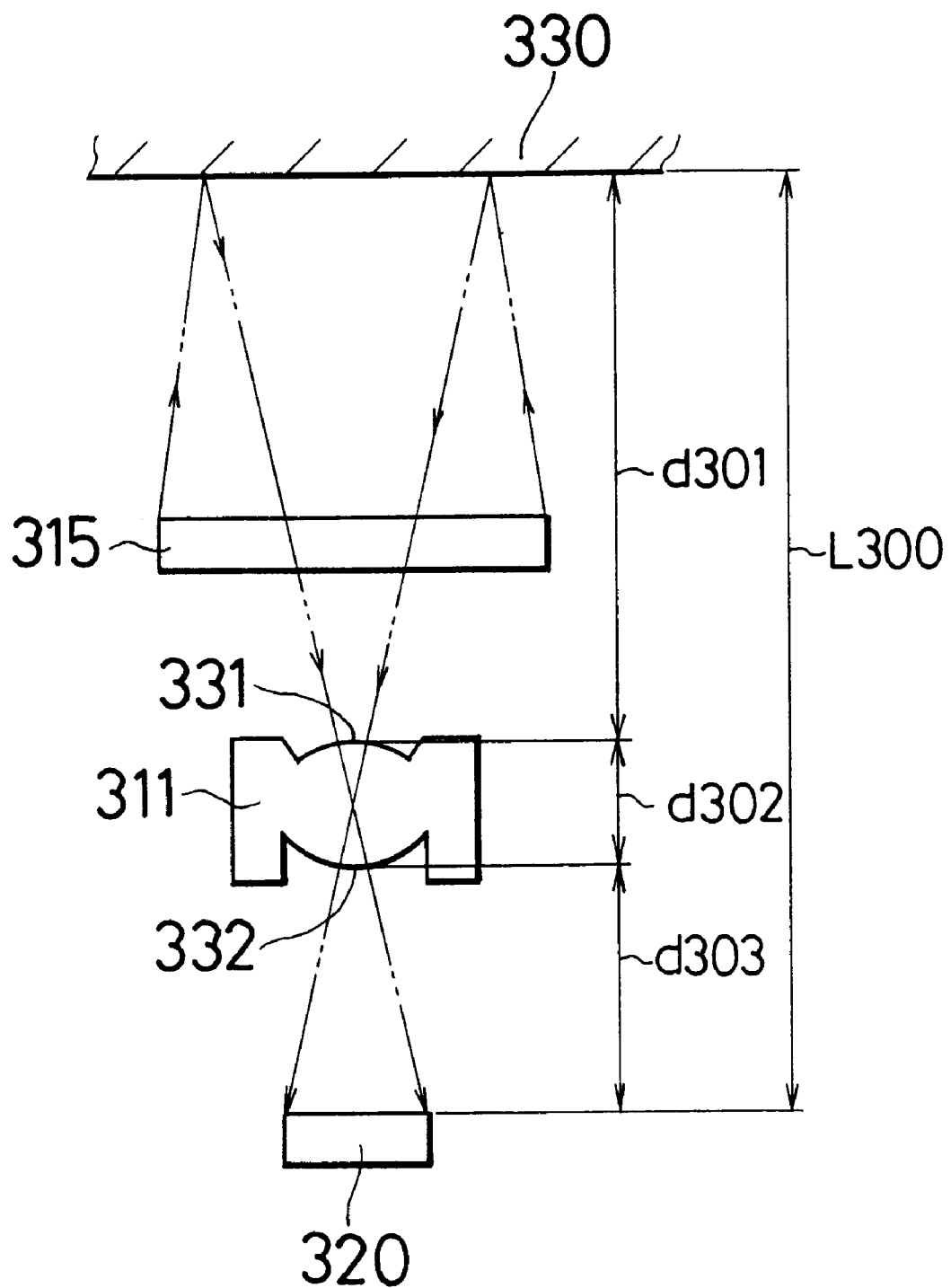
FIG. 24 is a view showing an optical system of the image scanner 307.

The inventors fabricated various image scanners 307 having different optical systems, and examined repeatedly, and found that the elements of the optical system may be determined as shown in FIG. 24 so far as they are to be mounted on the word processor 111.

In the diagram, in the lens 311 the refractive index and focal length of which are n and f, respectively, d301 is an interval between an original reflection plane 330 and the outermost projection curvature 331 of the lens 311 confronting this reflection plane 330, d303 is an interval between the semiconductor integrated circuit 320 and the outermost projecting curvature 332 of the lens 311 confronting the semiconductor integrated circuit 320, and d302 is the thickness of the lens 311 (the interval between the outermost projecting curvature 331 and the outermost projecting curvature 332). By line light irradiation while condensing with the LED 315 and convex lens 311, the light reflected by the reflection plane 330 of the original 334 is further condensed along the array of multiple photoelectric conversion elements of the semiconductor integrated circuit 320 through the lens 311.

According to the invention, the magnification power M of the lens 31 can be set in a range of $0.3 \leq M \leq 1.5$, more preferably $0.3 \leq M \leq 0.4$, and the object-image distance L300 (d301+d302+d303) can be set in a range of $10 \leq L303$ (mm)$\leq 30$, preferably $10 \leq L300$ (mm)$\leq 20$.

When setting them in these ranges, the refractive index n of the lens 311 may be set in a range of $n \leq 1.6$. By setting in this range, when an aspherical lens is designed optically, the distortion aberration can be easily set to be ±0.2% or less. Moreover, in spot diagram, an abnormal image can be eliminated.

Thus, as compared with the conventional image scanner for condensing on the CCD through a glass lens in which the lens magnification power M is 0.2 or less and the object-image distance L300 is 50 mm$\leq L300$, in the image scanner 307 of the invention, the magnification power M can be set remarkably large, and the object-image distance L300 can be set remarkably small.

For example, the refractive index n of the lens 311 is 1.491, the focal length f is 4.068, and the brightness F0 is 2.0866. The radius of curvature of the outermost projecting curvature 331 of the lens 311 is 4.716 mm, and the radius of curvature of the outermost projecting curvature 332 is 2.484 mm. When d301 is 12.4 mm, d302 4.06 mm, and d303 4.54 mm, the object-image distance L300 is 21 mm and the magnification power M is 0.4. In such optical system, the temperature changes of MTF (modulation transfer function) are within 20% or less in a temperature range of 0 to 40° C. The magnification power M of the lens 311 is 1% or less in this temperature range.

The inventors fabricated ten image scanners 307 of such optical system, and determined the MTF, and the maximum value was 82.6% and the minimum value was 67.0%. Also, ten conventional image scanners for condensing on the CCD through a glass lens, were fabricated to determine the MTF. The maximum value of MTF was 50%, and the minimum was 25%.

The number of photoelectric conversion elements on the top surface of the semiconductor integrated circuit 320 may be 1000 or less, preferably 400 or less. For example, the printing width of printer is generally 8 mm, or 16 mm at maximum, but since a paper feed mechanism is often used in common, the reading width is 8 to 16 mm. Hence, if setting the reading width at 8 dots/mm (200 DPI), 64 to 128 pixels are needed, and if setting the reading width at 24 dots/mm (600 DPI), 192 to 384 pixels are needed.

The inventors also found that the fluctuation of d303 increases when the casing 312 is formed of a material of which thermal expansion coefficient $\rho$ is $5.0 \times 10^{-5} K^{-1}$ or less. That is, if $\rho < 5.0 \times 10^{-5} K^{-1}$, the fluctuation of d303 is small, and accordingly, it is found, deviation is likely to occur in the magnification power M of the lens 311. In addition, in order not to generate stress distortion inside the casing 312, it should be set at $\rho < 5.0 \times 10^{-5} K^{-1}$. In this embodiment, since the casing 312 is made of polycarbonate resin containing 30% glass filler, the above object can be advantaneously achieved.

Figure 25:
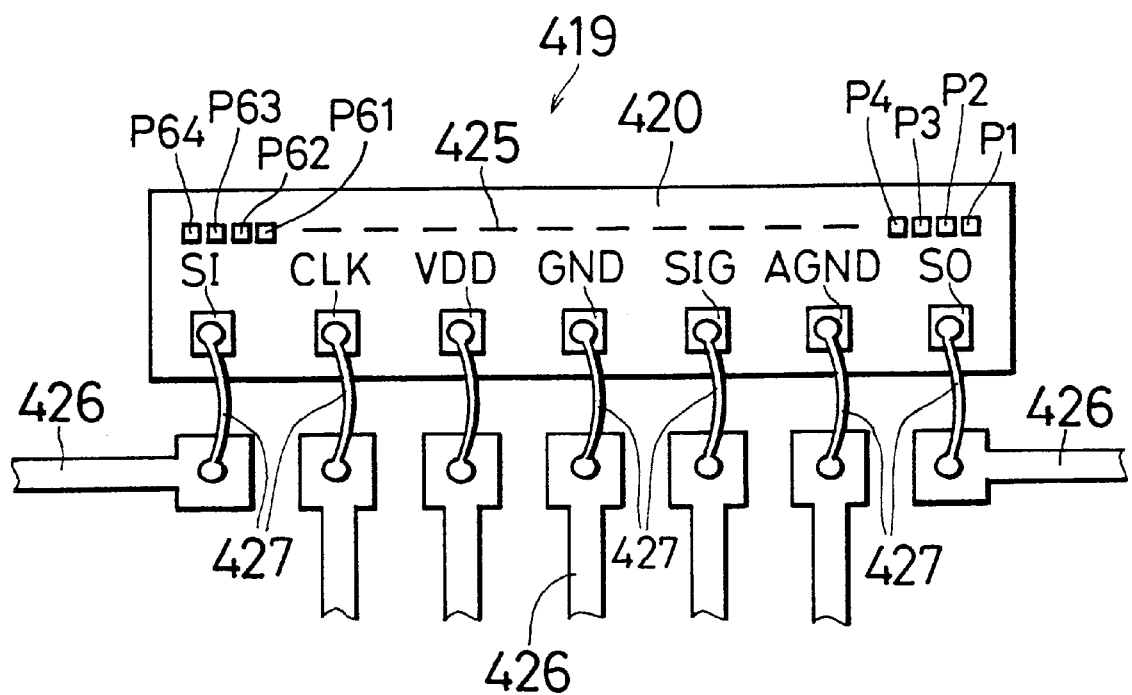
FIG. 25 is a plan view showing the constitution of an electrical insulating substrate 419 on which a semiconductor integrated circuit 420 to be used in an image scanner of a fourth embodiment of the invention is fixed.
Figure 26:
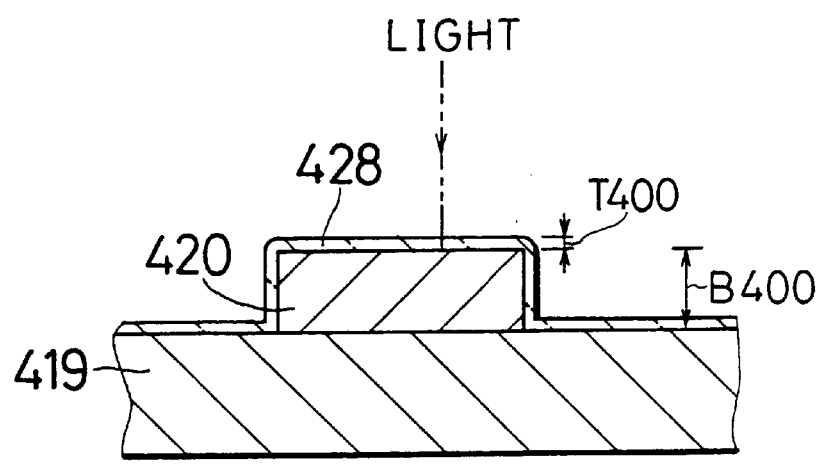
FIG. 26 is a sectional view of a semiconductor integrated circuit 420.
Figure 27:
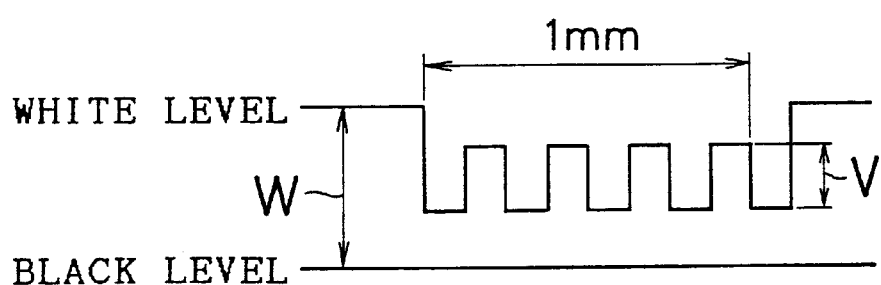
FIG. 27 is a diagram showing a definition of MTF.

FIG. 25 is a plan view showing the constitution of an electric insulting substrate 419 on which a semiconductor integrated circuit 420 to be used in an image scanner in a fourth embodiment of the invention is fixed. FIG. 26 is a sectional view of the semiconductor integrated circuit 420. The image scanner of the embodiment differs from the preceding image scanner 307 in that a light transmitting resin layer 428 with a thickness of 100 µm or less is formed on the surface of the semiconductor integrated circuit 420 and electrical insulating substrate 419.

Application of resin to semiconductor integrated circuit 420

The semiconductor integrated circuit 420 shown in FIG. 25 comprises a photoreceptor 425 composed of 64 photoelectric conversion elements P1–P64 such as photo diodes and photo transistors, a terminal SI for receiving a scanning start signal, a terminal CLK for receiving a scanning clock signal, a terminal VDD to which a power source is connected, a grounding terminal GND, a terminal SIG for outputting a read signal, a grounding terminal for analog circuit AGND, and a terminal SO for outputting a scan end signal, and these terminals are connected electrically to the wiring pattern 426 formed on the electric insulating substrate 419 by bonding wires 427.

In FIG. 26, on the surface of the semiconductor integrated circuit 420 of which height B400 is about 0.4 mm and electrical insulating substrate 419, a light transmitting resin layer 428 such as silicone resin, epoxy resin and polyether amide is formed in a thickness T400 of about 100 µm or less as means for deterioration prevention or environmental protection.

When this resin layer 428 is formed of a silicone resin, when it is dissolved in n-heptane so that its concentration may be 7 wt. %, the viscosity is 1.3 centistokes (room temperature 25° C.), and when the dissolved silicone resin was dropped from above the semiconductor integrated circuit 420 by means of dispenser or the like to apply in drops, and was then put into a heating tank to be heated for about 1 hour at 150° C. to be cured, a light transmitting resin layer 28 with a hardness of 18 (JIS A) and insulation breakdown voltage of 20 kV/mm was formed.

The film thickness of this light transmitting resin layer 428 was measured by an interference film thickness gauge, and in the number of samples n=16, the mean film thickness of x=13.6 µm and standard deviation of σ=2.1 µm were obtained, and the transmissivity was 92.7% at the wavelength of λ=550 µm.

The inventors measured the characteristics with different thicknesses of the light transmitting resin layer 428 as shown in Table 1.

TABLE 1

| Film thickness | MTF (%) | PRNU (%) | Reliability |
| --- | --- | --- | --- |
| 1.0mm | 40 | 29 | O |
| 0.8mm | 47 | 19 | O |
| 0.5mm | 53 | 13 | O |
| 100µm | 60 | 28 | O |
| 50µm | 63 | 7 | O |
| 10µm | 65 | 5 | O |
| 5µm | 70 | 3 | O |
| 1µm | 73 | 3 | X (corrosion caused) |

The light transmitting resin layer 428 was fabricated as follows depending on the thickness.

The same as above, when a light permeable resin layer 428 is formed in a film thickness of 1 µm or 5 µm, 3 wt % silicone resin solution, is applied by drops in the same condition as that mentioned above, and cured. To form a light transmitting resin layer 428 in a thickness of 50 µm or 100 µm, 7 wt. % silicon resin solution is applied in multiple drops and cured. To form resin layers with film thicknesses of 0.5 mm, 0.8 mm, and 1.0 mm as reference examples, 100 wt. % silicon resin without diluting in solvent is applied in drops and cured.

Thus prepared light transmitting resin layers 428 with different film thicknesses were formed individually into semiconductor integrated circuit 420, and the MTF indicating a spatial resolution, and the PRNU (photo response non-uniformity) indicating a sensitivity dispersion were measured, and a reliability test was further conducted, and the results as shown in Table 1 were obtained.

Meanwhile, the MTF was derived from the following expression wherein the amplitude V at a spatial frequency of 4 LP/mm where there are four sets of black and white rectangular waves per 1 mm is divided by the amplitude W when read the white ground, and multiplied by 100:

$$MTF(\%) = V/W \times 100$$

The greater the figure of MTF, the better is the resolution.

The PRNU is the value showing the sensitivity fluctuation in one semiconductor integrated circuit 420, and supposing VMAX to be the maximum value of the output when reading coated paper with an optical concentration OD value of 0.07, and supporting VMIN to be the minimum value of the output when reading a coated paper with an optical concentration of 0.07, it is defined as follows.

$$PRNU(\%) = \frac{VMAX - VMIN}{VMAX + VMIN} \times 100$$

The smaller the value of PRNU, the smaller means the sensitivity fluctuation.

In the reliability test, in the atmosphere of temperature of 85° C. and humidity of 85%, electric current was applied for 500 hours to accelerate deterioration, and if abnormality such as electrode corrosion was caused was investigated.

As clear from the results shown in Table 1, when the film thickness is 100 µm or less, the value of MTF was large and the resolution was excellent, and moreover the value of PRNU was small and the sensitivity fluctuation was less, and still further abnormality such as electrode corrosion was not detected.

When the film thickness exceeds 100 µm, drooping occurred at the edge of the semiconductor integrated circuit 420. The resin itself becomes convex, the reading sensitivity is lowered, the image resolution deteriorates, and moreover by the effect of convex lens, light convergence and divergence occurred. Thereby image distortion and sensitivity fluctuations are caused.

Figure 28:
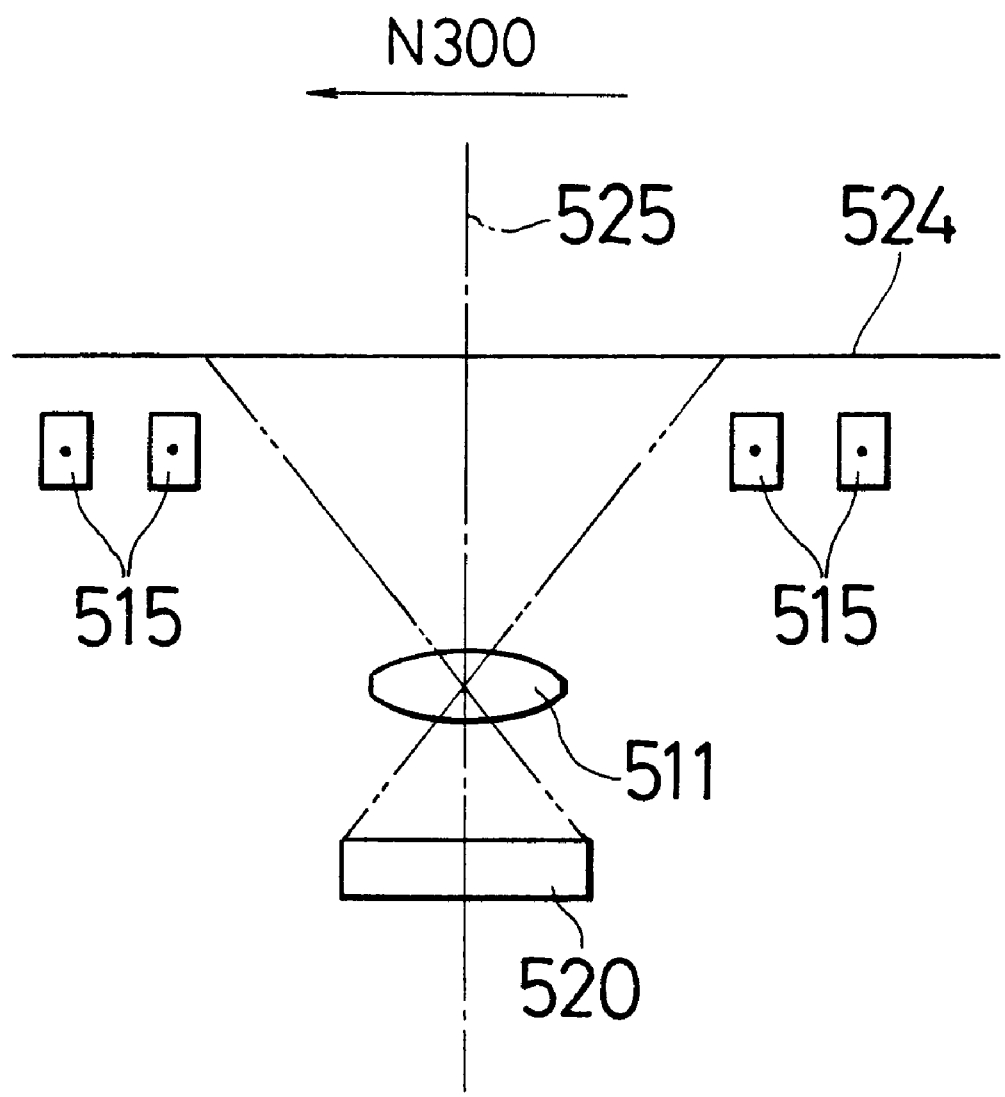
FIG. 28 is a view showing an arrangement of LEDs 515, a lens 511 and a semiconductor integrated circuit 520 provided in an image scanner of a fifth embodiment of the invention.

FIG. 28 is a diagram showing the configuration of LED 515, lens 511, and semiconductor integrated circuit 520 installed in an image scanner in a fifth embodiment of the invention. What is characteristic of the image scanner in this embodiment is that plural LEDs 515 are disposed regularly as described below so that the quantity or intensity of light reaching photoelectric conversion elements provided on the semiconductor integrated circuit 520 after being reflected by an original plane is uniformly distributed, while other parts are similar to the foregoing image scanner 307.

In the image scanner of the embodiment, a plurality of LEDs 515 are disposed so that the distribution of quantity of light emitted by them is be symmetrical to an optical axis 525 of the lens 511 in an optical system, and that the quantity of light increases as going away from the optical axis 525. For example, according to FIG. 28 which shows the configuration of the LEDs 515, lens 511 and semiconductor integrated circuit 520, four LEDs 515 which are arrayed along the N300 direction and nearly the same in quantity of light are disposed so as to be symmetrical to the optical axis 525 of the lens 511.

By so disposing, the peripheral dimming specific to the lens 511 itself can be compensated, and light is emitted uniformly to multiple photoelectric conversion elements arranged in the semiconductor integrated circuit 520.

Figure 29:
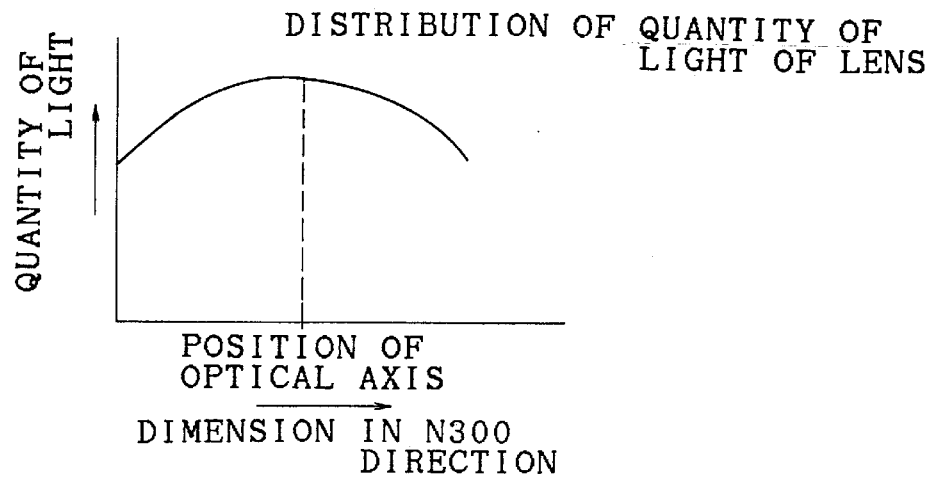
FIGS. 29A, 29B are diagrams showing distribution of quantity of light of a lens and LEDs, respectively.
FIG. 29C is a diagram showing distribution of illumination of an illuminated semiconductor integrated circuit.
Figure 29:
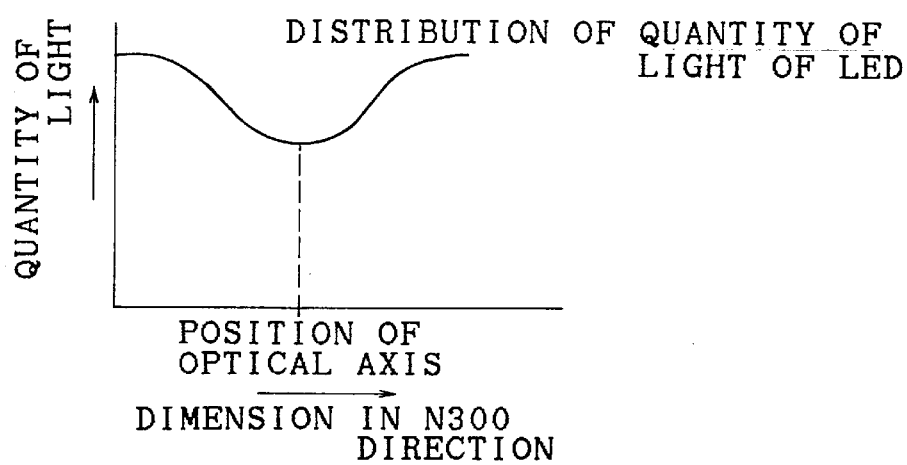
Figure 29:
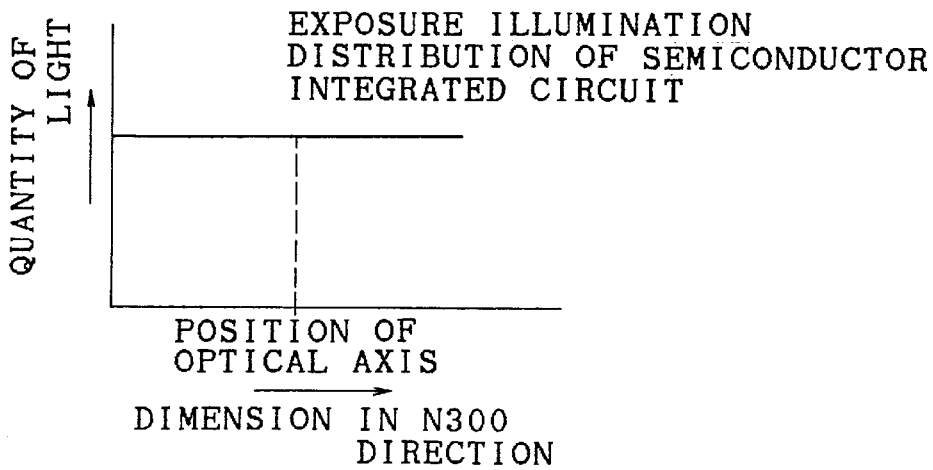

FIG. 29A shows distribution of quantity of light of the lens 511, and the quantity of light drops extremely in the periphery as compared with the area of the optical axis 525 of the lens 511. Contrarily, in the embodiment, as indicated by the distribution of quantity of light of four LEDs 515 in FIG. 29B, the quantity of light is much increased in the periphery as compared with the area of the optical axis 525.

Thus, in the embodiment, by the combination of distribution of quantity of light of the lens 511 and distribution of quantity of light of the LEDs 514, multiple photoelectric conversion elements arranged in the semiconductor integrated circuit 520 can be uniformly illuminated.

In the embodiment, four LEDs are used, but two, six or a greater plurality may be used.

In the arrangement of the plurality of LEDs 515 in the embodiment so that the distribution of quantity of light emitted by them may be symmetrical to the optical axis 525 of the lens 511 of the optical system and that the quantity of light be increased as going away from the optical axis 525, four LEDs 515 nearly equal in the quantity of light are arranged at equal intervals, but when LEDs 515 differing in the quantity of light are arranged, the interval of the LEDs 515 may be properly changed depending on the difference in the quantity of light.

Figure 30A:
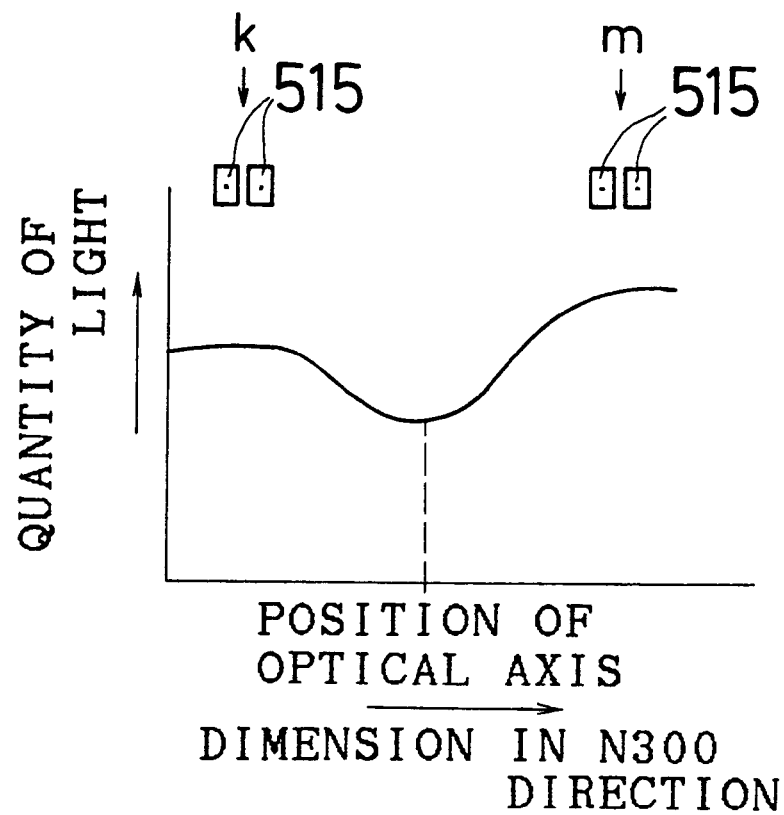
FIGS. 30A and 30B are diagrams showing distribution of quantity of light of LEDs.

Generally, when the LEDs 151 are mass produced, the quantity of light is likely to vary among individual LEDs 515, and hence the distribution of the quantity of light may not be symmetrical to the optical axis 525 as shown in FIG. 30A. FIG. 30A also shows the arrangement of LEDs 515 in the N300 direction.

Contrarily, in the image scanner of the embodiment, since current (electric power) is individually applied to the LEDs 515, current adjusting means 526 comprising a resistance R1 and a variable resistance VR1 is provided in the circuit diagram in FIG. 31. According to FIG. 31, the current applied to LED 515 k is constant, but the current applied to LED 515 m can be adjusted by the variable resistance VR1.

Figure 30B:
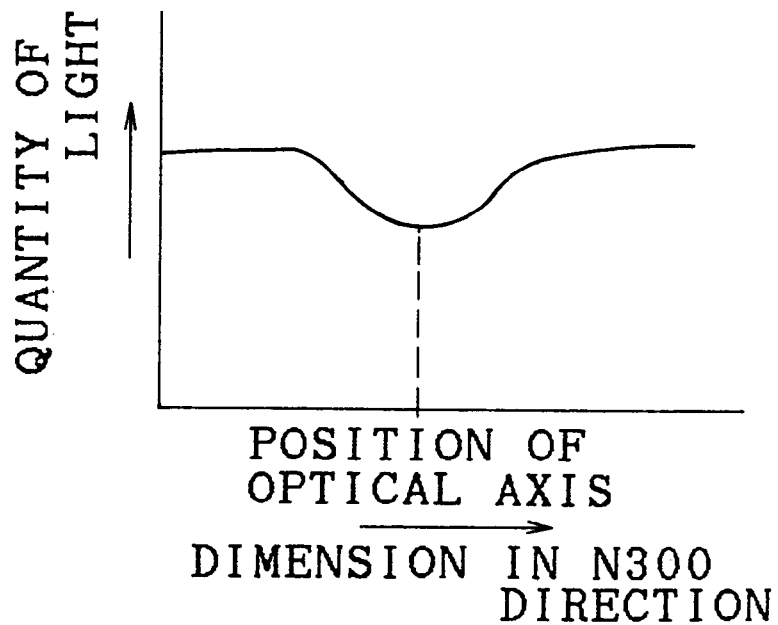

In this circuit constitution, as shown in FIG. 30A, when the brightness of LED 515 m is high, it is adjusted to increase the resistance of the variable resistance VR1 to limit the current flowing therein to lower the brightness, so that the symmetrical distribution of quantity of light as shown in FIG. 30B can be obtained.

Thus, by using this current adjusting means 526, the quantity of light of the individual LEDs 515 can be adjusted, and by this adjustment, the plurality of LEDs 515 can be set so that the distribution of quantity of light emitted by them is symmetrical to the condensing system optical axis 525 of the lens 515, and that the quantity of light is increased as going away from the optical axis 525, and thereby by the combination of the distribution of quantity of light of the lens 511 and the distribution of quantity of light of the LEDs 515, multiple photoelectric conversion elements arranged on the semiconductor integrated circuit 520 can be uniformly illuminated.

In the embodiment, the variable resistance VR1 is provided at one side of the LEDs 515, but the variable resistance VR1 may be also provided at the other side of the LEDs 515.

Figure 32:
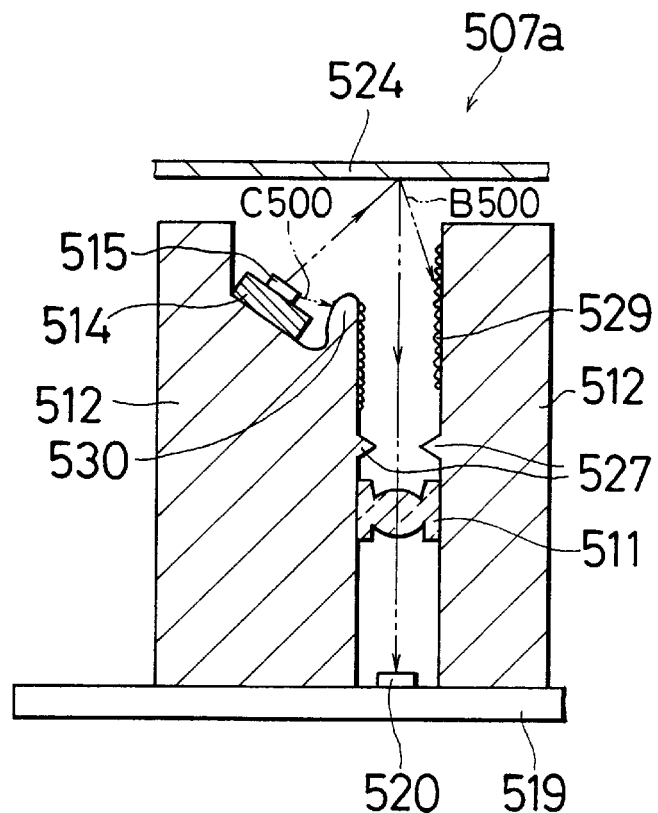
FIG. 32 is a sectional view of an image scanner 507a of an sixth embodiment of the invention.

FIG. 32 is a sectional view showing the constitution of an image scanner 507a of a sixth embodiment of the invention. What is characteristic of the image scanner 507a is that a protrusion 527 of a specific height is formed at the side wall of the casing 512 facing the optical path from an original 524 till the lens 511, in a range not to shield the light from the original 524 to the incident pupil or aperture stop of the lens 511. The contour shape of this protrusion 527 as seen from the optical axis direction may be a slit form parallel to the direction vertical to the drawing, or in a circular form corresponding to the lens 511.

Thus, by the protrusion 527, part of the scattering light generated at the side wall of the casing 512 is prevented from entering the lens 515. In FIG. 32, the protrusion 527 is formed at one position, but plural protrusions of different heights and positions may be formed in a range not to shield the reading light reflected by the original 524 surface.

Figure 33:
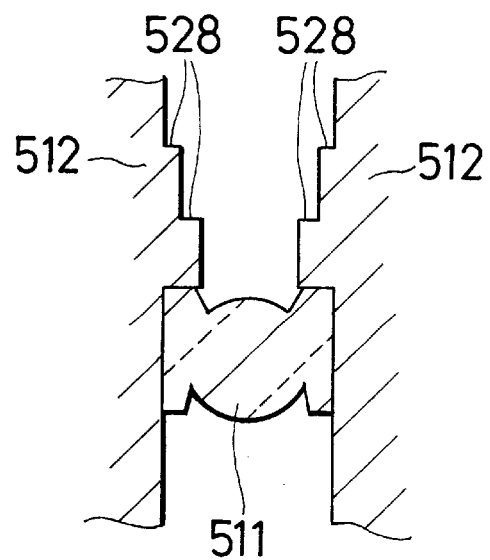
FIG. 33 is a partial sectional view of the image scanner 507a of the sixth embodiment.

Moreover, as shown in FIG. 33, instead of the protrusions 527, plural stepped portions 528 may be formed so as to narrow the interval of the inside of the casing 512 sequentially as going from the original 524 to the lens 511, and these stepped portions 528 prevent part of the scattering light generated at the side wall of the casing 512 from entering the lens 511.

Referring to FIG. 32, blackening treatment 529 and mat treatment applied on the inside of the casing 512 are explained.

In the inner side wall of the casing 512 facing the optical path from the original 524 to the lens 511, various blackening treatments can be applied, including application of a black paint, ionization flocking, gluing of flocking paper, or formation of black aluminum oxide film if the casing 512 is made of aluminum, or mixing of a black pigment if the casing 512 is made of a resin. If gloss still remains after blackening treatment, mat treatment is applied, such as polishing and etching, so that the majority of the light B500 exposed to the side wall is absorbed. Accordingly, the intensity of scatter light generated at the side wall is extremely decreased, and the stray light entering the lens 511 may be suppressed. In FIG. 32, meanwhile, the blackening treatment 529 and mat treatment are applied to the side wall only, but they may be applied on the entire inner surface or outer surface of the casing 512.

Light shielding means to prevent the light from entering directly from the LEDs 515 is explained below.

Figure 34:
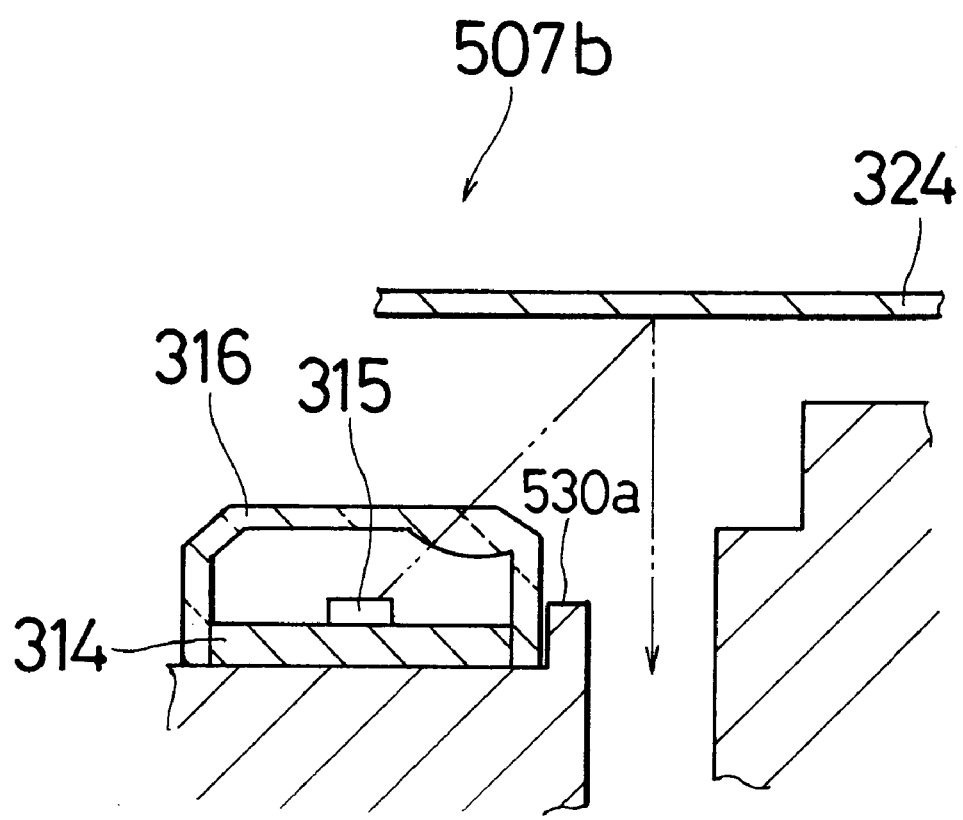
FIG. 34 is a partial sectional view of an image scanner 507b of a seventh embodiment of the invention.

In FIG. 34, light shielding means 530 is provided, and the light C500 leaving the LEDs 515 hits against the light shielding means 530, thereby preventing the direct light or scattering light derived from the light C500 from entering the lens 511.

FIG. 34 is a sectional view showing a partial constitution of an image scanner 507b in a seventh embodiment of the invention. The image scanner 507b of FIG. 34 is constituted nearly same as the image scanner 307 of FIGS. 18–24, and in FIG. 34 the parts corresponding or similar to those of FIGS. 18–24 are identified with the same reference numerals. What is characteristic of the image scanner 507b is light shielding means 530a similar to the light shielding means 530 in the image scanner 507a is provided.

In the image scanners 507a, 507b, by forming the light shielding means 530, 530a, direct light or scattering light derived from the light leaving the LEDs 515, 315 is prevented from entering the lens. Still more, they abut against the LED mounting boards 514, 314 or protective cover 316, and therefore they can be also used as the positioning means thereof.

Figure 35:
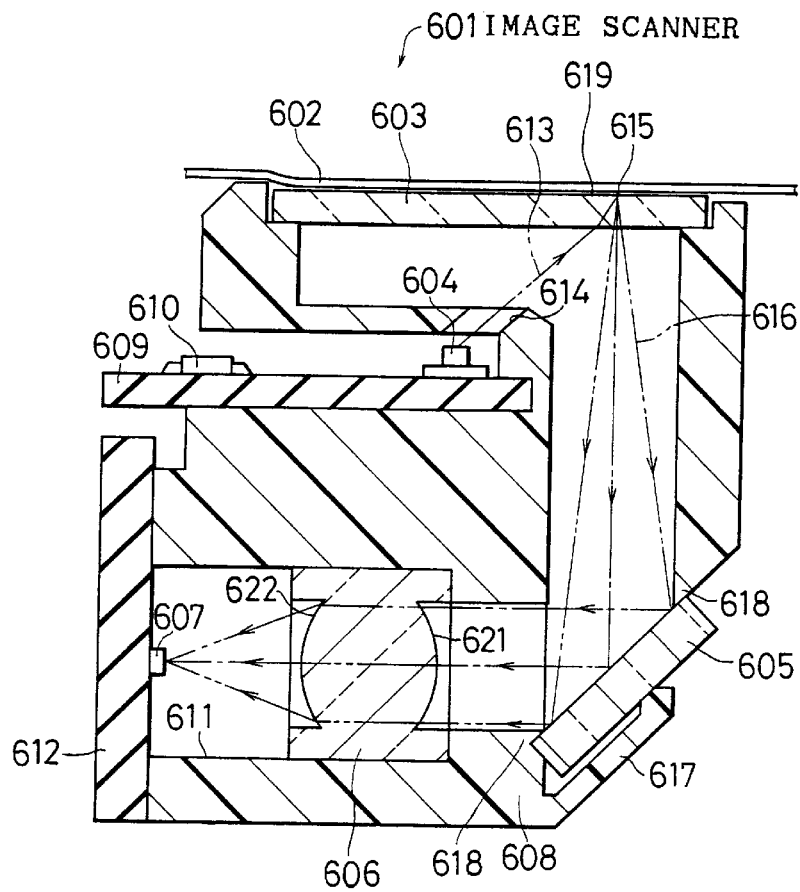
FIG. 35 is a sectional view showing the constitution of an image scanner 601 of an eighth embodiment.
Figure 36:
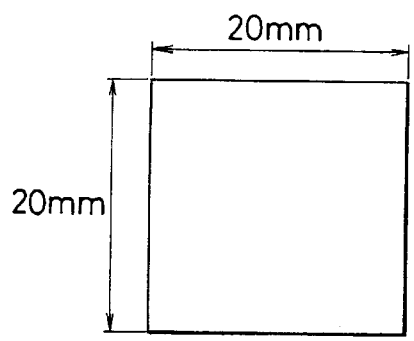
FIG. 36A, 36B are views showing dimensions of the image scanner 601 and a conventional typical image scanner.
Figure 36:
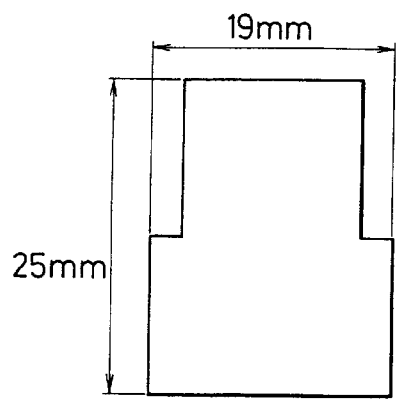

FIG. 35 is a sectional view showing the constitution of an image scanner 601 of an eighth embodiment of the invention. FIG. 36 is a diagram showing dimensions of the image scanner 601 and a conventional typical image scanner.

The image scanner 601 comprises a protective cover 603, LEDs (light emitting diodes) 604, a reflector 605, a plurality of aspherical lenses 606, semiconductor integrated circuits 607 of sequential reading type in the same number as the lenses 606, and a casing 608 for holding the protective cover 603 and LEDs 604. On a substrate 609 provided parallel to the protective cover 603 in the casing 608, the LEDs 604 for illuminating the original and control circuit 610 for controlling the LEDs 604 and semiconductor integrated circuits 607 are mounted. The lens 606 installed in the mounting hole 611 provided in the casing 608, and the semiconductor integrated circuit 607 mounted on the substrate 612 installed vertically to the protective cover 603 at the side of the casing 608 correspond in a ration of 1 to 1, and are disposed linearly along the main-scanning direction (the width direction of the original).

An original 602 is conveyed at a specific speed along the sub-scanning direction while contacting with the top surface 618 of the protective cover 603 by means of feed roller or the like (not shown). Along with this operation, the light 613 emitted from the LED 604 illuminates the original 602 obliquely through a lighting hole 614 provided in the casing 603, and through the protective cover 603 provided on the top surface of the casing 608. The reflected light 618 from the reading position 615 of the original 602 is reflected through the protective cover 603 again by the reflector 605 which is held in a holding part 618 by a holding piece 617 provided in the bottom of the casing 608, having a metal film of aluminum or the like evaporated on the surface of glass or the like, and the optical path is converted to a direction parallel to the protective cover 603, and the light enters an aspherical surface 621 of the lens 606, and is emitted from an aspherical surface 622 to be condensed, and divided into several blocks, and is imaged on the semiconductor integrated circuit 607. The semiconductor integrated circuit 607 receives the original images, and outputs read signals corresponding to the original.

The casing 608 is made of a metal such as aluminum, or a resin such as a glass fiber reinforced acrylonitrilebutadiene-styrene copolymer (ABS resin), a glass fiber reinforced plastic, and glass filled polycarbonate, and possesses a hollow structure for passing light for reading and shielding external light, and is formed in a long shape along the main-scanning direction of the original 602.

Figure 37:
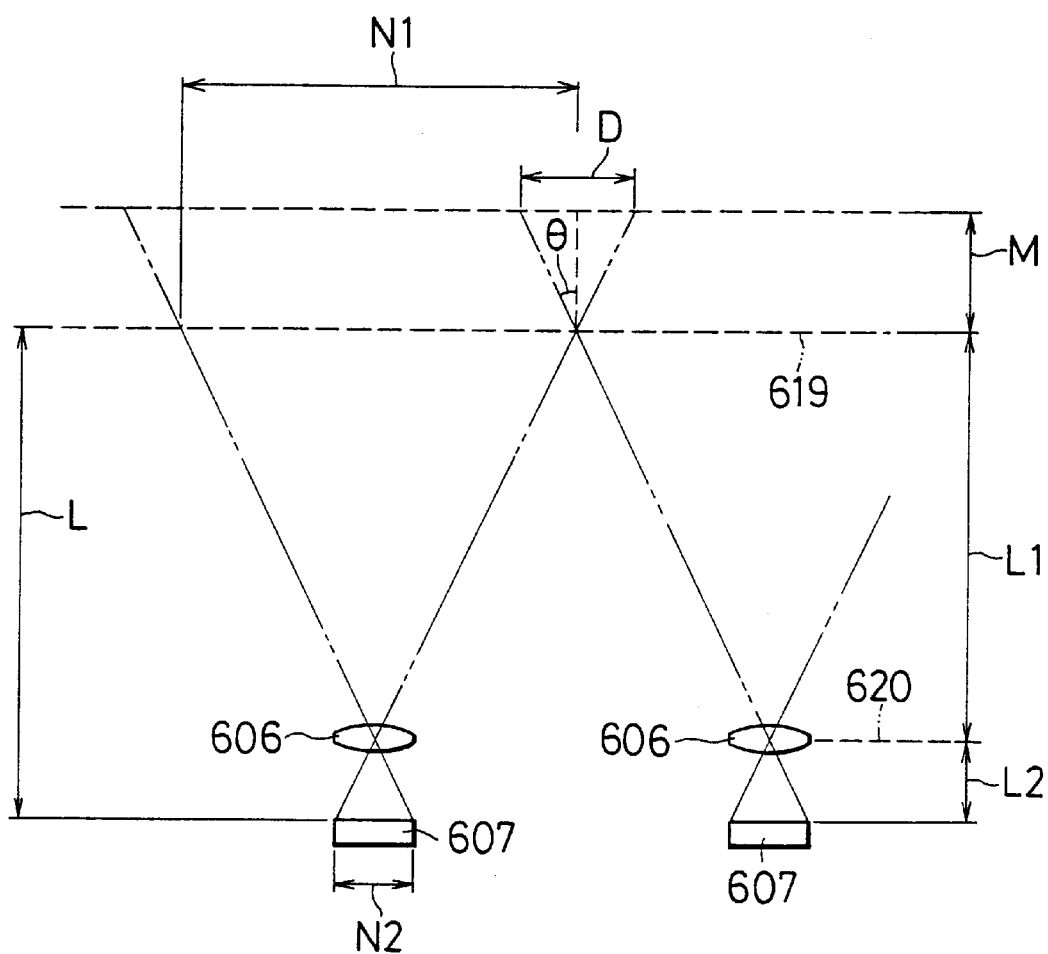
FIG. 37 is a view for explaining a pixel deviation in relation to loosening of an original in the image scanner 601.

FIG. 37 is an explanatory diagram of pixel deviation amount to loosening of the original in the image scanner 601. In the image scanner 601, the distance from the top surface 619 of the protective cover 603 which is the normal reading plane of the original 602 to the semiconductor integrated circuit 607, or the so-called optical path length L is set at, for example, 29 mm, the distance L1 from the top surface 619 of the protective cover 603 to the optical center 620 is set at, for example, 21.32 mm, and the distance L2 from the optical center 620 of the lens 606 to the semiconductor integrated circuit 607 is set at, for example, 7.68 mm. The imaging magnification α is defined as L2/L1, and is herein set as α=0.36. Therefore, supposing the reading length N1 of the original 602 per block to be, for example, 18 mm, the width N2 of the image focused on the photoreceptor surface of the semiconductor integrated circuit 607 is 6.48 mm, in the formula of N2=(L2/L1)×N1, and the width of the photoreceptor surface of the semiconductor integrated circuit 607 is set at N2, that is, 6.48 mm. At this time, the angle of view θ is given in the formula of $$\tan \theta = N1/2L1 \quad (1)$$

When the original 602 is lifted by M from the normal reading plane of the top surface 619 of the protective cover 630 due to crease or the like, the pixel deviation is assumed to be D, and the relation of M and D is as follows:

$$\tan \theta = D/2M \quad (2)$$

Determining D in formula (2) and putting into (1), the pixel deviation amount D is $$D = M \times N1/L1 \quad (3)$$

Supposing L1 to be 21.32 mm and N1 to be 18 mm, if the original 602 is lifted by M=0.1 mm, the pixel deviation D is 84.4 μm from formula (3), and similarly when M=0.2 mm, the deviation is D=168.8 μm.

Supposing the ratio of the number of pixels to reading length N1 of the semiconductor integrated circuit 607, reading length/number of pixels, to be, for example, 125 μm/1 dot, in order that the picture quality may not deteriorate if the original 602 is lifted by M, the pixel deviation amount D given in formula (3) must be less than 1 pixel, that is, less than 125 μm. When the image scanner 601 is installed in a facsimile apparatus or the like, according to the present design technology of facsimile apparatus, an original loosening of M=0.1 mm can occur, putting D=125 μm and M=0.1 mm into formula (2), the preferable condition of the angle of view θ is $$\tan \theta < 0.625 \quad (4)$$

Therefore, in the image scanner 601, when using the semiconductor integrated circuit 607 with the ratio of number of pixels to reading length N1 of, for example, 125 μm/1 dot, the aspherical shape of the planes 21 and 22 of the lens 606 is selected so that the angle of view θ may satisfy formula (4). If the angle of view θ is too wide for the optical path length L, the periphery of the image becomes dark, and the ratio characteristic of the quantity of peripheral light becomes inferior, and the peripheral resolution of the image is lowered, and the peripheral MTF characteristic is impaired, and therefore in the image scanner 601, an appropriate angle of view θ for the optical path length L is selected.

In the image scanner 601, the reflected light 616 from the original 602 is reflected by the reflector 605, and enters the lens 606, and therefore the internal space of the casing 608 can be effectively utilized, and the optical path length L can be extended without increasing the dimensions of the casing 608, or rather by decreasing the dimensions. In the conventional typical image scanner, for example, as shown in FIG. 36B, when the sectional size of the apparatus is 19 mm in width and 25 min in height, the optical path length L is 20 mm, whereas in the image scanner 601 in the embodiment of the invention, for example, as shown in FIG. 36A, when the sectional size of the apparatus is 20 mm in both width and height, the optical path length L is 29 mm, thereby realizing reduction of the apparatus size and extension of the optical path length L.

Moreover, by extending the optical path length L, the size of the semiconductor integrated circuit 607 is increased and the reading length N1 per semiconductor integrated circuit 607 can be extended without increasing the angle of view θ, or rather by reducing it. By reducing the angle of view θ, the pixel deviation characteristics, ratio characteristic of peripheral light quantity, and peripheral MTF characteristic can be enhanced, and a better picture quality can be obtained. By extending the reading length N1 per semiconductor integrated circuit 607, the number of semiconductor integrated circuits 607 to be used is saved, so that the parts cost and manufacturing cost can be reduced.

In the typical conventional image scanner, when the apparatus size and optical path length L are same as mentioned above, for example, the angle of view θ is set at tan θ=0.28, and when the size and number of pixels of the semiconductor integrated circuit are set at 3.2 mm and 64 dots, the reading length N1 per semiconductor integrated circuit and imaging magnification α are set at 8 mm and 0.4 times, and to read an original of A4 format width (216 mm), 27 semiconductor integrated circuits are needed. Contrarily, in the image scanner 601 in the embodiment of the invention, when the apparatus size and optical path length L are the same as mentioned above, for example, the angle of view θ can be set at tan θ=0.21, and when the size and number of pixels of the semiconductor integrated circuit 607 are set at 6.48 mm and 144 dots, the reading length N1 per semiconductor integrated circuit 607 and imaging magnification α are set at 18 mm and 0.36 times, and the number of semiconductor integrated circuits 607 necessary for reading the original 602 in a A4 format width can be reduced to 12.

When the image scanner 601 is incorporated in a facsimile apparatus or the like, the image scanner 601 does not require complicated optical adjustment because the reflector 605, lenses 606, and semiconductor integrated circuits 607 are incorporated and fixed in the casing 608. When the image scanner 601 is incorporated and used in a facsimile apparatus or the like, if the image scanner 601 falls in trouble, it is not necessary to send the facsimile apparatus to a service factory for repair, but it can be repaired on site only by exchanging the image scanner 601.

Figure 38:
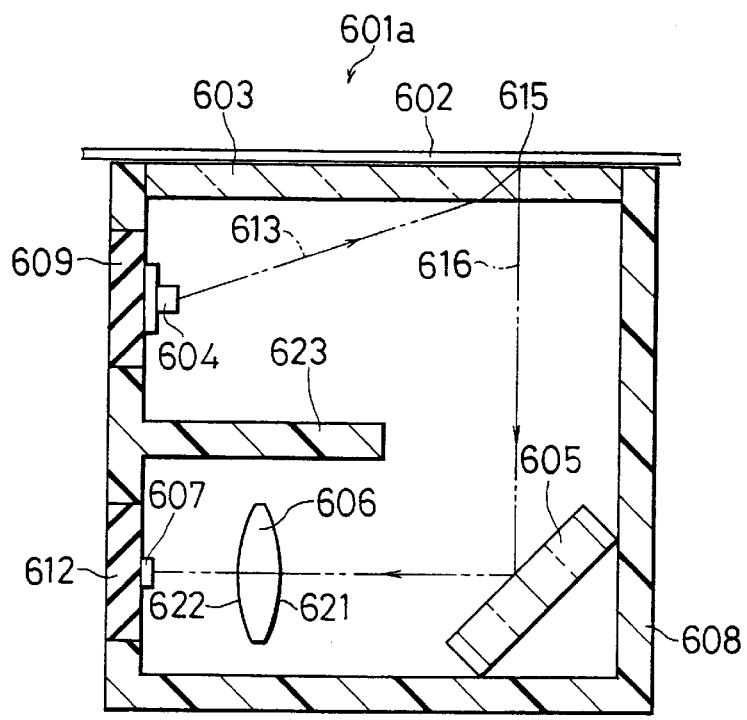
FIG. 38 is a sectional view showing the constitution of an image scanner 601a of a ninth embodiment of the invention.

FIG. 38 is a sectional view showing the constitution of an image scanner 601a in a ninth embodiment of the invention, and the parts corresponding or similar to those of the image scanner 601 in FIG. 35 are identified with the same reference numerals. In the image scanner 601a, the light 613 emitted from the LEDs 604 mounted on a substrate 609 installed to be vertical to the protective cover 603 at the side face of the casing 608 illuminates obliquely the original 602 surface through the protective cover 603 provided on the top surface of the casing 608. The reflected light 616 reflected from the reading position 605 of the original 602 is reflected by the reflector 605 obliquely mounted on the bottom of the casing 608, again through the protective cover 603 to convert the optical path into a direction parallel to the protective cover 603, and enters the lenses 606, and is imaged on the semiconductor integrated circuit 607 installed on the substrate 612 mounted so as to be vertical to the protective cover 603 at the same side of mounting of the substrate 609 of the casing 608. In the casing 608, moreover, in order that the light 613 emitted from the LEDs 604 may not directly hit against the semiconductor integrated circuit 607, a light shielding part 623 for isolating the LED 604 and the semiconductor integrated circuit 607 is provided so as to project from the side surface.

Figure 39:
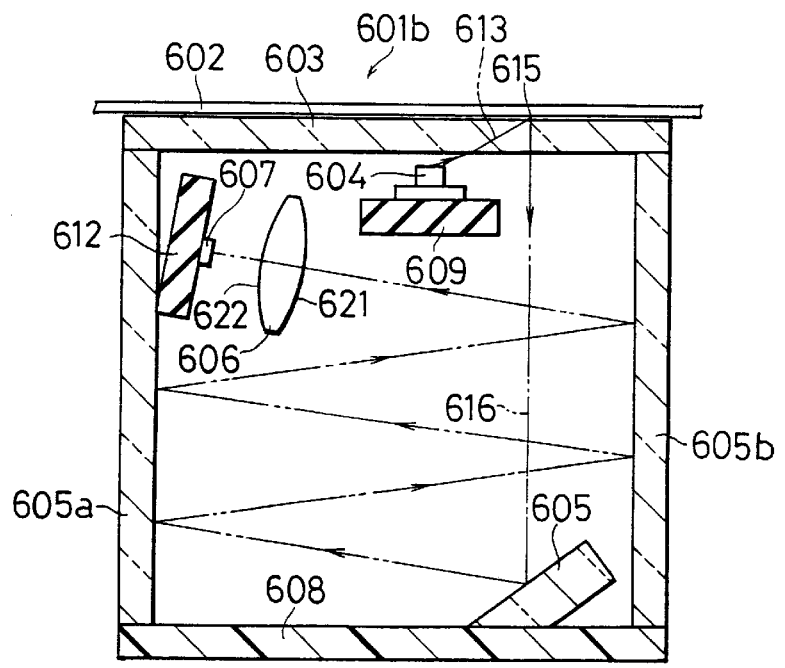
FIG. 39 is a sectional view showing the constitution of an image scanner 601b of a tenth embodiment of the invention.

FIG. 39 is a sectional view showing the constitution of an image scanner 601b in a tenth embodiment of the invention, and the parts corresponding or similar to those of the image scanner 601 shown in FIG. 35 are identified with the same reference numerals. What is characteristic of the image scanner 601b is that reflector plates 605a, 605b reaching from to bottom are provided at both sides of the casing 608. The substrate 609 on which the LEDs 604 are mounted is provided above inside the casing 608, parallel to the protective cover 603, so as to illuminate the original 602 by the light 613 emitted from the LEDs 604 through the protective cover 603. The reflected light 616 from the original 602 is reflected by the reflector 605 provided in the bottom of the casing 608, and the reflection is repeated between the reflectors 605a and 605b, and the light enters the lens 606 provided above inside the casing 608, thereby imaging on the semiconductor integrated circuit 607. In the illustrated example, it is constituted to reflect five times, but the number of reflections may be either more than five times or less than five times. In this image scanner 601b, since the reflectors 605a and 605b reaching from top to bottom are provided at both sides of the casing 608, the number of reflections can be increased, and the optical path length can be further extended.

Figure 40:
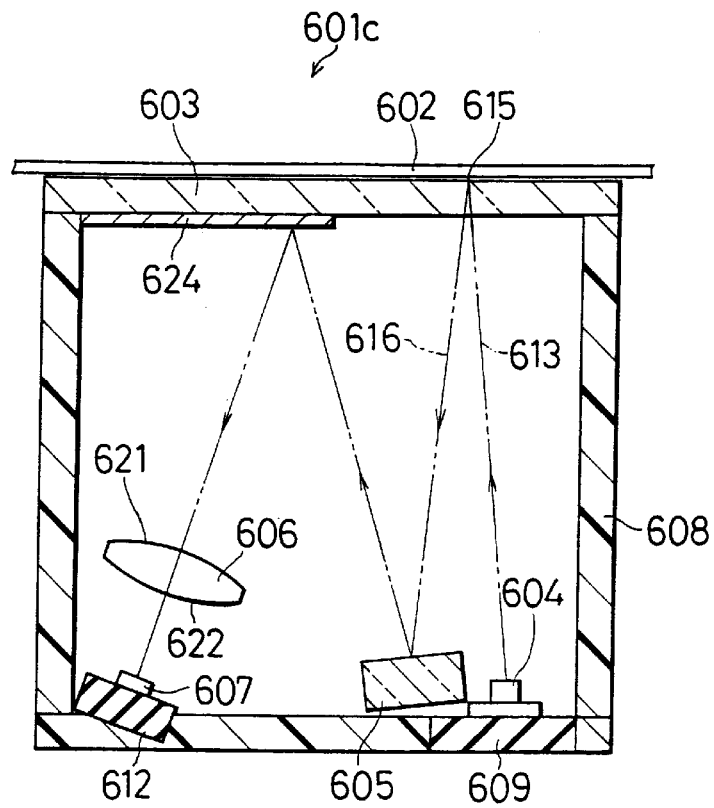
FIG. 40 is a sectional view showing the constitution of an image scanner 601c of a eleventh embodiment of the invention.

FIG. 40 is a sectional view showing the constitution of an image scanner 601c in an eleventh embodiment of the invention, and the parts corresponding or similar to those of the image scanner 601 shown in FIG. 35 are identified with the same reference numerals. What is characteristic of the image scanner 601c is that a metal film of aluminum or the like is evaporated in part of the inside of the protective cover 603 to form a mirror surface 624, and at this time the LED 604 and the semiconductor integrated circuit 607 are installed in the bottom of the casing 608. The reflected light 616 reflected from the original 602 is reflected by the reflector 605 provided between the LED 604 and semiconductor integrated circuit 607 in the bottom of the casing 608, and is further reflected by the mirror surface 624, and enters the lens 606. Or, repeating reflections more than two times between the mirror surface 624 and reflector 605, the light may enter the lens 606. In this image scanner 601c, since the mirror surface 524 and the protective cover 603 are formed into one body, the number of parts can be decreased, so that the manufacturing cost may be saved.

Figure 41:
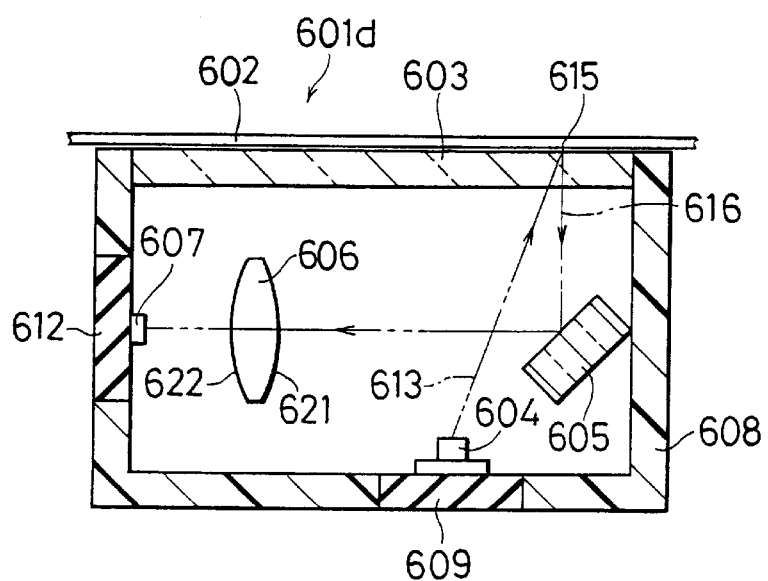
FIG. 41 is a sectional view showing the constitution of an image scanner 601d of a twelfth embodiment of the invention.

FIG. 41 is a sectional view showing the constitution of an image scanner 601d in a twelfth embodiment of the invention, and the parts corresponding or similar to those of the image scanner 601 shown in FIG. 35 are identified with the same reference numerals. What is characteristic of the image scanner 601d is that the semiconductor integrated circuit 607 and the reflector 605 are installed at the inner side of the casing 608 at the mutually opposite sides, while the LED 604 is installed at the bottom of the casing 608, so that the light 613 emitted from the LED 604 can pass between the semiconductor integrated circuit 607 and the LED 604.

Figure 42:
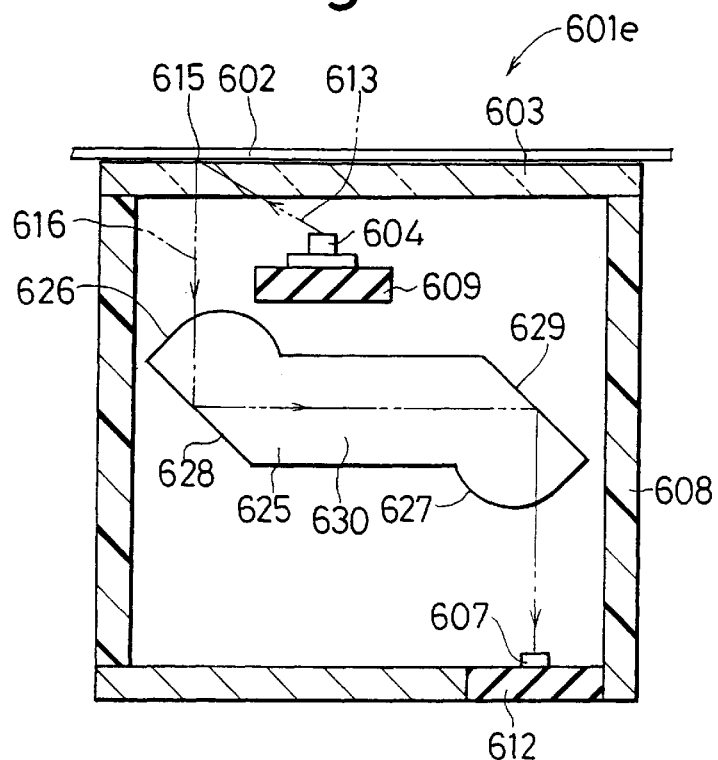
FIG. 42 is a sectional view showing the constitution of an image scanner 601e of a thirteenth embodiment of the invention.

FIG. 42 is a sectional view showing the constitution of an image scanner 601e in a thirteenth embodiment of the invention, and the parts corresponding or similar to those of the image scanner 601 shown in FIG. 35 are identified with the same reference numerals. What is characteristic of the image scanner 601e is that a guide optical path lens with a prism 625 made of acrylic resin or other synthetic resin by injection molding is provided. The light 613 emitted from the LED 604 installed in the casing 608 to be positioned above the guide optical path lens with the prism 625 illuminates the original 602 through the protective cover 603. The reflected light 616 from the original 602 enters, for example, an aspherical surface 626 of the guide optical path lens with the prism 625 through the protective cover 603 again, and the optical path is changed by 90 degrees by a reflection surface 628, and the light further passes through the light guide 630, and the optical path is changed by 90 degrees by a reflection surface 629, and the light is emitted, for example, from an aspherical surface 627, and is imaged on the semiconductor integrated circuit 607 installed in the bottom of the casing 608. In the image scanner 601e, in order that the angle of view θ shown in FIG. 37 may satisfy the preferable condition for the pixel deviation characteristic as shown in the example in formula (4), and may not impair the ratio characteristic of the quantity of peripheral light or the peripheral MTF characteristic, the shape of the aspherical shape of the surfaces 626 and 627 of the guide optical path lens with the prism 625 is determined corresponding to the angle of view θ.

According to the image scanner 601e of the embodiment, since the guide optical path lens with prism 625 is used, it is resistant to mechanical vibration, and a stable picture quality can be obtained, and moreover the number of parts is decreased and the manufacturing cost can be reduced. Also in the image scanner 601e of the embodiment, using the guide optical path lens with the prism 625 with the light guide 630, the surfaces 626 and 627 can be set apart, and there is a wide selection for setting the optical center, and the degree of freedom for designing the apparatus can be expanded.

Figure 43:
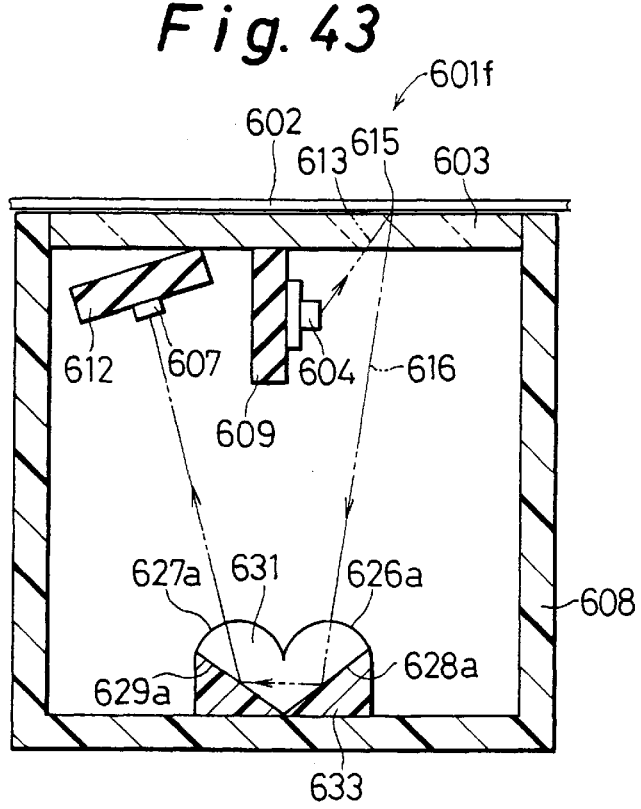
FIG. 43 is a sectional view showing the constitution of an image scanner 601f of a fourteenth embodiment of the invention.

FIG. 43 is a sectional view showing the constitution of the image scanner 601f of a fourteenth embodiment of the invention, and the parts corresponding or similar to those shown in FIG. 35 and FIG. 42 are identified with the same reference numerals. What is characteristic of the image scanner 601f is that a lens with prism 631 is used. The light 616 emitted from the LED 604 installed in the substrate 609 provided to be contact with the protective cover 603 vertically inside the casing 608 illuminates the original 602 through the protective cover 603. The reflected light 616 from the original 602 enters, again through the protective cover 603, an aspherical surface 626a, for example, of the lens with a prism 631 provided in the mounting part 633 provided in the bottom of the casing 608, and the optical path is changed by 90 degrees by a reflection surface 628a and the optical path is further changed by 90 degrees by a reflection surface 629a, and the light is emitted, for example, from an aspherical surface 627a, and is imaged on the semiconductor integrated circuit 607 installed above inside the casing 608 so as to be somewhere between the side wall of the casing 608 and the LED 604. The substrate 609 plays the role of a light shielding plate so that the light 613 emitted from the LED 604 may not directly hit against the semiconductor integrated circuit 607.

Figure 44:
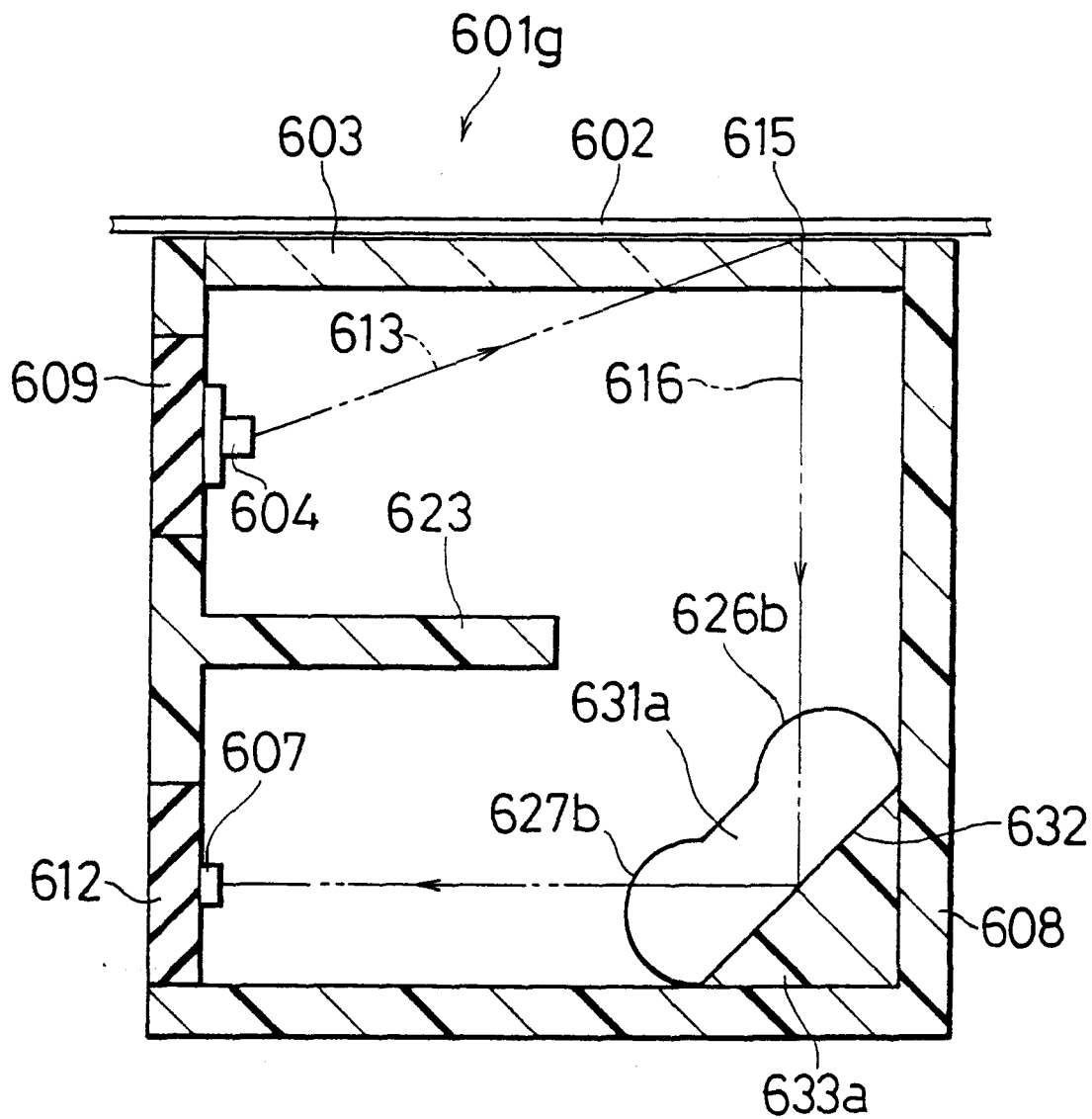
FIG. 44 is a sectional view showing the constitution of an image scanner 601g of a fifteenth embodiment of the invention.

FIG. 44 is a sectional view showing the constitution of the image scanner 601g of a fifteenth embodiment of the invention, and the parts corresponding or similar to those shown in FIG. 35 and FIG. 42 are identified with the same reference numerals. What is characteristic of the image scanner 601g is that a lens with a prism 631a of single reflection type is provided. The light 613 emitted from the LED 604 installed in the substrate 609 provided vertically to the protective cover 603 at the protective cover 603 side of the side surface of the casing 608 illuminates the original 602 through the protective cover 603. The reflected light 616 from the original 602 enter, again through the protective cover 603, an aspherical surface 626b, for example, of the lens with prism 631a attached to the mounting part 633a installed in the bottom of the casing 608, and the optical path is changed by 90 degrees by a reflection surface 632, and the light is emitted, for example, from an aspherical surface 627b, and is imaged on the semiconductor integrated circuit 607 installed on the substrate 612 provided so as to contact with the bottom of the casing 608, at the inner side of the casing 608 to which the substrate 609 is provided. At the installation side of the substrates 609, 612 of the casing 608, a light shielding part 623 for shielding light is provided so as to project from the substrates 609, 612.

According to the image scanner 601g of the embodiment, when the apparatus size is 20 mm in both width and height as shown in FIG. 36A, the optical path length can be set at 32 mm, and by using the semiconductor integrated circuit 607 with an IC size of 7.2 mm and a number of pixels of 144 dots, when the reading length and imaging magnification are set at 18 mm and 0.4 times, the number of semiconductor integrated circuits 607 necessary for reading the original 602 of the A4 format width can be set to 12.

Given below are embodiments of illuminating apparatus used as a light source for illuminating the original in the image scanner of the foregoing embodiments.

Figure 45A:
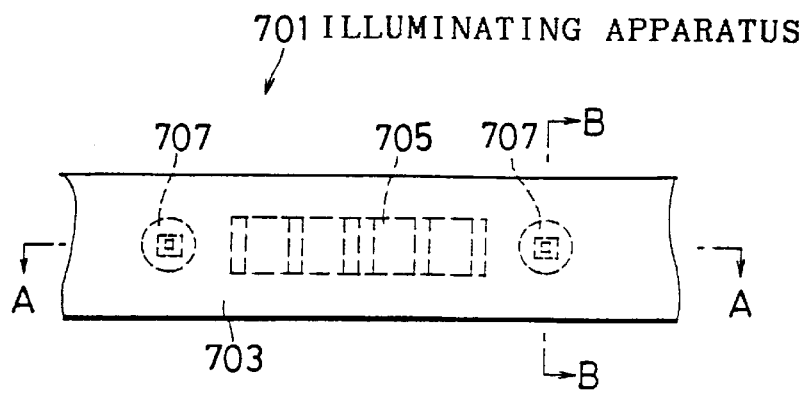
FIG. 45A is a top view of an illuminating apparatus 701 of a sixteenth embodiment of the invention.
Figure 45B:
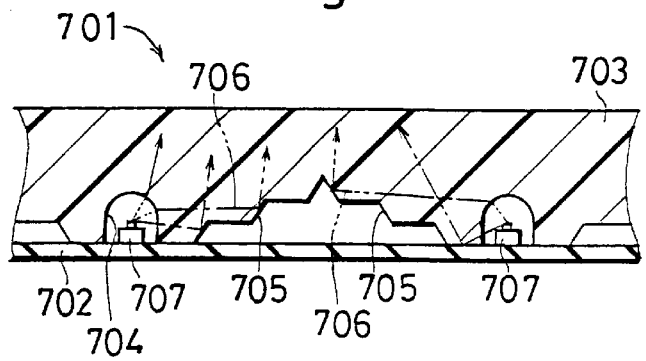
FIG. 45B is a sectional view taken along line A—A of FIG. 45A.
Figure 45C:
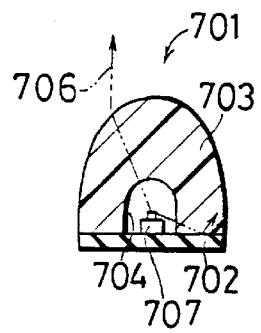
FIG. 45C is a sectional view taken along line B—B of FIG. 45A.

FIGS. 45A–45C are an appearance diagram and sectional views of an illuminating apparatus 701 in a sixteenth embodiment of the invention, and more specifically FIG. 45A is a top view, FIG. 45B is a sectional view taken along line A—A of FIG. 45A, and FIG. 45C is a sectional view taken along line B—B in FIG. 45A. The illuminating apparatus 701 comprises a long substrate 702, plural LEDs 207 disposed at specified intervals along a longitudinal direction of the substrate 702 on the substrate 702, and a light transmitting member 703.

The light transmitting member 703 is shaped semicylindrical, and, for example, has a length almost equal to the width of the original to be illuminated, and a dome-shaped cavity 704 in which the LEDs 707 are inserted is provided, and, for example, step-like prism surfaces 705 are provided between the cavities 704, facing the cavities at both sides. The light transmitting means 703 is made of glass, PMMA (polymethacrylic methyl acid), or liquid crystal polymer or the like.

When light 706 is emitted from the LEDs 707, for example, the light 706 emitted to the array direction of the LEDs 709 enters the light transmitting member 703 from the inside of the cavity 704 of the light transmitting member 703, and is reflected by the prism surface 705 provided between the cavities 704, and the optical path is changed to the original direction, and the light is emitted from the top of the semicylindrical light transmitting member 703, thereby illuminating the original. The shape of the top surface of the semicylindrical light transmitting member 703 is selected so that the light emitted from the top surface can be focused on the illuminating position of the original.

According to the illuminating apparatus 701 of the invention 701, the light 706 transmitted from the LEDs 707 toward the array direction of the LEDs 707, and hitherto escaping without reaching the original, is reflected by the prism surface 705, and is changed in the optical path in the original direction to illuminate the original. Therefore, the loss of quantity of light can be reduced, and the quantity of light illuminating the original can be increased without increasing the number of LEDs 707 used in the light source, or rather by decreasing the number.

In the illuminating apparatus 701, the light 706 emitted downward (in the reverse direction of the original direction) from the LEDs 707 is reflected by the bottom of the light transmitting member 703 and the prism surface 705, and the optical path is changed in the original direction. Therefore, in the substrate 702, conventionally, an expensive white resist has been used in order to reduce the loss of quantity of light, but the cost can be reduced by using an inexpensive green resist.

Figure 46:
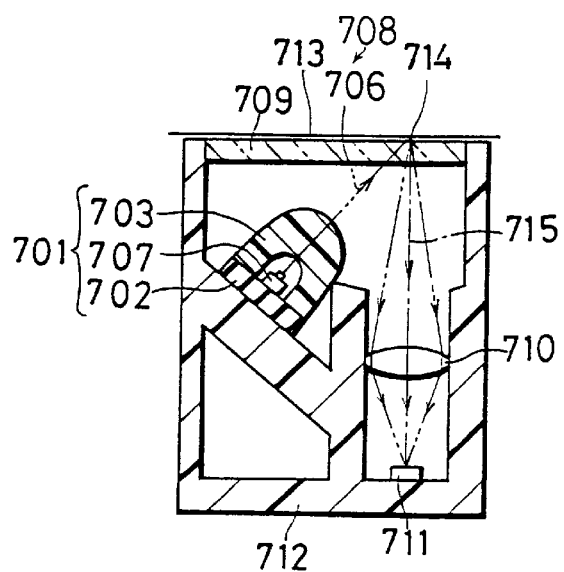
FIG. 46 is a sectional view showing the constitution of an image scanner 708 in an application example of the illuminating apparatus.
Figure 47:
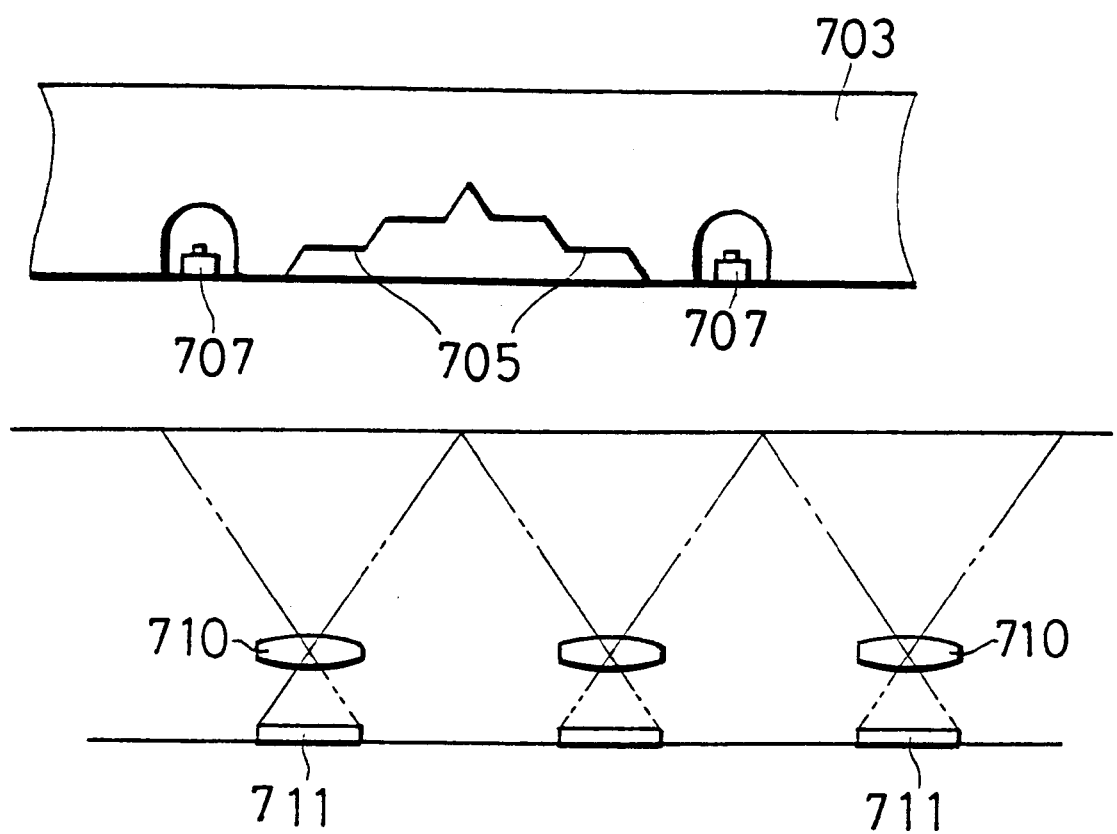
FIG. 47 is a structural diagram showing the configuration of LEDs 707, a prism surface 705 and lenses 710 in the image scanner 708.

FIG. 46 is a sectional view showing the constitution of an image scanner 708 in an application example of the illuminating apparatus 701, and FIG. 47 is a structural diagram showing the configuration of the LEDs 707, a prism surface 705, and lenses 710 in the image scanner 708. In FIG. 46 and FIG. 47, the same parts as in FIG. 45 are identified with the same reference numerals. The image scanner 708 comprises an illuminating apparatus 701, a protective cover 709, plural lenses 710, semiconductor integrated circuits 711 in the same number as the lenses 710, and a casing 712 for holding the illuminating apparatus and protective cover 709.

The illuminating apparatus 710 is installed obliquely along a main-scanning direction on a slope provided inside the casing 712 or the like, and the light 706 emitted from the LED 707 is guided by the light transmitting means 703 as mentioned above, and illuminates the reading position 714 of the original 713 obliquely through the protective cover 709 mounted on the top of the casing 712.

The reflected light 715 from the reading position 714 of the original 713 enters inside the casing 712 through the protective cover 709 again, and enters the lenses 710 installed along the principal scanning direction inside the casing 712, and is divided into several blocks, imaged on the semiconductor integrated circuits 711 installed so as to correspond to the lenses in the bottom of the casing 712, and is photoelectrically converted and read by the semiconductor integrated circuits 711.

The relation between the configuration of the LEDs 707 in the illuminating apparatus 701 and the configuration of the lenses 710 and semiconductor integrated circuits 711 is so that two lenses 711 correspond to one LED 707, for example, as shown in FIG. 47, and the center of each LED 707 and each prism surface 705 corresponds to the middle of each lens 711. At this time, by properly setting the shape of the prism surface 705, the distribution of the quantity of illuminating light on the original 702 in the principal scanning direction is adjusted, and the decrease of quantity of light caused when the reflected light 715 passes through the peripheral parts of the lenses 711 is compensated, and the quantity of light of the image focused on the semiconductor integrated circuits 711 may be set to a uniform quantity of light corresponding to the image pattern.

Therefore, when the illuminating apparatus 701 is installed in the image scanner 708, the quantity of light of the light 706 for illuminating the original 713 increases, and the quantity of light of the reflected light 715 reaching the semiconductor integrated circuits 711 increases, so that a sharp image may be obtained. The illuminating apparatus 701 can be lowered in cost by decreasing the number of LEDs 707 used, and hence the manufacturing cost of the image scanner 708 can be reduced.

Figure 48A:
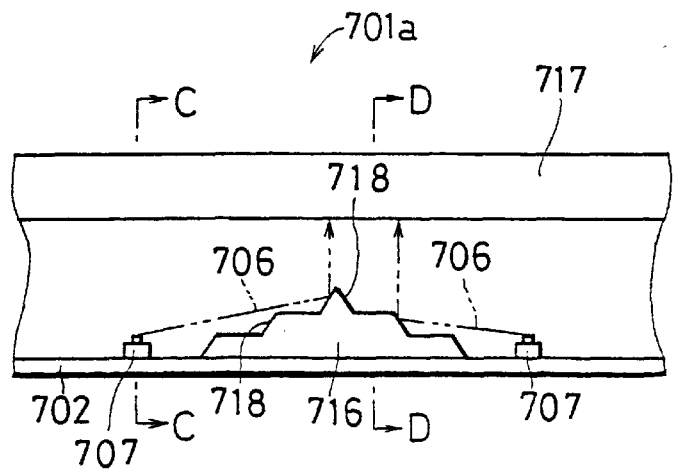
FIG. 48A is a front view of an illuminating apparatus 701a of a seventeenth embodiment of the invention.
Figures 48B, 48C:
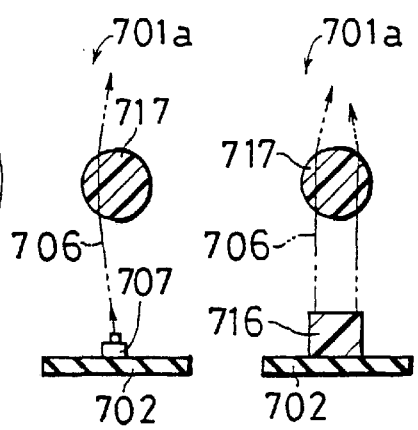
FIG. 48B is a sectional view taken along line C—C of FIG. 48A.
FIG. 48C is a sectional view taken along line D—D of FIG. 48A.

FIGS. 48A–48C are a front view and sectional views of an illuminating apparatus 701a of a seventeenth embodiment of the inventions and more specifically FIG. 48A is a front view, FIG. 48B is a sectional view taken along line C—C of FIG. 48A, and FIG. 48C is a sectional view taken along line D—D of FIG. 48A. In FIG. 48, the parts corresponding to the illuminating apparatus 701 in FIG. 45 are identified with the same reference numerals.

What is characteristic of the illuminating apparatus 701a is that a light reflecting member 716 possessing a reflection surface 718 in a shape of stairs or the like facing LEDs 707 at both sides is provided between the LEDs 707, and that a bar-shaped lens 717 is provided along the array direction of the LED 707. When light 706 is emitted from the LED 707, for example, the light 706 emitted toward the array direction of the LEDs 707 is reflected by the reflection surface 718 of the light reflecting member 716, and the optical path is changed in the original direction, and is further condensed in the illuminating position of the original plane by passing through the bar-shaped lens 717.

The light reflecting member 716 and lens 717 are made of glass, PMMA, or liquid crystal polymer, and the reflection surface 718 is realized by evaporating aluminum, silicon dioxide or the like on the surface of the light reflecting member 716. The shape of the section of the lens 717 is selected in a shape for efficiently condensing the light emitted from the LEDs 707 on the original surface, and, for example, circle or semicylinder may be selected.

Figure 49A:
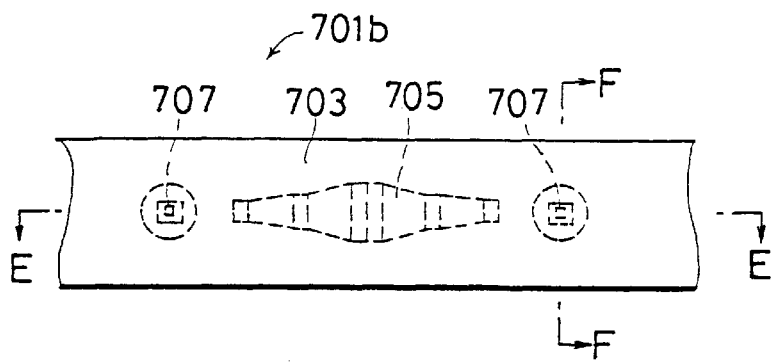
FIG. 49A is a top view of an illuminating apparatus 701b of a eighteenth embodiment of the invention.
Figure 49B:
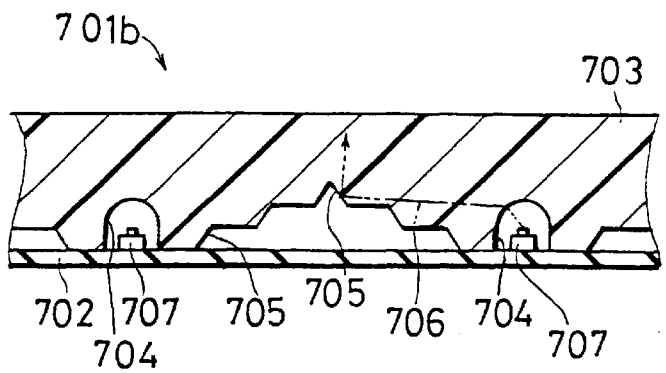
FIG. 49B is a sectional view taken along line E—E of FIG. 49A.
Figure 49C:
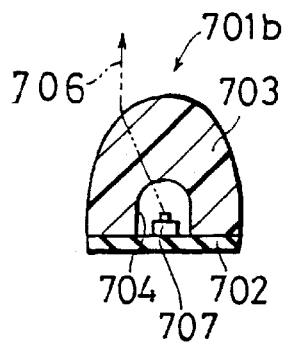
FIG. 49C is a sectional view taken along line F—F of FIG. 49A.

FIGS. 49A–49C are a top view and sectional views of an illuminating apparatus 701b of an eighteenth embodiment of the invention, and more specifically FIG. 49A is a top view, FIG. 49B is a sectional view taken along section line E—E of FIG. 49A, and FIG. 49C is a sectional view taken along line F—F in FIG. 49A. In FIG. 49, the parts corresponding to the illuminating apparatus 701 in FIG. 45 are identified with the same reference numerals.

What is characteristic of the illuminating apparatus 701b is that the reflection area of the prism surface 705 provided in the light transmitting member 703 increases as the distance from the LEDs 707 is extended. Therefore, generally, when the distance from the LEDs 707 becomes longer, the quantity of light per unit area decreases, and hence by increasing the reflection area according to the decrease of the quantity of light, the original may be illuminated with a uniform quantity of light. When the illuminating apparatus 701b is installed in the image scanner 708 same as the illuminating apparatus 701 shown in FIG. 46 and FIG. 47, by properly setting the size and shape of the prism surface 705, the quantity of light illuminating the original 713 may be preliminarily changed depending on the layout and shape of the lenses 710, and the quantity of light of the image focused on the semiconductor integrated circuits 711 may be set in a uniform quantity of light corresponding to the pattern of the image, so that the image quality may be enhanced.

FIGS. 50A–50C are a top view and sectional views of an illuminating apparatus 701c of a nineteenth embodiment of the invention, and more specifically FIG. 50A is a top view, FIG. 50B is a sectional view taken along line G–G of FIG. 50A, and FIG. 50C is a sectional view taken along line H—H of FIG. 50(A). In FIG. 50, the parts corresponding to the illuminating apparatus 701 of FIG. 45 are identified with the same reference numerals.

The illuminating apparatus 701c comprises a substrate 702, plural LEDs 707, and a light transmitting member 703a composed of a reflection conductor 719 formed of glass, PMMA, liquid crystal polymer or similar material, and a light guide 720. The reflection conductor 719 is long-shaped and possesses, for example, a top surface 721, both sides 722, and a bottom 723 along the longitudinal direction, and the both sides 722 are shaped like bellows, and the width is changed periodically and continuously in the longitudinal direction in a range of minimum width S701 and maximum width S702, corresponding to the configuration of the LEDs 707, and, for example, each node of the bellows shape is positioned near each LED 707 and in the middle of each LED. The bottom 723 has a dome-shaped cavity 704a in which each LED 707 is inserted. The light guide 720 is long-shaped and posseses, for example, a top surface 724, both sides 725 and a bottom along the longitudinal direction, and in particular the top surface is an aspherical lens shape. The light guide 720 is bonded to the top surface of the reflection conductor 719, and in this case the light guide 720 may be formed integrally with the reflection conductor 719.

When light 706 is emitted from the LEDs 707, and for example, the light 706 emitted to the direction parallel to the original surface to be illuminated enters the reflection conductor 719 from the inside of the cavity 704a, and is reflected plural times on the both sides 722, bottom 723 and top surface 721, and the optical path is corrected upward (in the original direction), and when the reflection conductor 719 and the light guide 720 are formed integrally, the light further enters the light guide 720, and is reflected by the side 725, and is emitted from the top surface 724 of the lens shape, and is condensed at the position for illuminating the original surface.

For example, when the reflection conductor 719 and the light guide 720 are integrally formed, the shape of the top surface 721 and both sides 722 of the reflection conductor 719 and the both sides 725 of the light guide 720 is set so as to reflect the light 706 from the LED 707 and guide to the top surface 724, that is, so that the light 706 does not escape outside as the incident angle of the light 706 exceeds the critical angle, thereby allowing the light 706 to be emitted only from the top surface 724 of the light guide 720.

In the illuminating apparatus 701c of the embodiment, since the light transmitting member 716 composed of a reflection conductor 719 and a light guide 720 is provided, the light 706 emitted, for example, from the LEDs 707 to the direction parallel to the original surface, and hitherto escaping without reaching the original, is reflected by the both sides 722 of the reflection conductor 719, the optical path is changed in the original direction, and the light is further condensed on the original surface through the light guide 720. Therefore, the loss of quantity of light can be decreased, and the quantity of light illuminating the original can be increased without increasing the number of the LEDs 707 to be used, or rather by decreasing the number.

FIGS. 51A–51C are a top view and sectional views of an illuminating apparatus 701d of a twentieth embodiment of the invention, and more specifically FIG. 51A is a top view, FIG. 51B is a sectional view taken along line I—I of FIG. 51A, and FIG. 51C is a sectional view taken along line J—J of FIG. 51A. In FIG. 51, the parts corresponding to the illuminating apparatus 701c in FIG. 50 are identified with the same reference numerals.

What is characteristic of the illuminating apparatus 701d is that the top surface 724 of the light guide 720 in the illuminating apparatus 701c of FIG. 50 is shaped in a waveform corresponding to the arrangement of the LEDs 707, and the height from the bottom of the light guide 720 to the top surface 724 is changed periodically and continuously in the longitudinal direction in a range of minimum value T701 to maximum value T702, and, for example, the period of the waveform is set equal to the interval of arrangement of the LEDs 707, and each crest height of the waveform is set on each LED 707 in the portion of the minimum value T701.

According to the illuminating apparatus 701d, the light 706 emitted from the LEDs 707 enters the reflection conductor 719, and is guided into the light guide 720 same as in the illuminating apparatus 701c, and is emitted from the top surface 724 of waveform shape. Therefore, generally, the distance to the LEDs 707 is longer in the middle between the LED 707 and LED 707, and the quantity of light is decreased as compared with that on the LED 707, but by setting the waveform shape of the top surface 724 in a concave lens form on each LED 707, and in a convex lens form between LEDs 707, the light 706 on each LED 707 is distributed to both sides, and fluctuations of quantity of light of the quantity of light illuminating the original is decreased, thereby illuminating uniformly.

FIGS. 52A–52C are a top view and sectional views of an illuminating apparatus 701e of a twenty-first embodiment of the invention, and more specifically FIG. 52A is a top view, FIG. 52B is a sectional view taken along line K—K of FIG. 52A, and FIG. 52C is a sectional view taken along line L—L of FIG. 52A. In FIG. 52, the parts corresponding to the illuminating apparatus 701d in FIG. 51 are identified with the same reference numerals.

What is characteristic of the illuminating apparatus 701e is that, for example, a step-like prism surface 705a is formed in the bottom 723 of the reflection conductor 719, facing the LEDs 707 at both sides, so as to be positioned between the LEDs 707. The light 706 emitted from the LEDs 707 along the array direction of the LEDs 707, for example, enters the reflection conductor 719, and is reflected by the prism surface 705a, and the optical path is changed in the original direction, and the light is further guided into the light guide 720, and is emitted from the wave-shaped top surface 724.

Therefore, in the illuminating apparatus 701e, the top surface 724 of the light guide 720 is shaped in waveform, and the prism surface 705a is positioned in the middle of the LEDs 707 in the bottom 723 of the reflection conductor 719, and therefore the fluctuations of quantity of light on the original surface can be further decreased by properly setting the waveform of the top surface 724 and the size and shape of the prism surface 705a.

Figure 53:
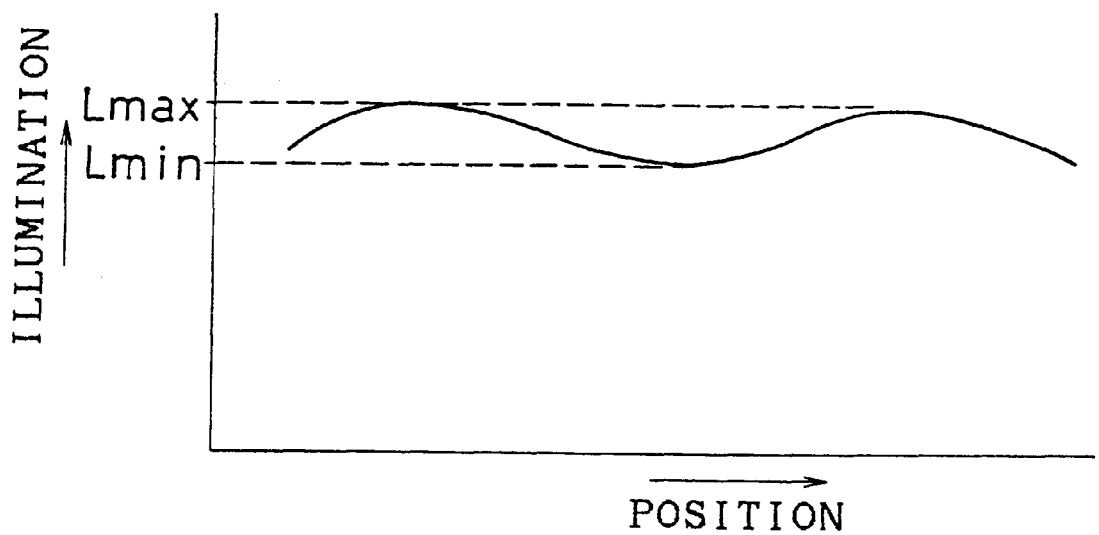
FIG. 53 is a diagram showing the illumination distribution in a width direction of an original when the original is illuminated with the illuminating apparatus 701e.

FIG. 53 is a diagram showing the illumination distribution in the width direction of an original when the original is illuminated with the illuminating apparatus 701e. The LPRNU (LED photo response non-uniformity) expressing the fluctuation of the illumination is defined as follows.

$$LPRNU = \frac{Lmax - Lmin}{Lmax + Lmin} \times 100(\%) \tag{5}$$

where Lmax is the maximum value of illumination, and Lmin is the minimum value of illumination. Putting Lmax and Lmin of the illumination distribution by the illuminating apparatus 701e as shown in FIG. 53 into formula (5), the LPRNU is 8%. In a conventional typical illuminating apparatus, the LPRNU is 15%, and hence the illumination fluctuation is substantially improved in the illuminating apparatus 701e.

Figure 54:
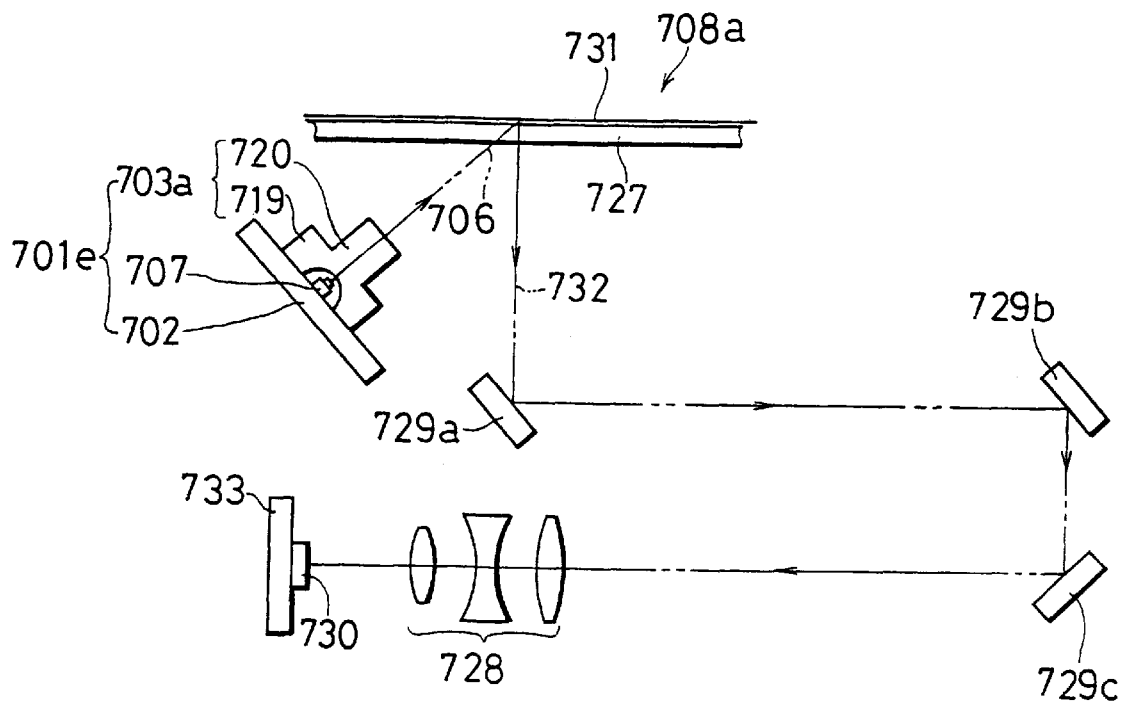
FIG. 54 is a structural diagram showing the constitution of an image scanner 708a in an application example of the illuminating apparatus 701e.

FIG. 54 is a structural diagram showing the constitution of an image scanner 708a in an application example of the illuminating apparatus 701e, and the same reference numbers are given to the parts corresponding to FIG. 52. The image scanner 708a comprises the illuminating apparatus 701e, a protective cover 727, an optical lens 728 composed of plural imaging lenses, for example, three reflectors 729a, 729b, 729c, a single CCD 730, and a casing (not shown) for accommodating the illuminating apparatus 701e, protective cover 727 and others. The illuminating apparatus is installed obliquely, for example, in the casing 702, and emits lights 706, and illuminates the original 731 obliquely through the protective cover 727. The reflected light 732 from the original 731 is reflected by the three reflectors 729a, 729b, 729c through the protective cover 727 again, and is focused on the CCD 730 disposed on the substrate 733 through the single lens system 728, and is photoelectrically converted and read by the CCD 730.

In the image scanner 701c, since the reflected light 732 from the original 731 is focused on the single CCD 730 by the lens system 728, the optical path of the reflected light 732 from the original 731 surface to the top surface of the CCD 730 is long, and the focused image tends to be dark, but by installing the illuminating apparatus 701e, the quantity of light illuminating the original 731 is increased, so that a sharp picture quality can be obtained.

Figure 55:
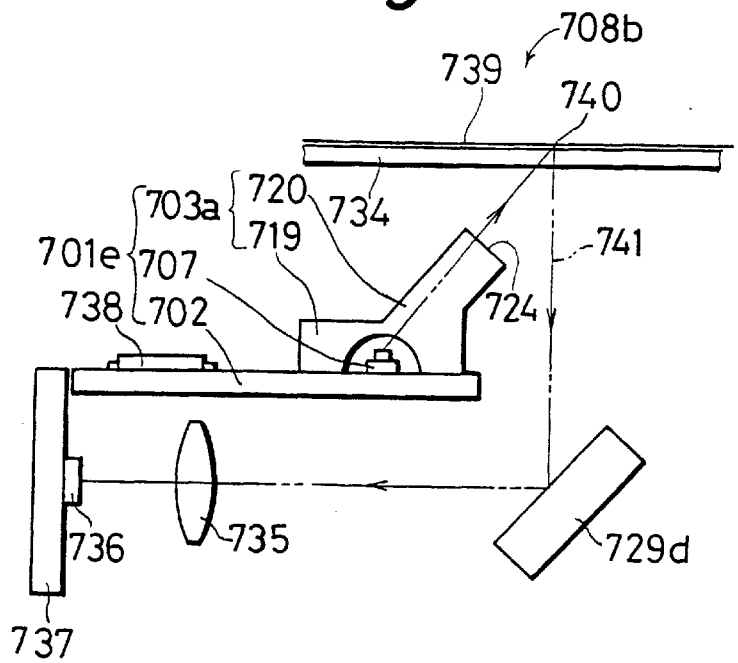
FIG. 55 is a structural diagram showing the constitution of an image scanner 7108b in other application example of the illuminating apparatus 701e.

FIG. 55 is a structural diagram showing the constitution of an image scanner 708b in other application example of the illuminating apparatus 701e, and the same reference numbers are given to the parts corresponding to FIG. 52. The image scanner 708b comprises the illuminating apparatus 701e, a protective cover 734, plural lenses 735, a reflector 729d, semiconductor integrated circuits 708b in the same number as the lenses 735, and a casing (not shown) for accommodating the illuminating apparatus 701e, protective cover 734 and others. What is characteristic of the image scanner 708b is that the illuminating apparatus 701e is installed in the casing so that the substrate 702 on which the LEDs 707 are mounted may be parallel to the protective cover 734 mounted on the top surface of the casing. The substrate 702 is vertically, for example, in contact with the substrate 737 for the semiconductor integrated circuits 736 mounted on the side of the casing, so that the LEDs 707 and the semiconductor integrated circuits 736 may be driven commonly by one driving circuit 738. At this time, the driving circuit 738 is mounted, for example, on the substrate 702.

What is further characteristic is that a light transmitting member 703a is constituted so that the top surface 724 of the light guide 720 may be directed to the reading position 740 on the original 739 to be illuminated in the illuminating apparatus 701e. When light 706 is emitted from the LEDs 704, the light 706 is guided by the light transmitting member 703a, and is emitted from the top surface 724, thereby illuminating the reading position 740 of the original 739 through the protective cover 734. The reflected light 741 from the reading position 740 enters the casing through the protective cover 7343 again, and is reflected by the reflector 729d installed obliquely, for example, in the bottom of the casing, and the optical path is changed in the direction of the lens 735, and the light is focused on the semiconductor integrated circuits 736 through the lenses 735, and is photoelectrically converted and read by the semiconductor integrated circuits 736.

Therefore, in the image scanner 708b provided with the illuminating apparatus 701e, by properly setting the installation angle and shape of the light guide 720 of the illuminating apparatus 701e, the substrate 702 and the substrate 737 are always kept in contact at right angle, for example, and only one driving circuit is enough for the LEDs 707 and semiconductor integrated circuits 736, and therefore the number of parts is decreased and the manufacturing cost can be saved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image scanner comprising on a casing possessing a confronting surface to an object to be read:
    a light source,
    a single lens, and
    a semiconductor integrated circuit having multiple photoelectric conversion elements arranged linearly, wherein the light source illuminates the object to be read, and light reflected therefrom is converged in the semiconductor integrated circuit through the lens, and the lens is composed of light transmitting high polymer material, the casing is made of high polymer material, and the lens and casing are combined into one body by ultra-sonic fusion.

2. An image scanner of claim 1, wherein a surface of the semiconductor integrated circuit comprising the photoelectric conversion elements is coated with a light transmitting resin layer having a thickness of 100 μm or less, and the light source illuminates the object to be read, and the reflected light is focused by the lens and is received in the photoelectric conversion element through the light transmitting resin layer.

3. An image scanner comprising on a casing possessing a confronting surface to an object to be read:
    a lens having an optical axis,
    a light source having a plurality of LEDs disposed in a linear array, and
    a semiconductor integrated circuit having multiple photoelectric conversion elements arranged linearly so as to be substantially parallel to the LED array, wherein the light source illuminates the object to be read and light reflected therefrom is focused on the semiconductor integrated circuit through the lens and the plurality of LEDs are arranged and controlled so that the distribution of intensity of light emitted by the LEDs is substantially symmetrical relative to the optical axis of the lens so that the light intensity emitted by the LEDs and distribution of light emitted by the light source increase with increasing distance from the optical axis of the lens.

4. An image scanner of claim 3, wherein a protrusion or a stepped portion is formed in an inner side wall of the casing facing the optical path from the object to be read to the lens, or wherein the side wall has a black mat finish.

5. An image scanner of claim 3, wherein light shielding means for shielding light directly entering the lens from the light source is formed in the casing.

6. An image scanner of claim 3, further comprising a controller connected to the light source for controlling intensity of light emitted by the LEDs.

7. An image scanner comprising on a casing possessing a confronting surface to an object to be read:
    a lens having an optical axis,
    a light source having a plurality of LEDs disposed in a linear array, and
    a semiconductor integrated circuit having multiple photoelectric conversion elements arranged linearly so as to be substantially parallel to the LED array, wherein the light source illuminates the object, and light reflected therefrom is focused on the semiconductor integrated circuit through the lens and, current adjusting means is provided in order to apply electric power individually to the plurality of LEDs so that distribution of light emited by the light source increases with increasing distance from the optical axis of the lens.

8. An image scanner of claim 7, wherein a protrusion or a stepped portion is formed in an inner side wall of the casing facing the optical path from the object to be read to the lens, or wherein the side wall has a black mat finish.

9. An image scanner of claim 7, wherein light shielding means for shielding light directly entering the lens from the light source is formed in the casing.

10. An image scanner comprising:
    a light transmitting plate in contact with an object to be read,
    a light source illuminating the object,
    a reflector for converting an optical path of light reflected from the object;
    a plurality of lenses for focusing the reflected light,
    a plurality of photoelectric conversion means of sequential reading type for photoelectrically converting the image focused by the lens, and a casing for accommodating the light transmitting plate, light source, reflector, lenses and photoelectric conversion elements, wherein the lenses and casing are combined into one body ultra-sonic fusion.

11. An image scanner comprising:

a light transmitting plate in contact with an object to be read, a light source for illuminating the object, a plurality of lenses for focusing light reflected from the object, a prism for converting an optical path of the reflected light, a plurality of photoelectric conversion means of sequential reading type for photoelectrically converting the image focused by the lens, and a casing for accommodating the light transmitting plate, light source, prism, lenses and photoelectric conversion elements, wherein the lenses and casing are combined into one body by ultra-fusion.

12. An image scanner according to claim 10 or 11, further comprising:

the light source having a plurality of LEDs arranged linearly at predetermined intervals, a reflection conductor for leading in light from each LED and conducting said light, and a light guide for leading light from the reflection conductor and emitting light outside of said light guide, wherein at least a portion of the light guide has a curved surface having an aspherical suface curvature.

* * * * *